United States Patent [19]
Kobayshi et al.

[11] Patent Number: 5,210,558
[45] Date of Patent: May 11, 1993

[54] ELECTRONICALLY CONTROLLED CAMERA

[75] Inventors: Takeo Kobayshi, Tokyo; Yasushi Tabata, Ichikawa; Norio Numako, Nogi; Katsutoshi Nagai, Kawaguchi, all of Japan

[73] Assignee: Asahi Kogaku Kogyo Kabushiki Kaisha, Tokyo, Japan

[21] Appl. No.: 655,105

[22] Filed: Feb. 14, 1991

[30] Foreign Application Priority Data

Feb. 14, 1990 [JP] Japan .................................. 2-32983

[51] Int. Cl.⁵ .............................................. G03B 1/18
[52] U.S. Cl. .................................................. 354/195.1
[58] Field of Search ............ 354/195.1, 195.12, 195.13

[56] References Cited

U.S. PATENT DOCUMENTS

| | | | |
|---|---|---|---|
| 4,206,982 | 6/1980 | Osanai | 352/140 |
| 4,445,757 | 5/1984 | Enomoto et al. | 354/195.12 X |
| 4,916,475 | 4/1990 | Hori | 354/195.1 X |
| 4,936,664 | 6/1990 | Haraguchi et al. | 350/429 |
| 4,945,371 | 7/1990 | Hashimoto et al. | 354/195.13 |
| 4,962,399 | 10/1990 | Numako et al. | 354/195.1 |

FOREIGN PATENT DOCUMENTS 63-78119  4/1988  Japan.
2-68507  3/1990  Japan.

OTHER PUBLICATIONS

English language Abstracts of JP63-078119 and JP2-068507.

*Primary Examiner*—Michael L. Gellner
*Assistant Examiner*—Howard B. Blankenship
*Attorney, Agent, or Firm*—Sandler, Greenblum & Bernstein

[57] ABSTRACT

An electronically controlled camera comprises a zoom lens which is capable of being driven to move in the direction of the optical axis thereof within a zooming area between a tele extremity and a wide extremity. A single operation member is provided for instructing the movement direction of the zoom lens, and the zoom lens is driven to move either stepwisely or continuously in accordance with the operating amount of the operation member.

5 Claims, 47 Drawing Sheets

| Shooting System | DRIVEMODE | Indication |
|---|---|---|
| Frame-By-Frame shooting (Initial value) | 0000 B | Blank |
| Self-Timer | 0001 B | ⏲ |
| Self-TW | 0010 B | ⏲ 👤 |
| Interval | 0011 B | INT |
| Forced Rewind | 1XXX B | ▷▷ ◎ |

FIG. 6

| Exposure system | EXPMODE | Indication |
|---|---|---|
| Auto (Initial value) | 0H | Blank |
| Strobe ON | 1H | |
| Strobe OFF | 2H | |

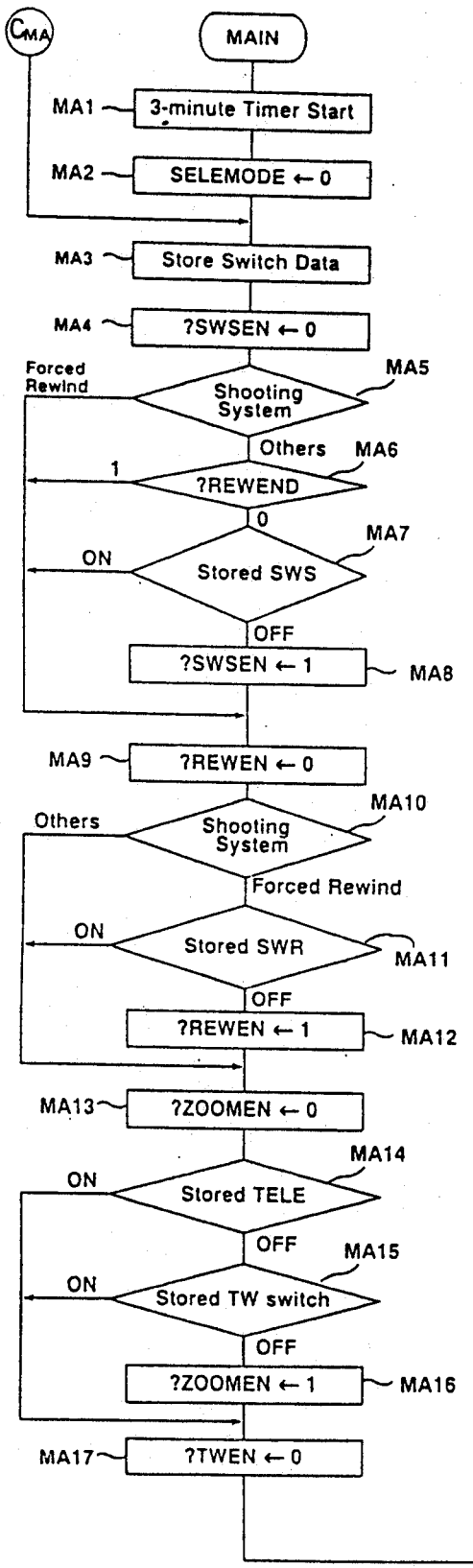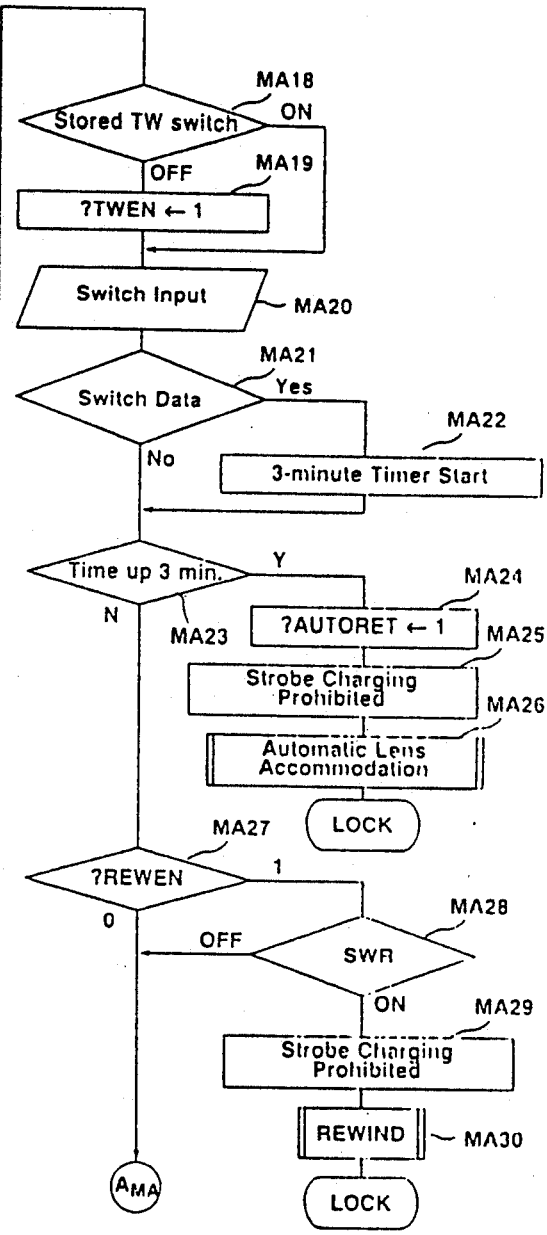
FIG. 22-A

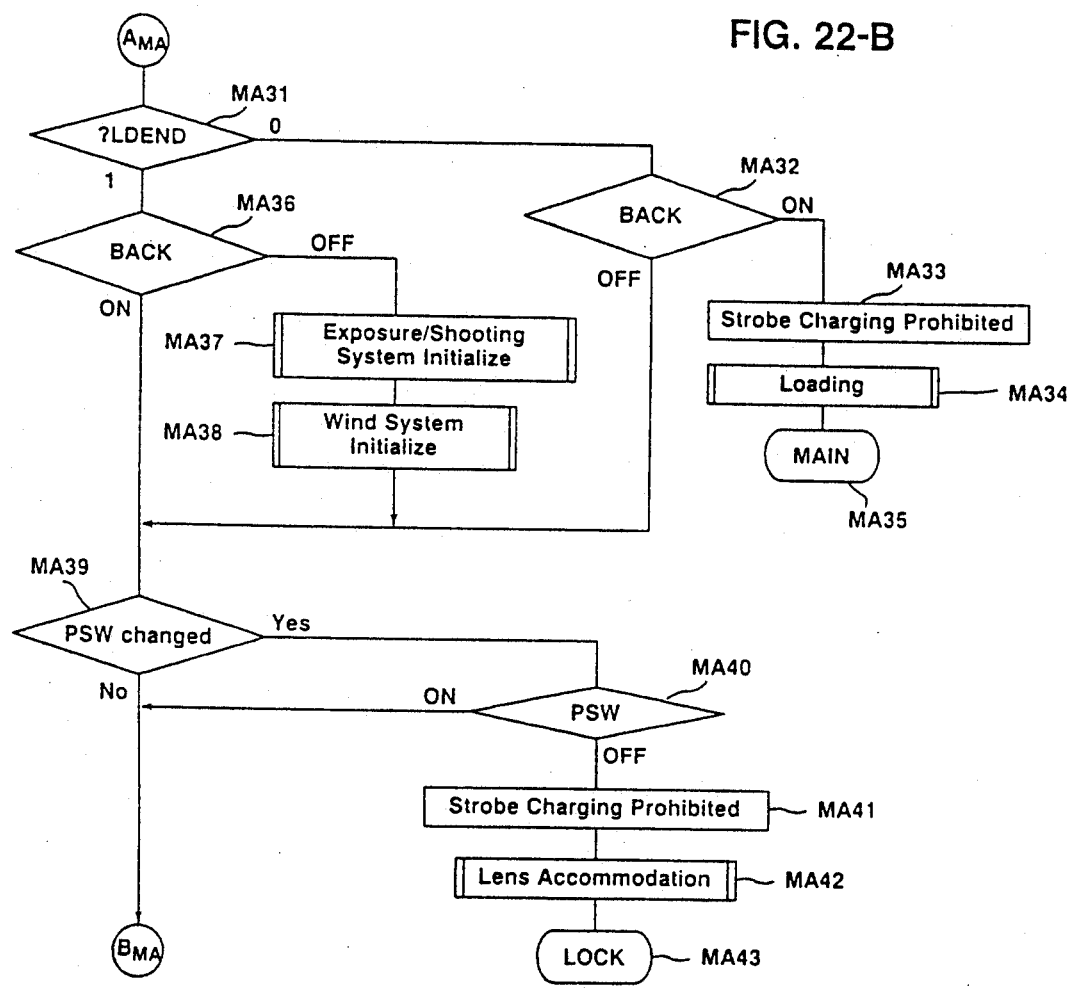
FIG. 22-B

FIG. 32-A
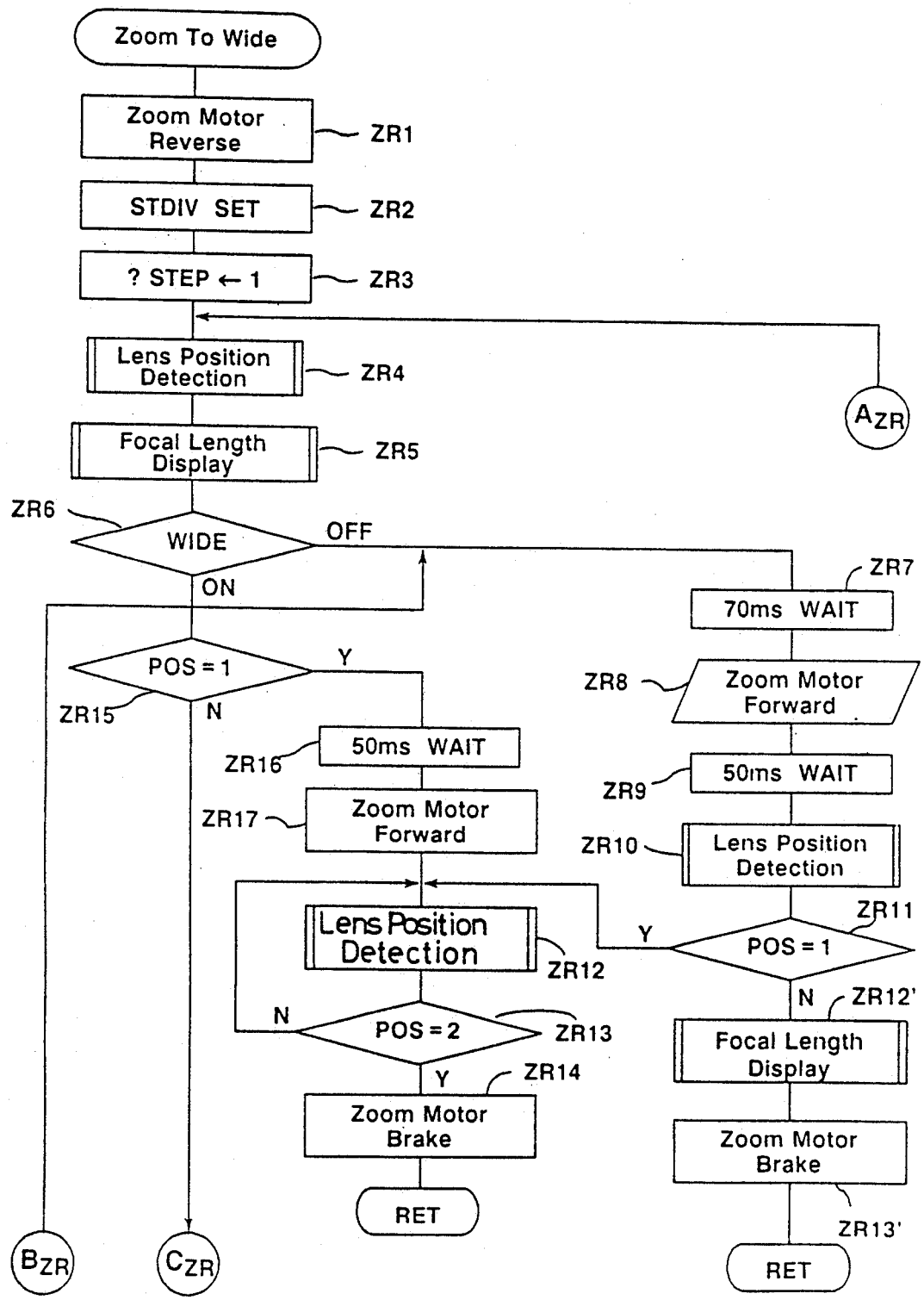

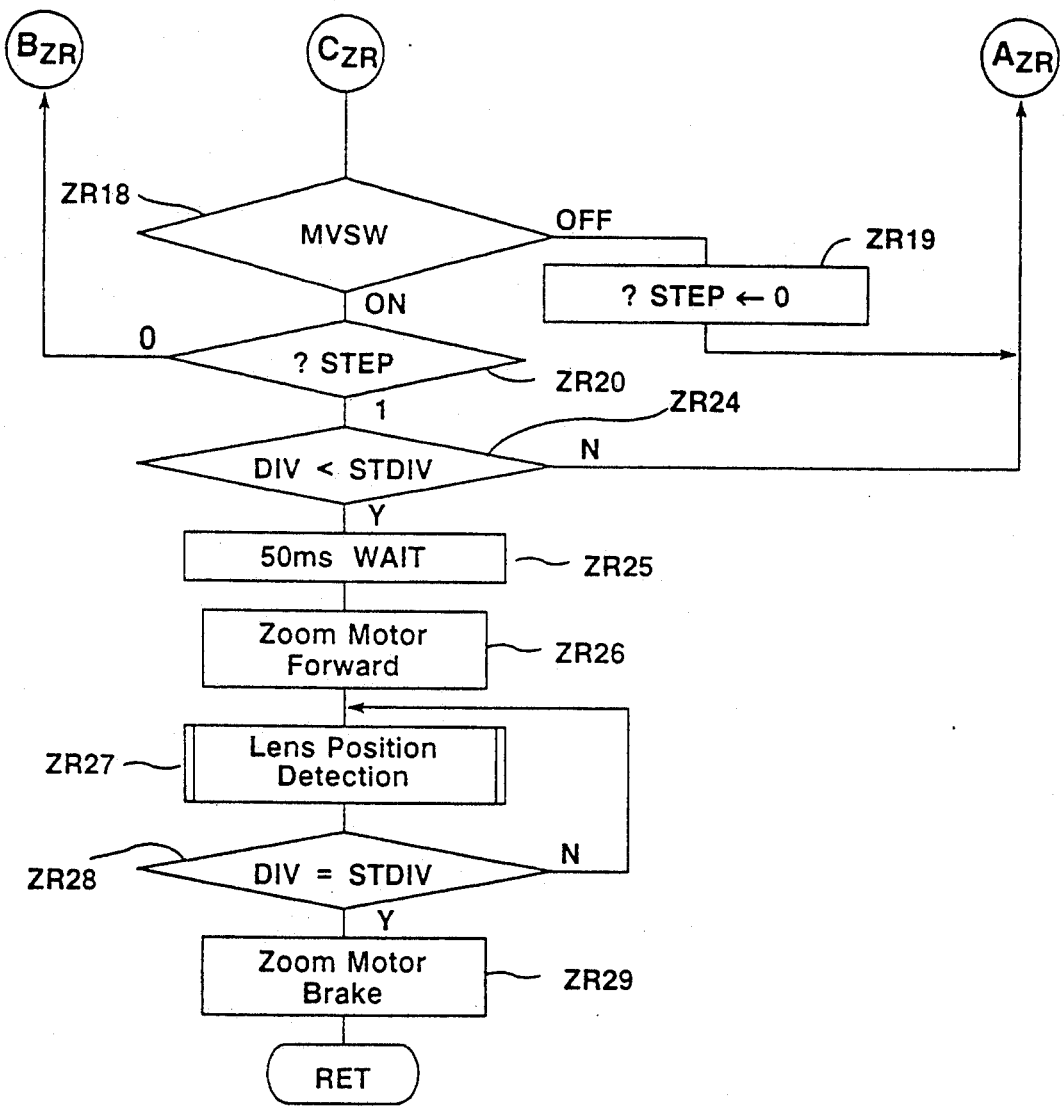
FIG. 32-B

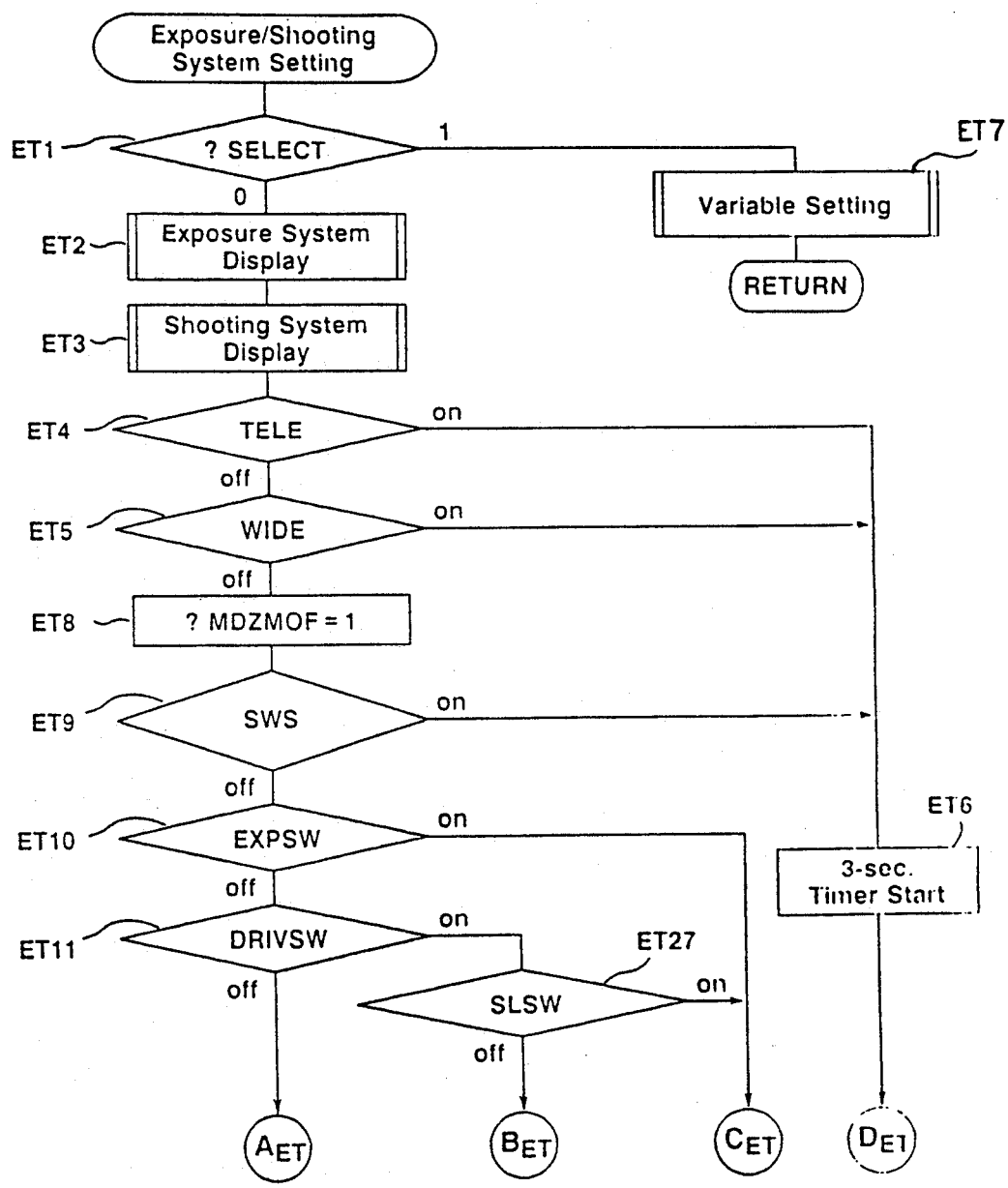
FIG. 33-A

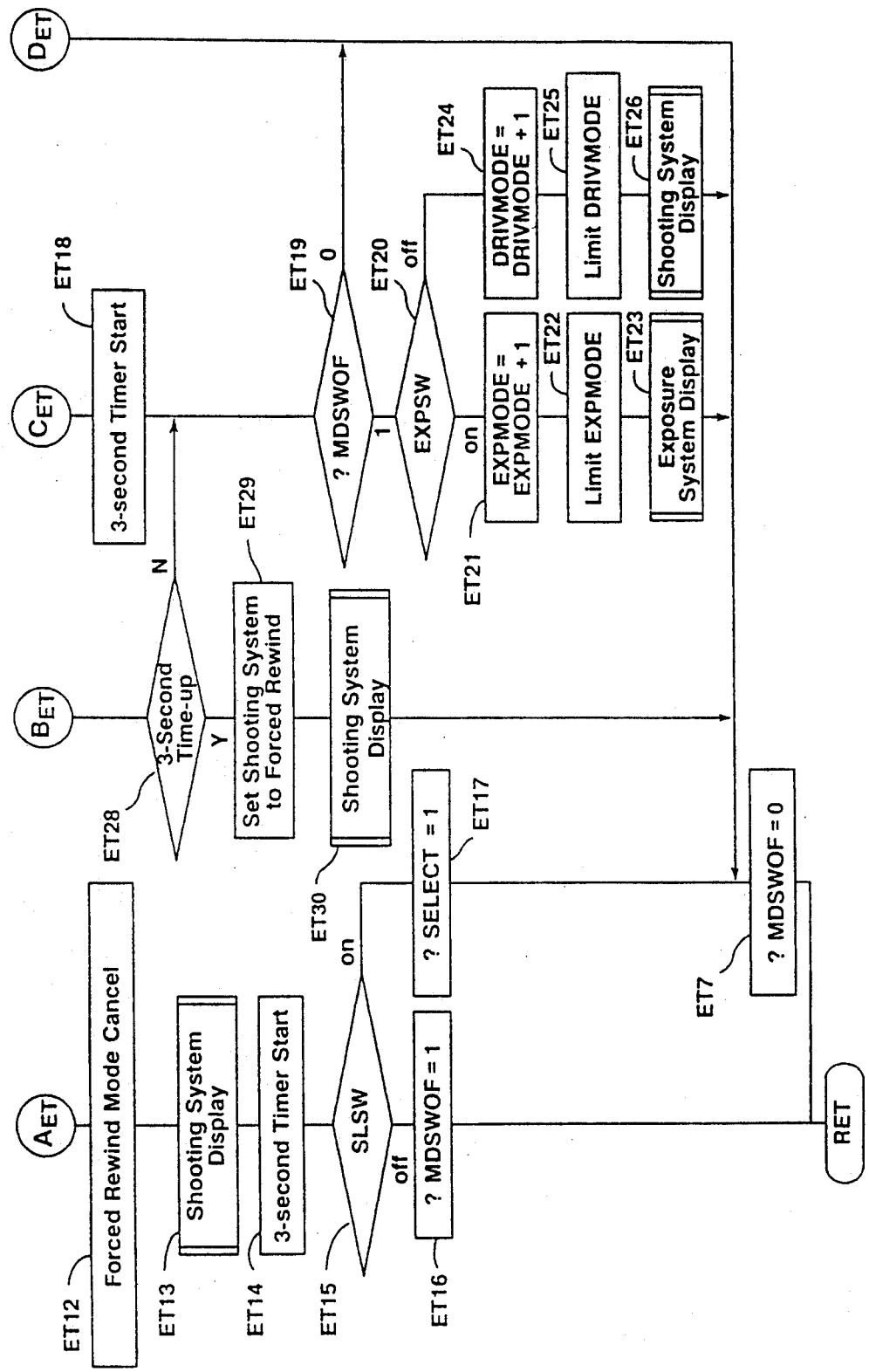
FIG. 33-B

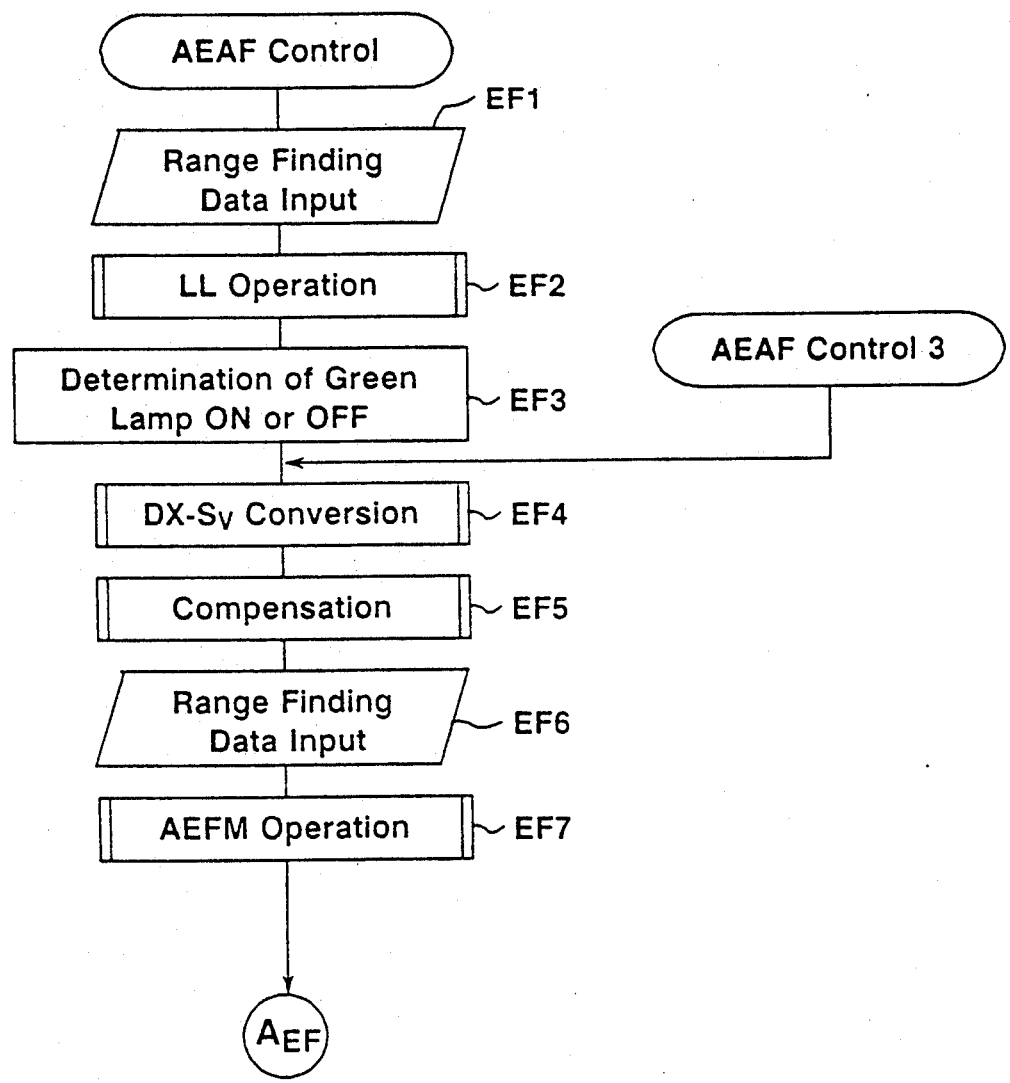
FIG. 37-A

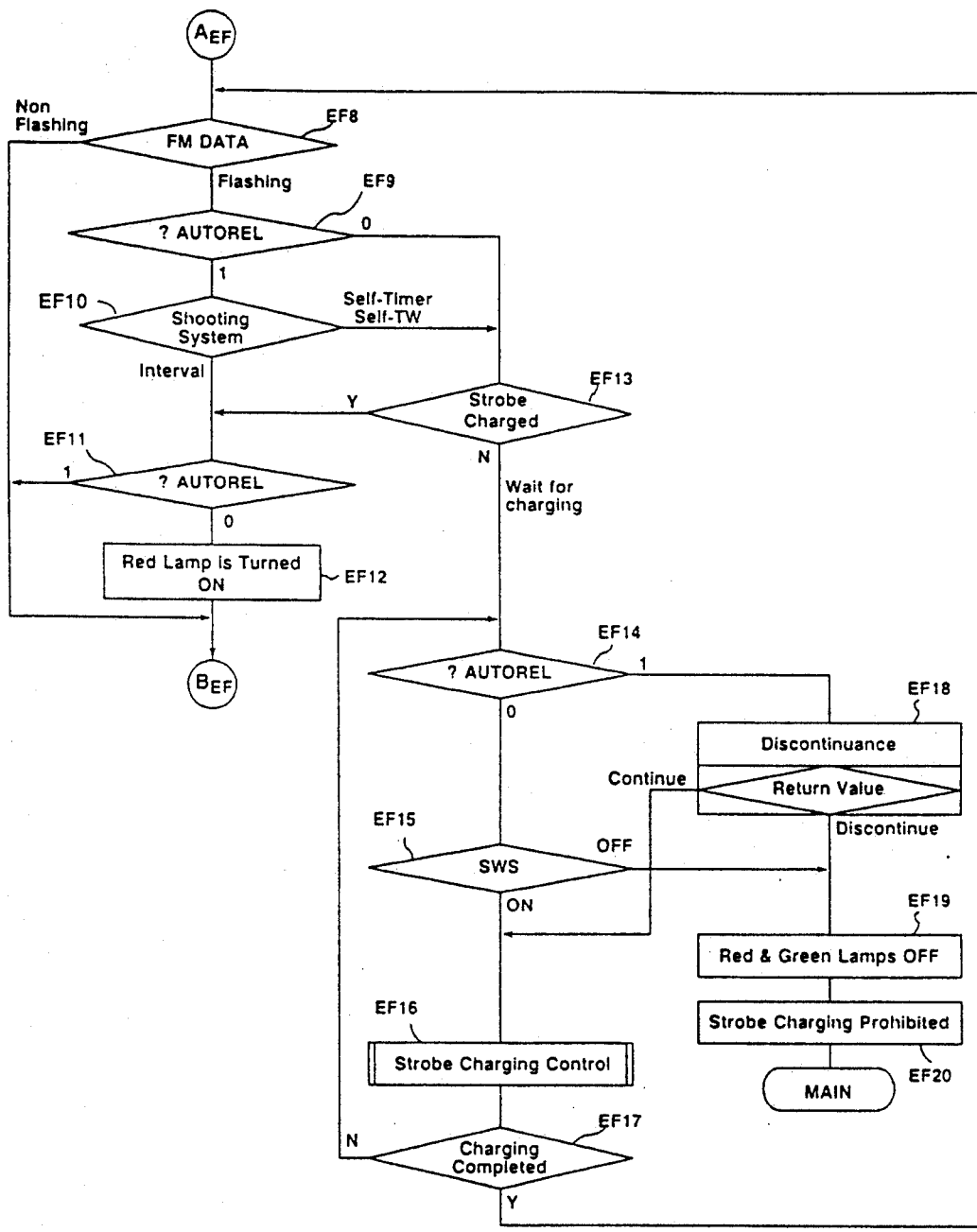
FIG. 37-B

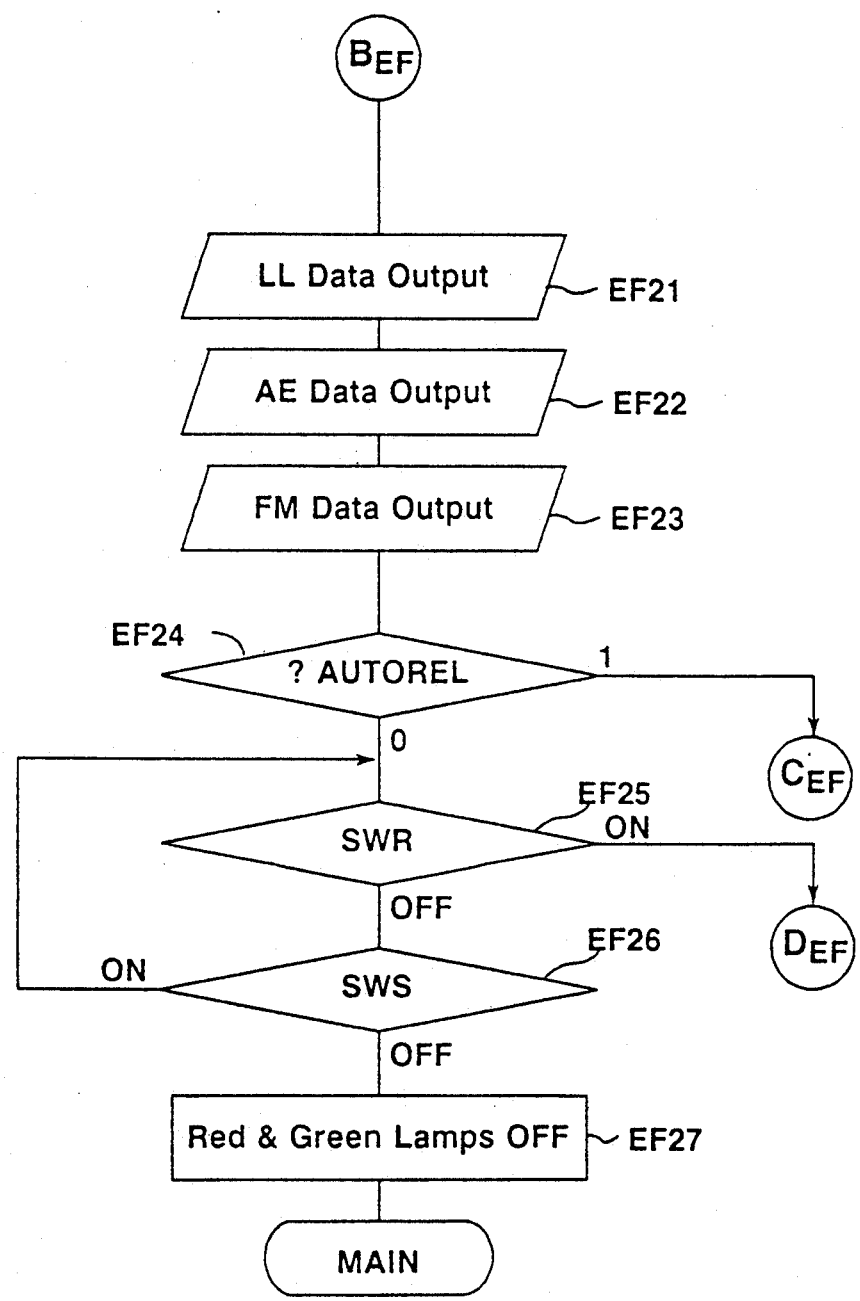
FIG. 37-C

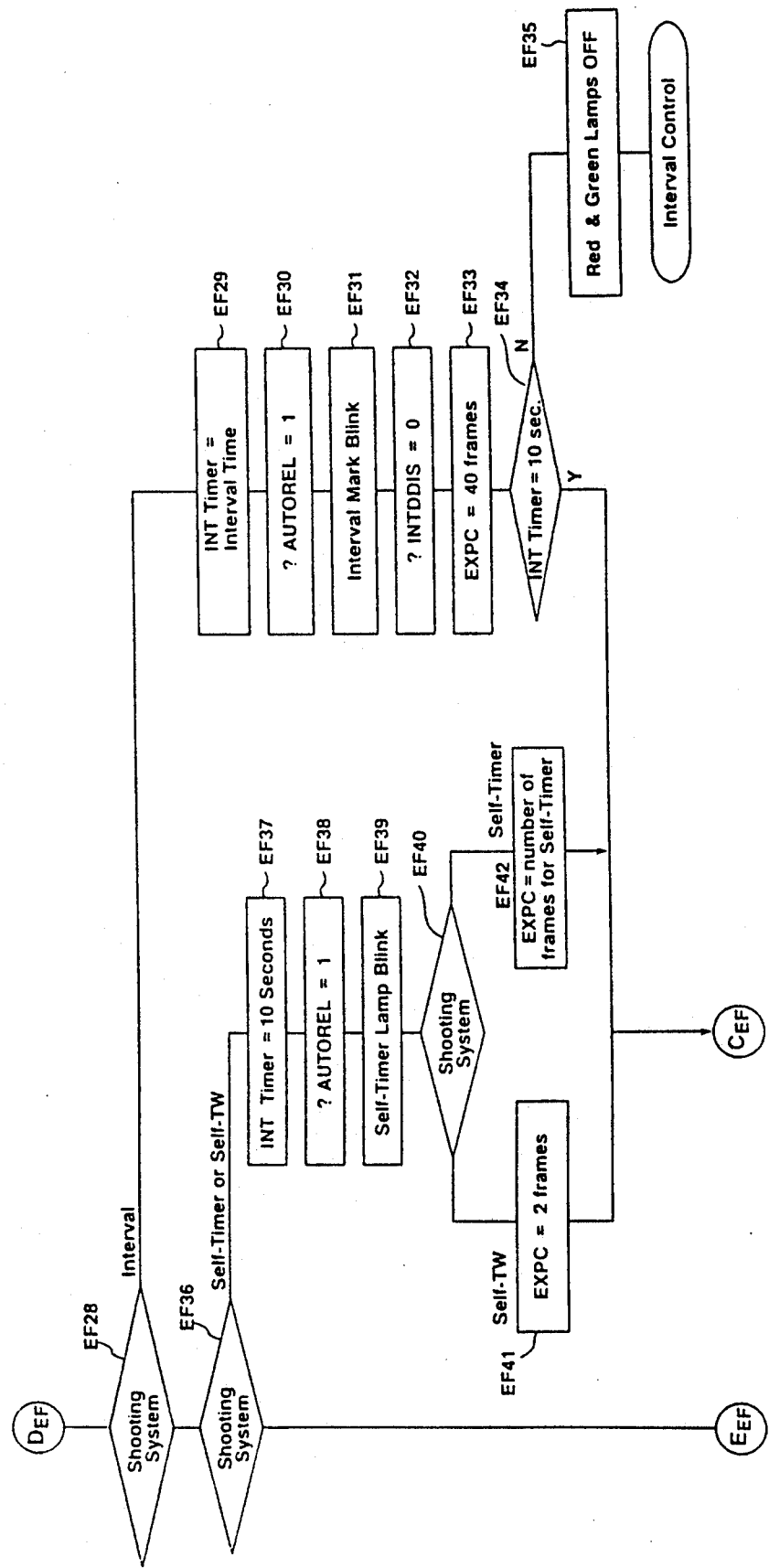
FIG. 38-A

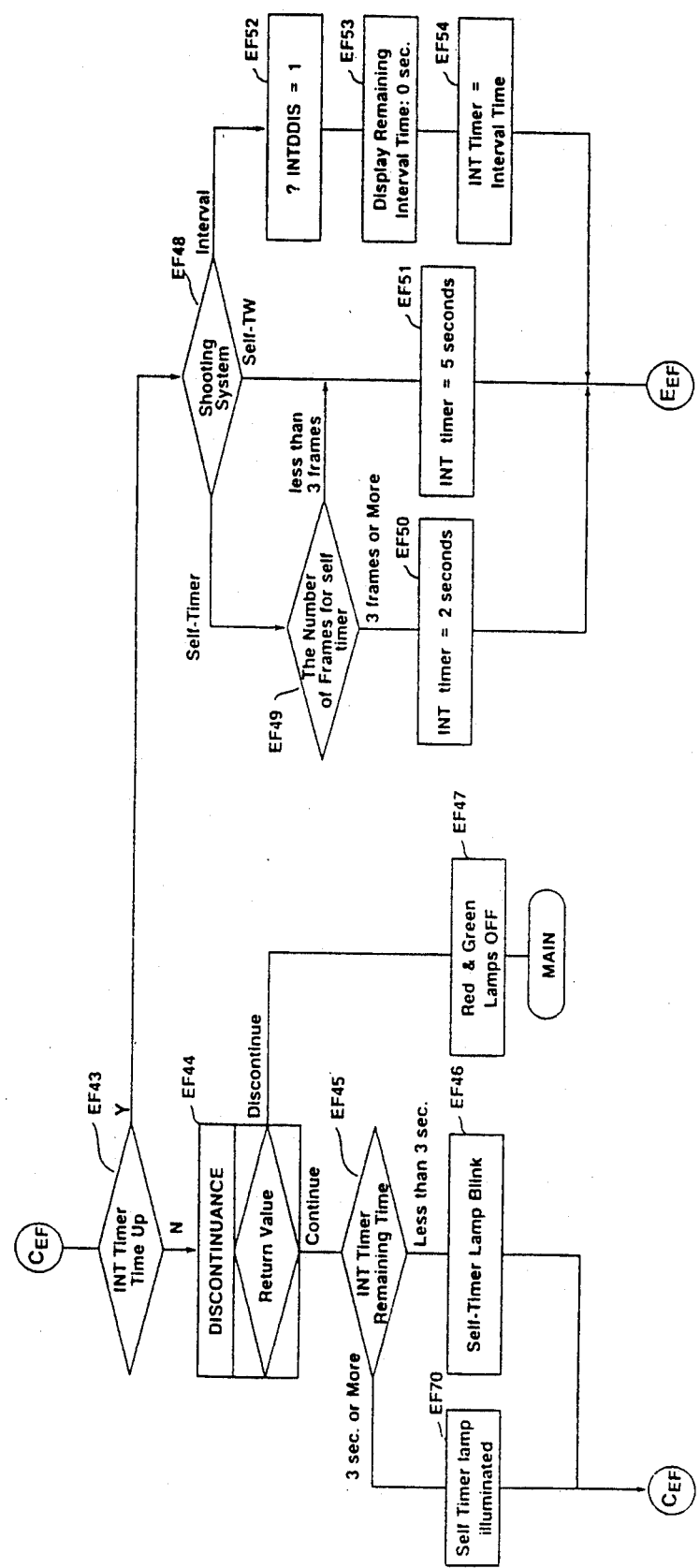
FIG. 38-B

FIG. 38-C
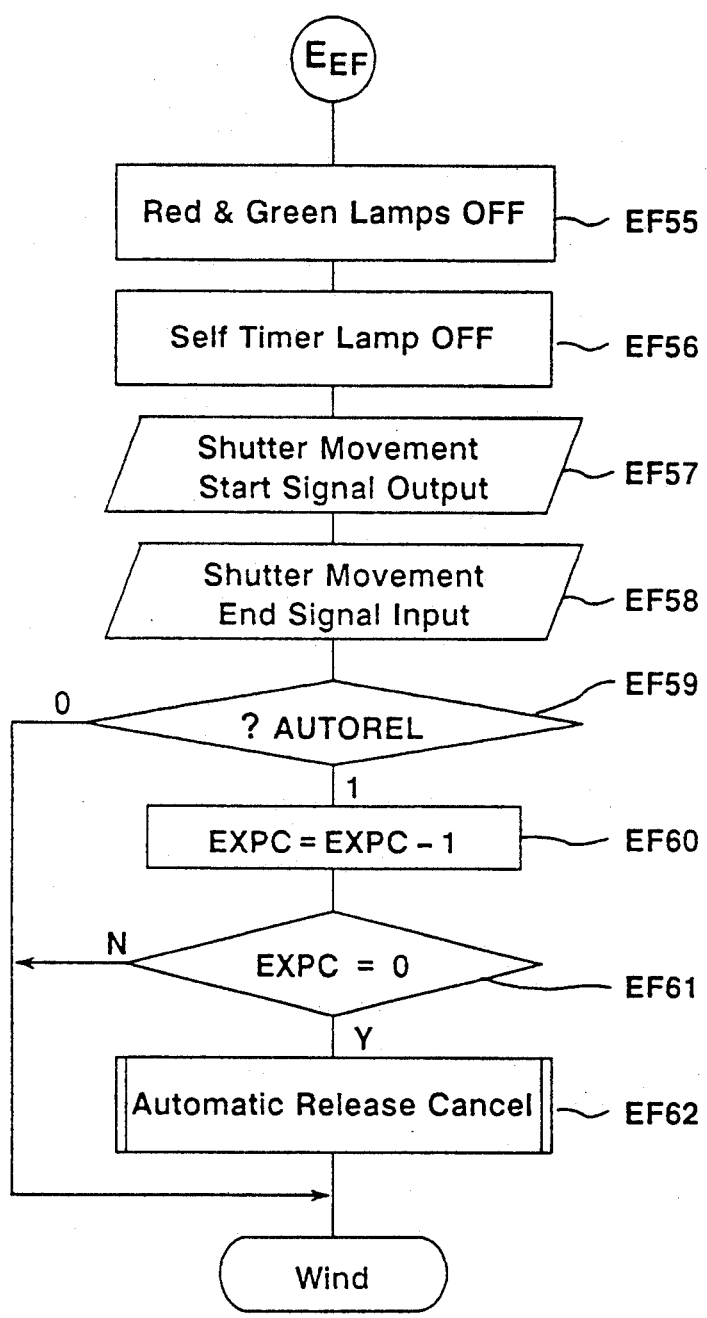

FIG. 42-A
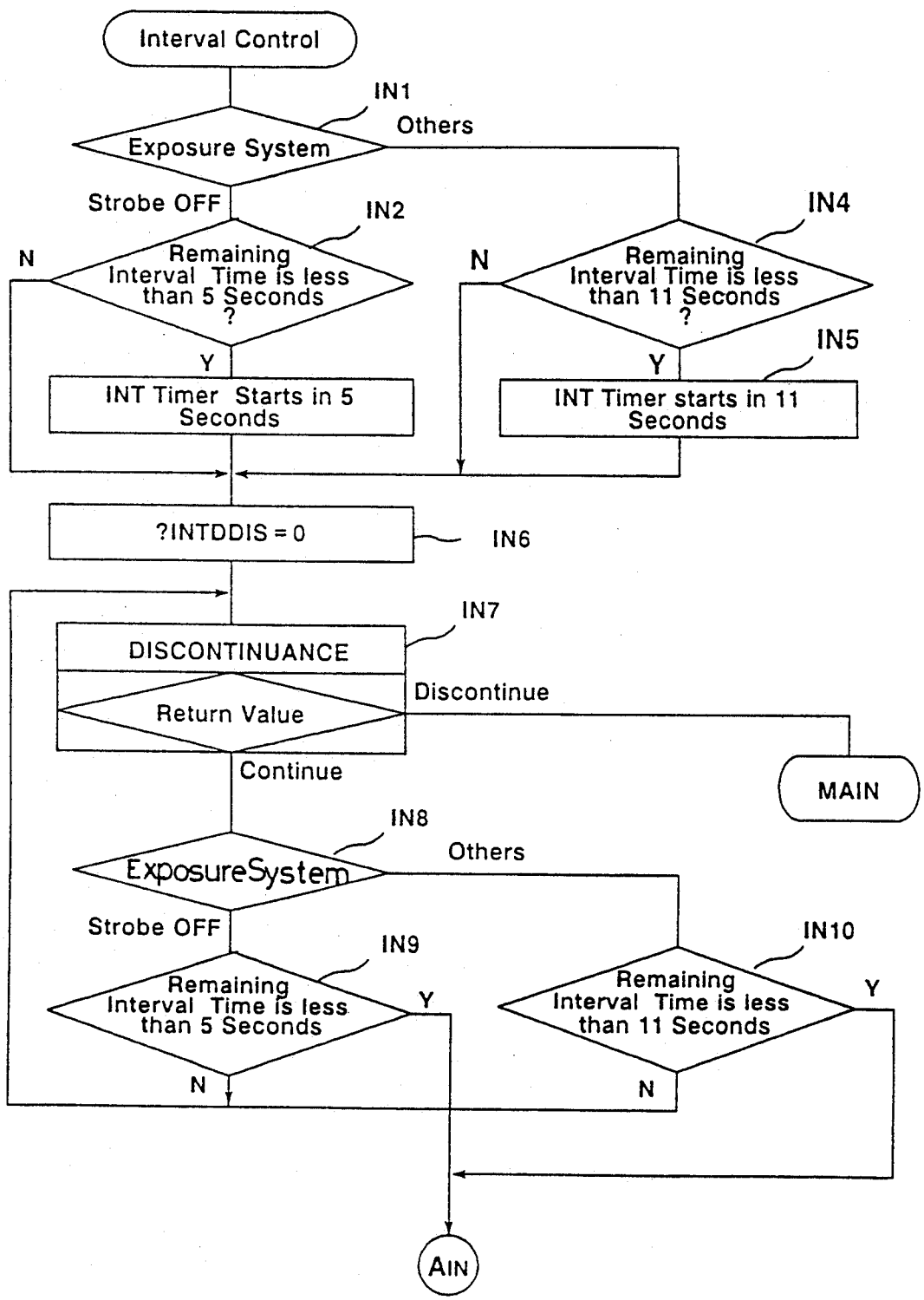

FIG. 42-B
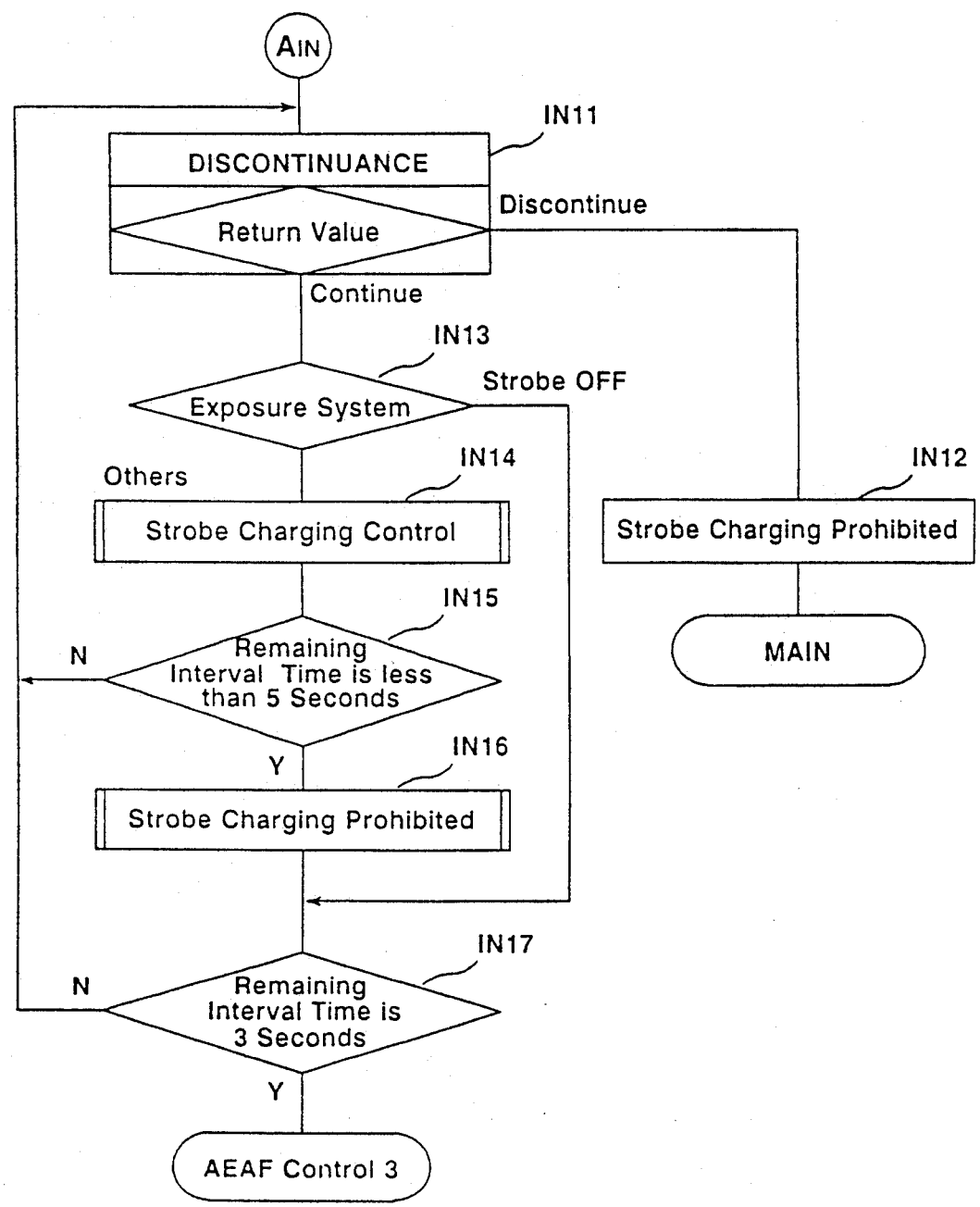

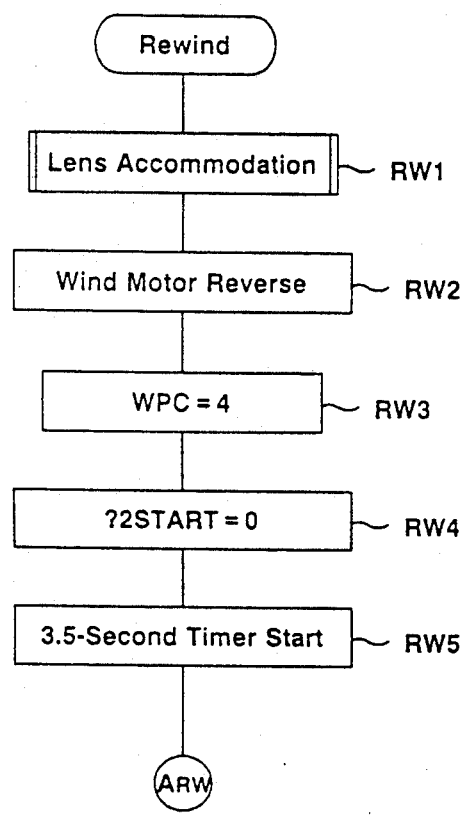
FIG. 43-A

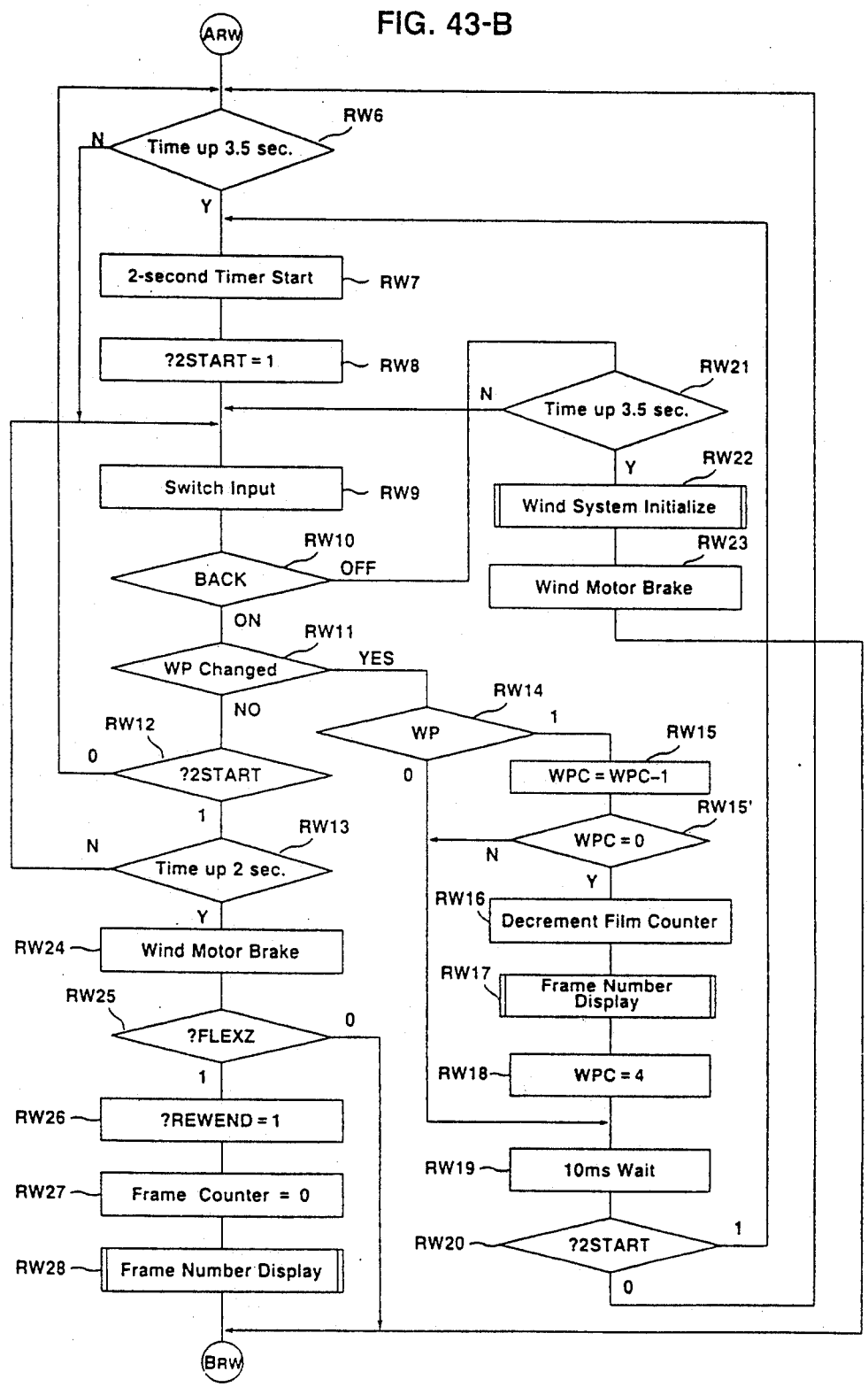
FIG. 43-B

FIG. 43-C
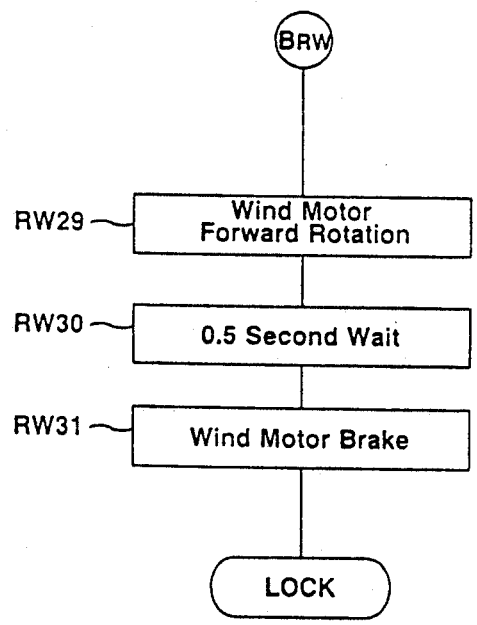

ELECTRONICALLY CONTROLLED CAMERA

BACKGROUND OF THE INVENTION

The present invention relates to an electronically controlled camera using a zoom lens.

Conventionally, in a camera provided with a zoom lens, an operating member such as a zoom lever has been used for moving the zoom lens within a zoom range in order to arbitrarily set the focal length of the lens.

In such a camera, it is difficult to accurately locate the zoom lens at the position corresponding to a desired focal length in order to obtain a desired frame composition. When the distance between the current lens position and the position corresponding to the desired focal length is relatively large, it is preferred that the zoom lens is moved fast. On the other hand, in order to adjust the lens position, the lens is preferred to be moved slowly.

In order to solve the above problem, a camera in which the moving speed of the zoom lens can be changed has been suggested. The most preferable method is that the speed of the lens movement can be controlled in response to the operating amount of the operating member. If constructed in this way, however, software as well as an electric circuit therefor becomes complicated.

Alternatively it is suggested is the method that the zoom lens be moved stepwise. In this case, the zoom lens is shifted to one of predetermined lens stop positions, and thereby the lens is accurately located at the position corresponding to the desired focal length.

SUMMARY OF THE INVENTION

It is an object of the invention to provide an electronically controlled camera in which the movement direction of the zoom lens, and one of stepwise movement and continuous movement are simultaneously instructed with a single operating member without causing the electric circuit and software necessary therefore to be complicated.

For the above object, there is provided an electronically controlled camera comprising a zoom lens which is capable of being driven to move in the direction of the optical axis of said zoom lens within a zooming area between a tele extremity and a wide extremity;

A single operation member is provided and control means are provided for driving to move the zoom lens either stepwisely or continuously in accordance with the operation of the operating member.

Optionally, the electronically controlled camera comprises determining means for determining the direction in which the zoom lens is moved in accordance with the operated direction of the operation member.

Further optionally, the control means comprise another determining means for determining the zoom lens to be moved stepwisely or continuously in accordance with the operated amount of the operation member.

Furthermore, the operation member is neutrally placed its neutral position, and is also capable of being displaced in first and second directions. The determining means determine the direction in which the zoom lens is moved in such a fashion that the zoom lens is moved to a tele side when the operation member is displaced in the first direction, while the zoom lens is moved to a wide side when the operation member is displace in the second direction.

Still further, the lens is positioned at the nearest one, in the moving direction of the zoom lens, of predetermined stop positions when the zoom lens is moved stepwisely.

Furthermore, according to another aspect of the present invention, said lens is moved stepwisely when the operation member is displaced halfway in either the first or second direction, while the lens is moved continuously when the operation member is fully displaced in either said first or second direction.

Still further, the lens is moved to the nearest stop position only when the operation member is placed its neutral position and then displaced halfway in either the first or second direction.

Furthermore, the operation member is fully displaced in either the first or second direction, the lens is kept moving continuously even though the operation member is displaced from its fully displaced position to the position where the operation member is displaced halfway.

DESCRIPTION OF THE ACCOMPANYING DRAWINGS

FIG. 6 is a table showing the relationship between the exposure systems (modes) and the displays thereof;

Figure 23:
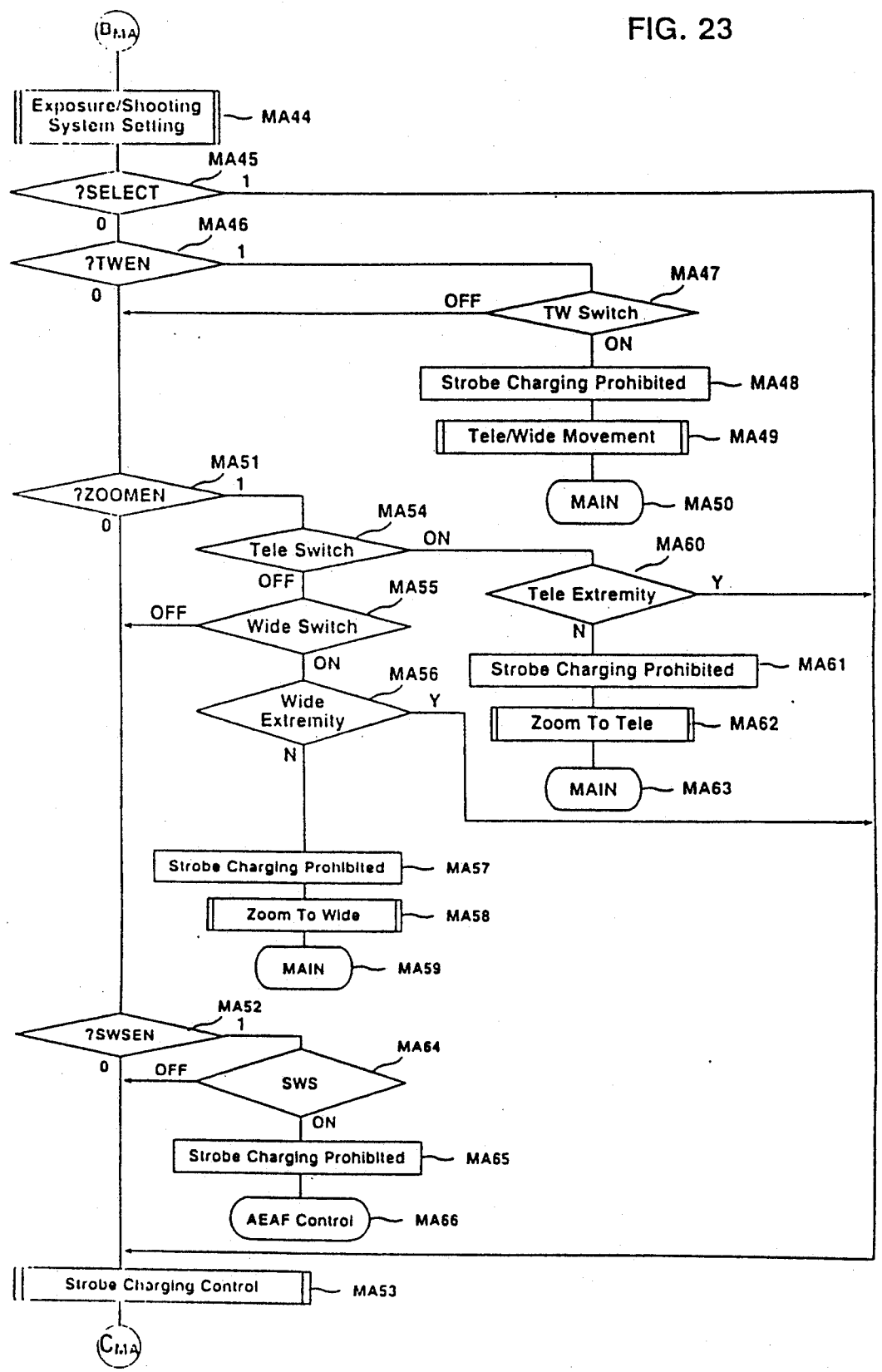
Figure 24:
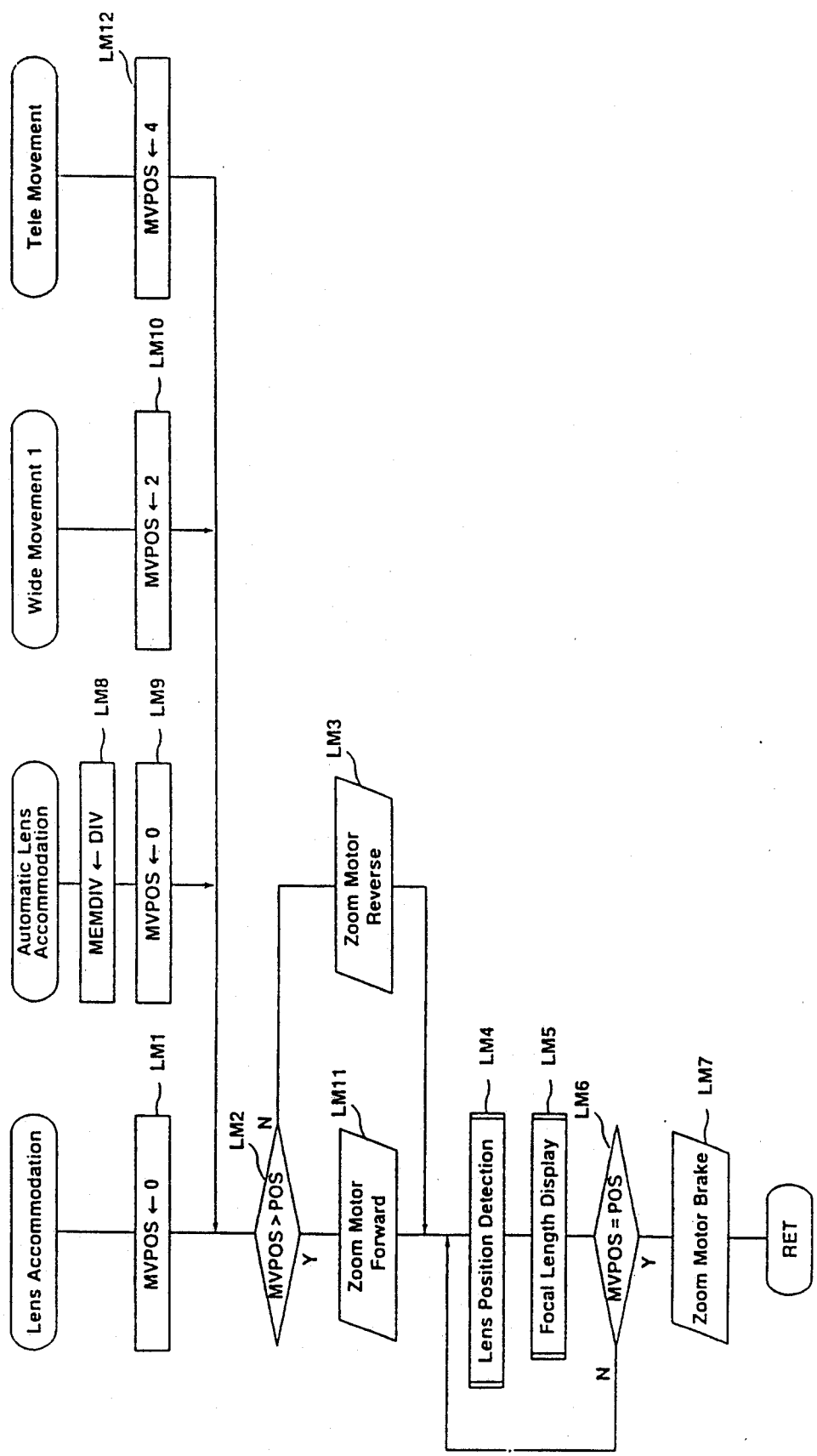
Figure 25:
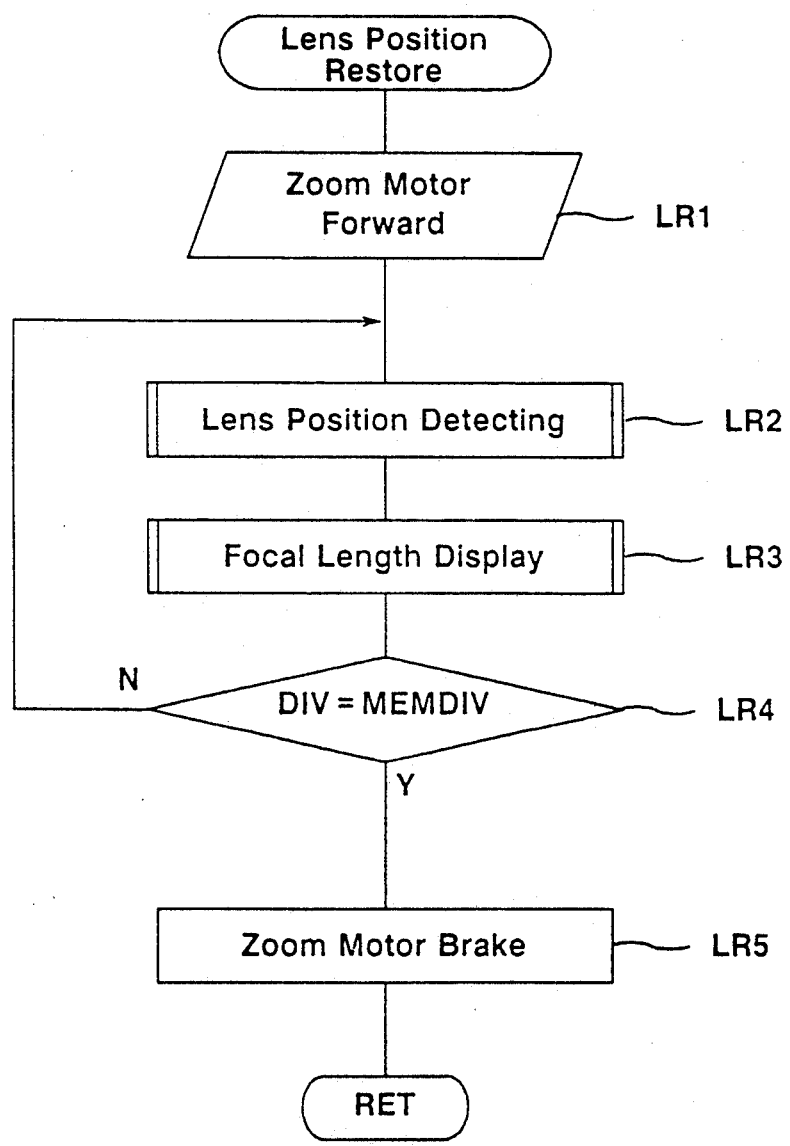
Figure 30:
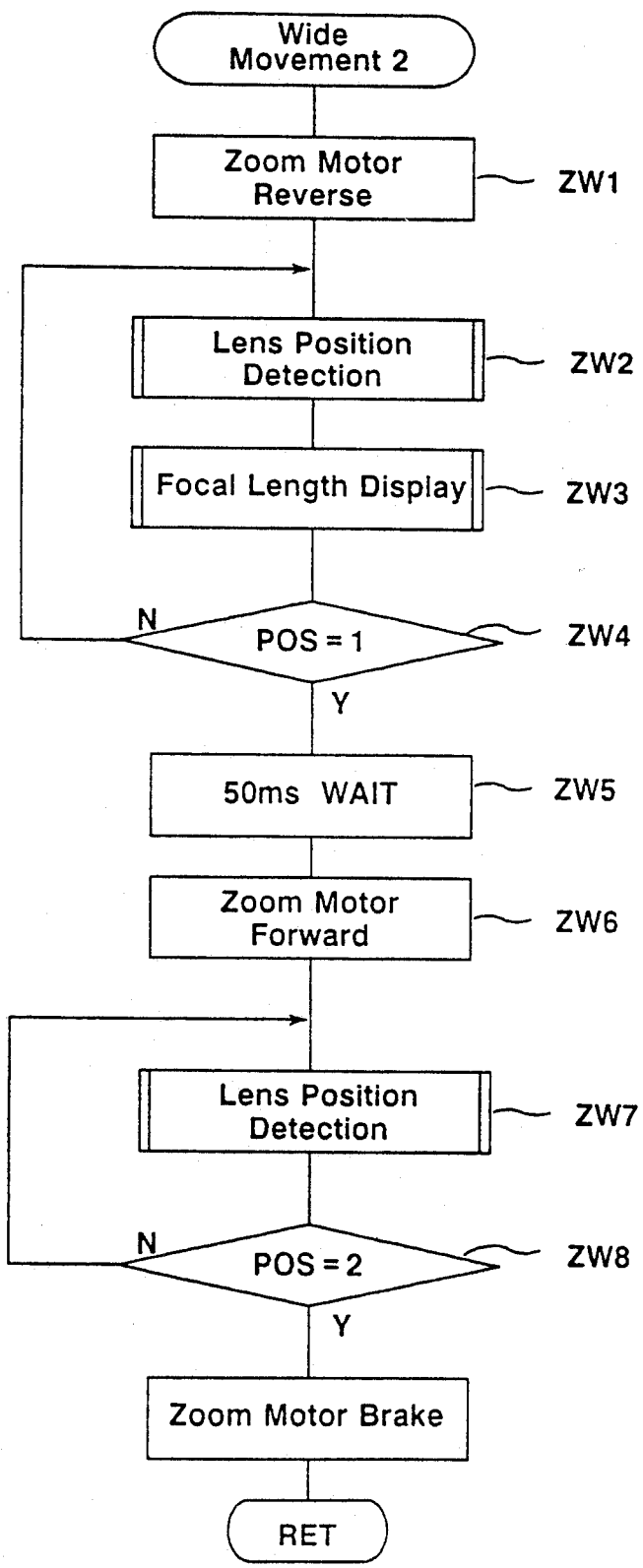
Figure 31:
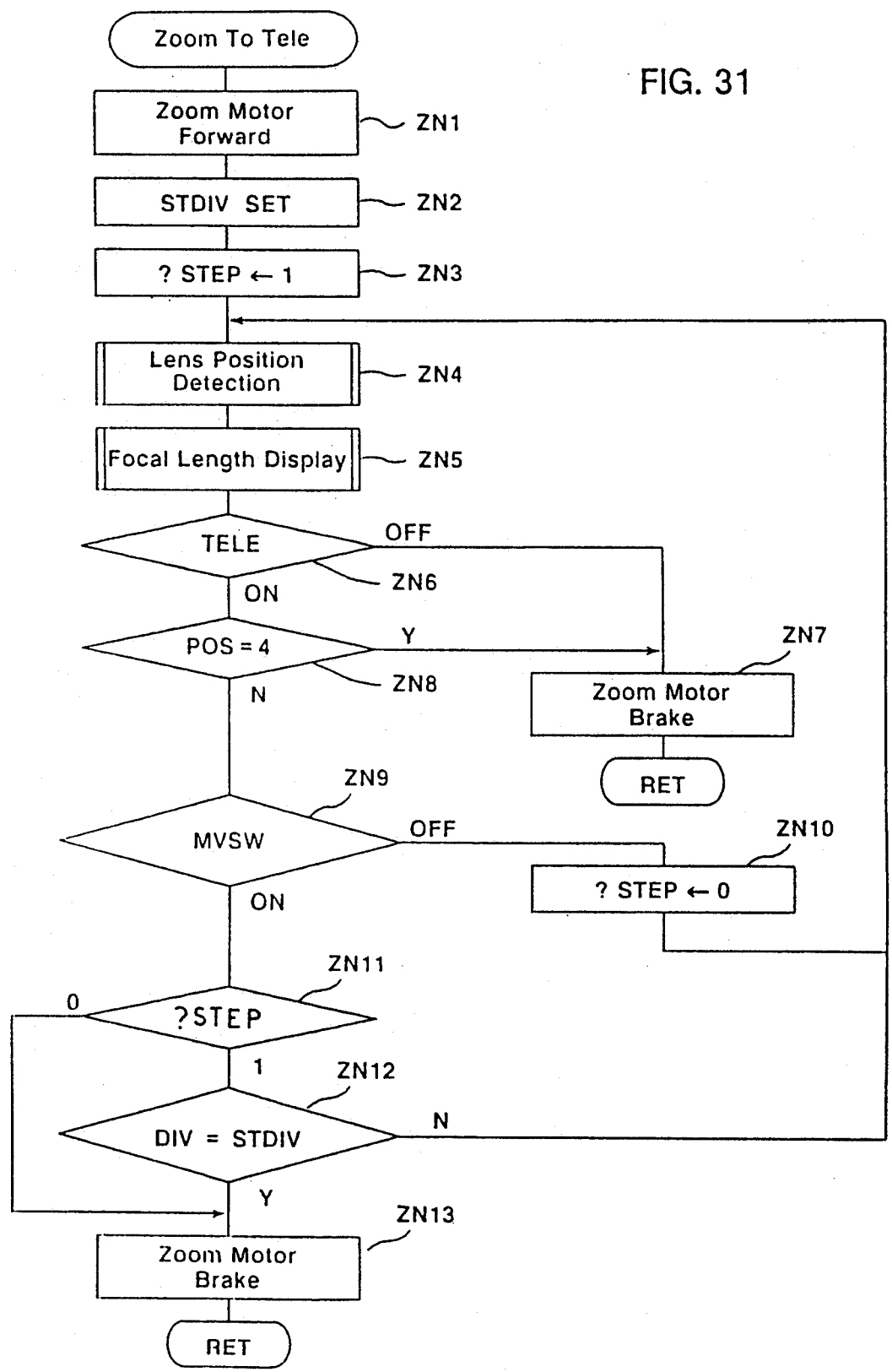
Figure 34:
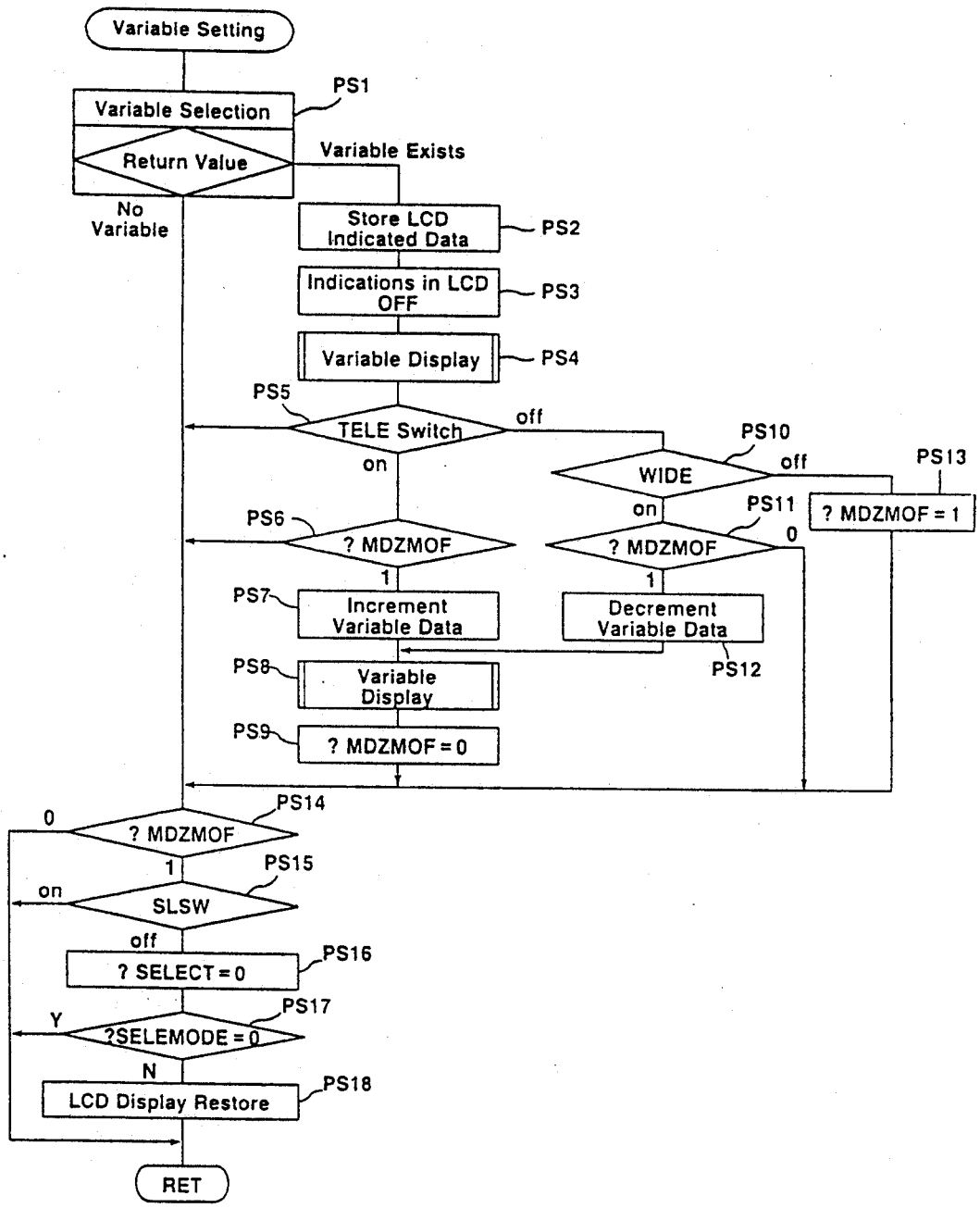
Figure 35:
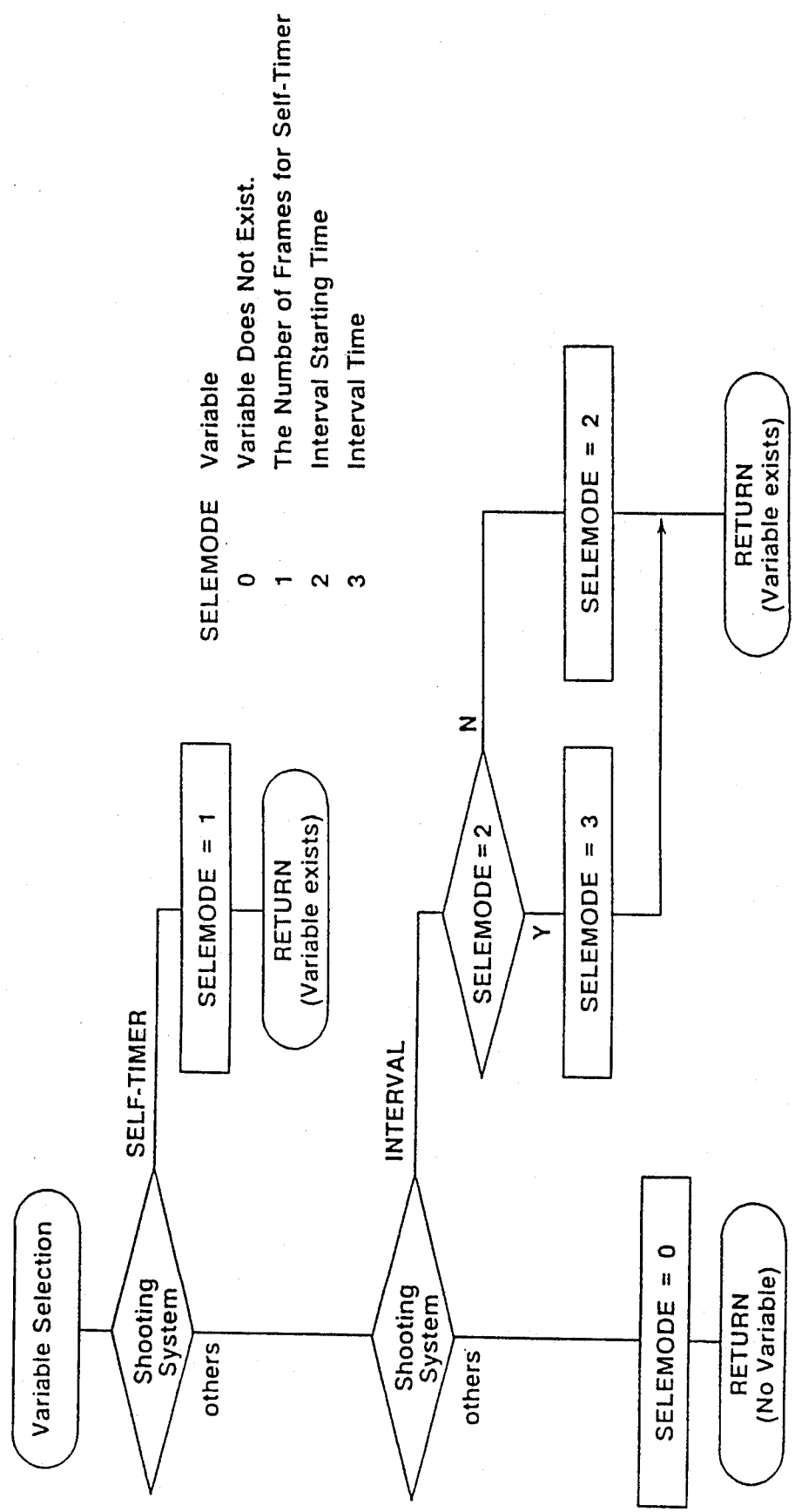
Figure 36:
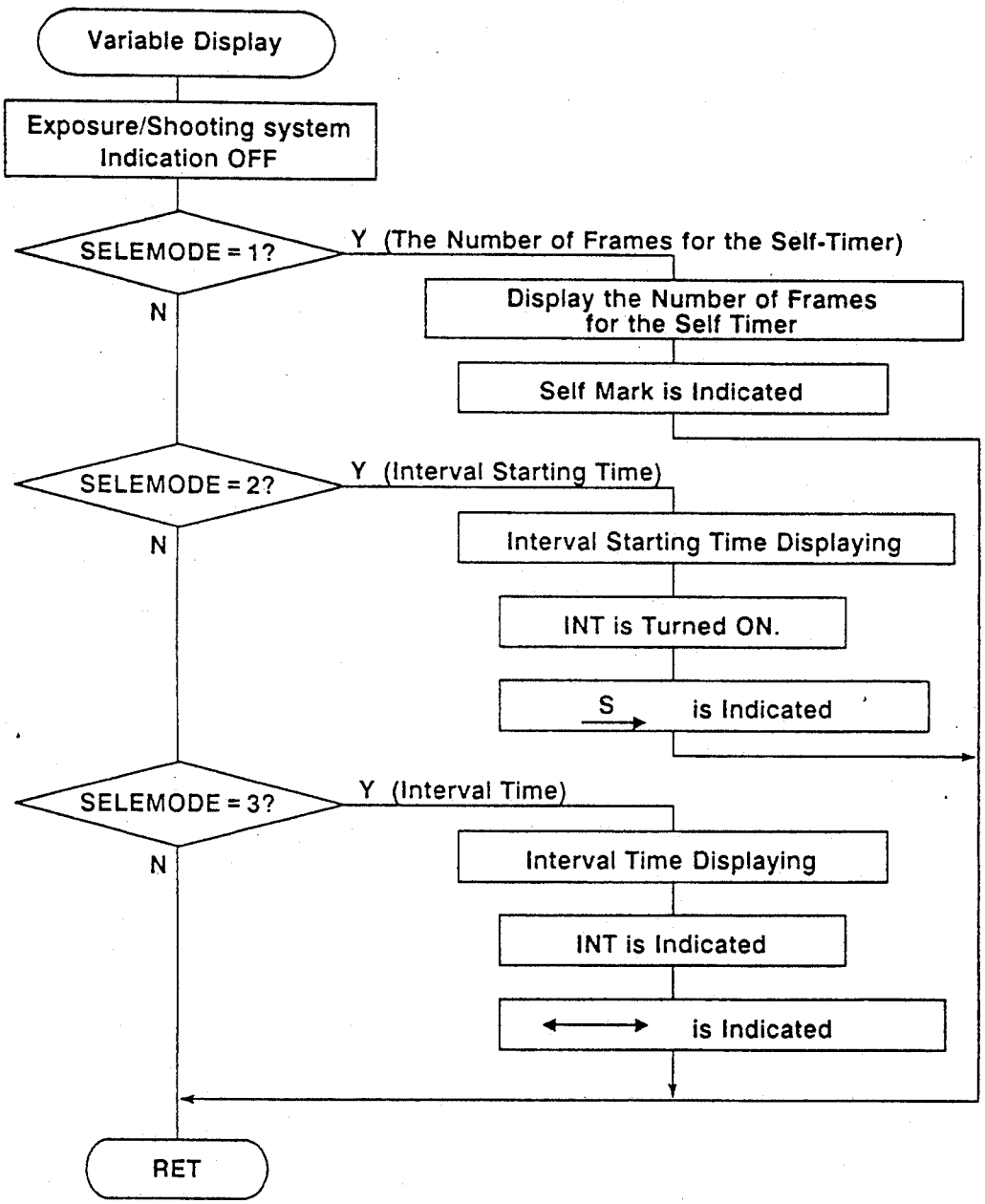
Figure 39:
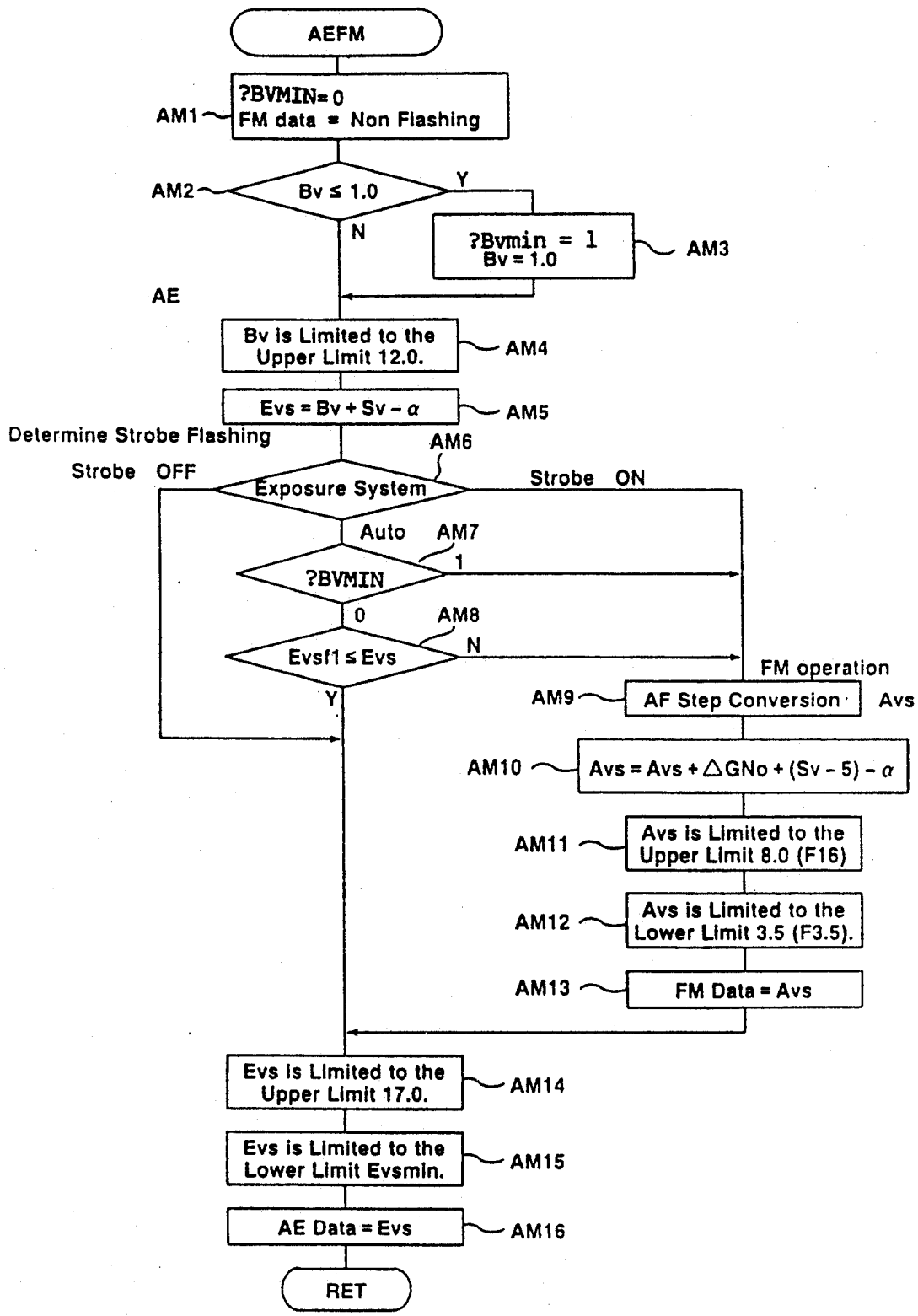
Figure 40:
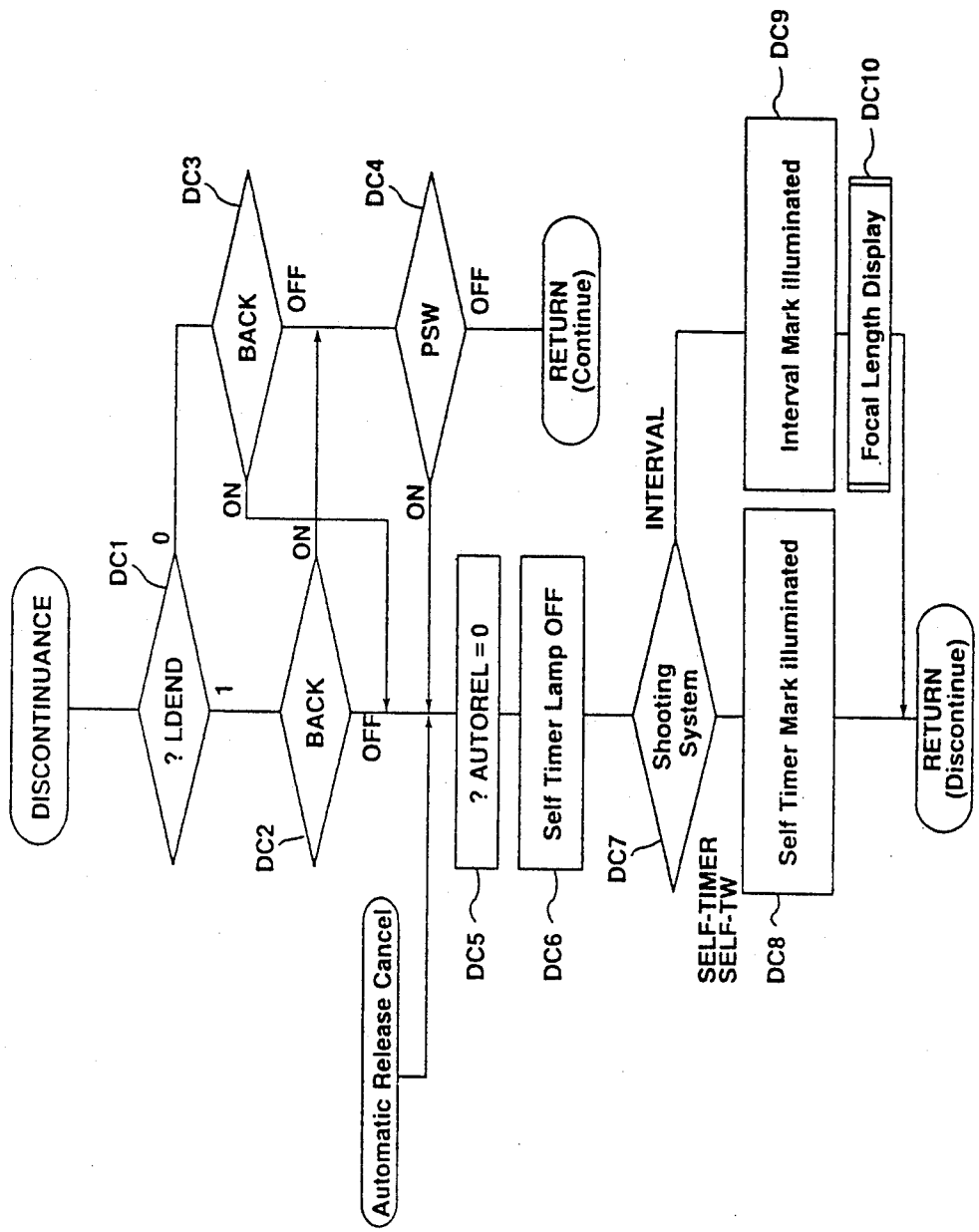
Figure 41:
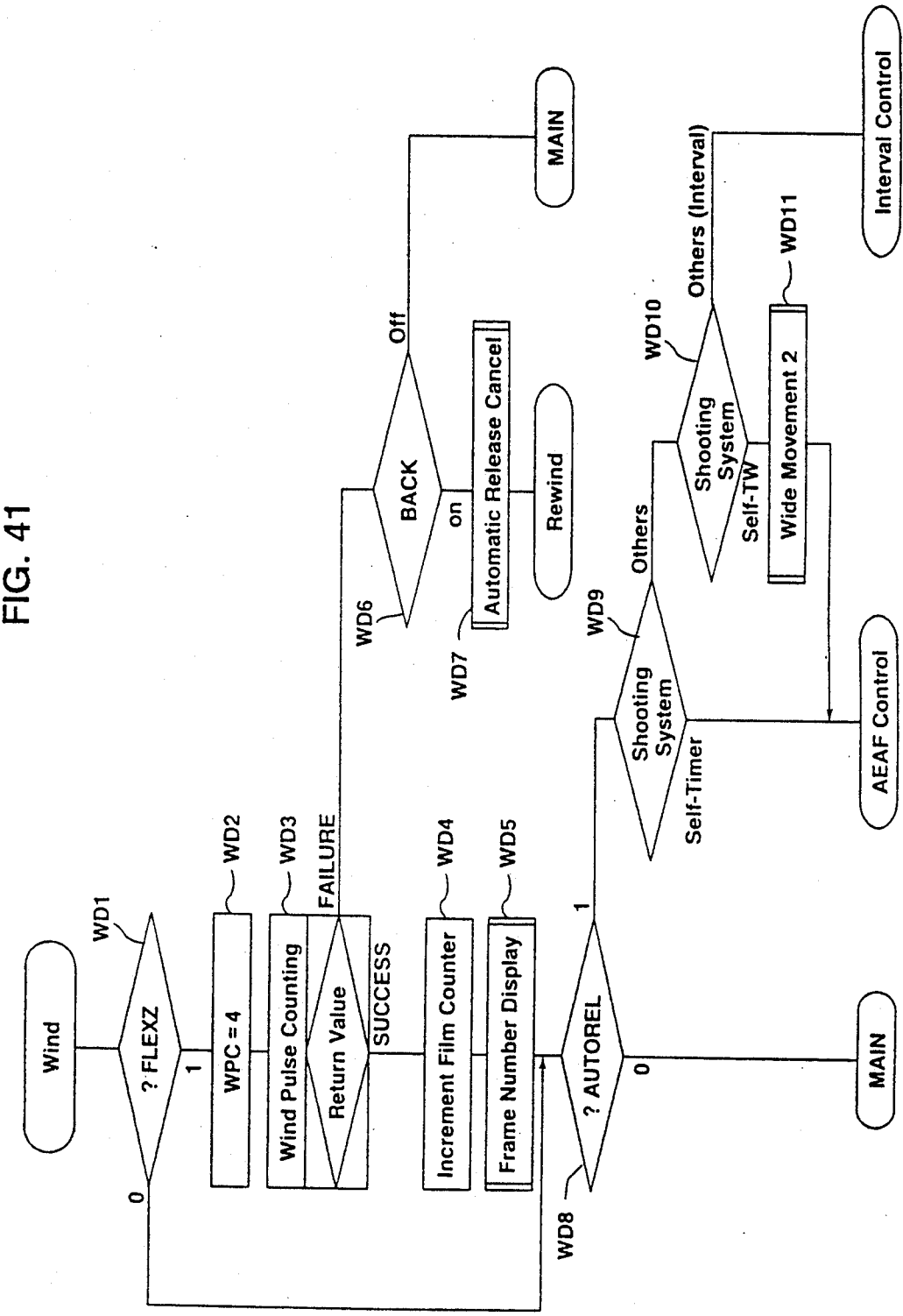

FIGS. 22-A, 22-B and FIG. 23 depict a flowchart for a MAIN processing;

FIG. 24 is a flowchart for LENS ACCOMMODATION, AUTOMATIC LENS ACCOMMODATION, WIDE MOVEMENT 1, and TELE MOVEMENT subroutines;

FIG. 25 is a flowchart for a LENS POSITION RESTORE subroutine;

FIG. 26 through FIG. 29 are flowcharts for TELE/WIDE MOVEMENT routine, and modifications thereof;

FIG. 30 is a flowchart for a WIDE MOVEMENT 2 subroutine;

FIG. 31 is a flowchart for a ZOOM TO TELE subroutine;

FIGS. 32-A and 32-B show a flowchart for a ZOOM TO WIDE subroutine;

FIGS. 33-A and 33-B are a flowchart for an EXPOSURE/SHOOTING SYSTEM SETTING subroutine;

FIG. 34 is a flowchart for a VARIABLE SETTING subroutine;

FIG. 35 is a flowchart for a VARIABLE SELECTION subroutine;

FIG. 36 is a flowchart for a VARIABLE DISPLAY subroutine;

FIGS. 37-A through 37-C, and 38-A through 38-C show a flowchart for an AEAF CONTROL routine;

FIG. 39 is a flowchart for an AEFM subroutine;

FIG. 40 is a flowchart for a DISCONTINUANCE subroutine;

FIG. 41 is a flowchart for a WIND routine;

FIGS. 42-A and 42-B show a flowchart for an INTERVAL CONTROL routine; and

FIGS. 43-A through 43-C show a flowchart for a REWIND routine.

DESCRIPTION OF THE EMBODIMENTS

Figure 1:
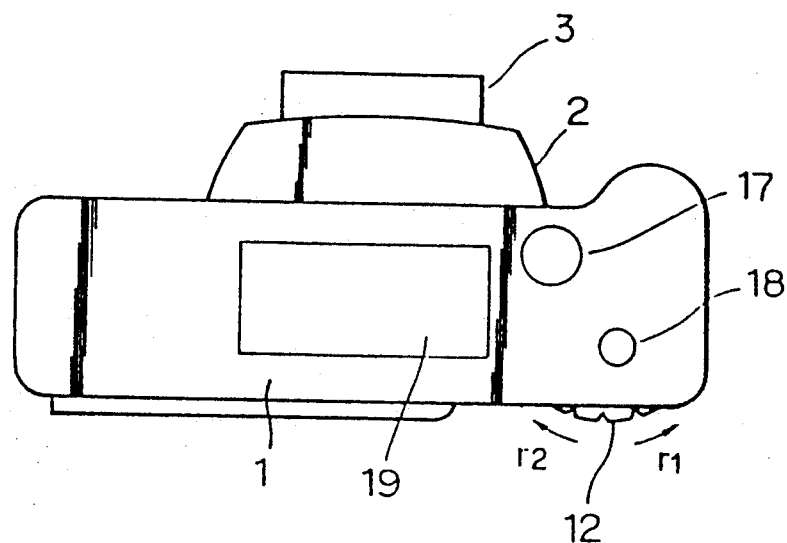
FIG. 1 illustrates the top view of an electronically controlled camera embodying the present invention.
Figure 2:
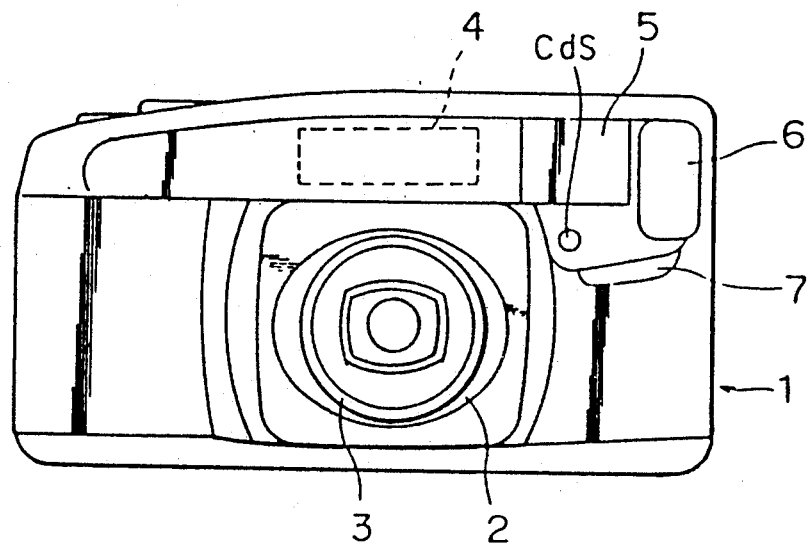
FIG. 2 illustrates the front view of the camera of FIG. 1.

As shown in FIG. 1, a camera body 1 has a stationary barrel 2 and a moving barrel 3. As shown in FIG. 2, the front of the camera body 1 contains a distance measurement section 4, a finder window 5, a zooming type strobe 6, a photometric element, such as CdS, and a self-timer lamp 7. The back of the camera body 1, a back cover 8, a mode button 9, a select button 10, a drive button 11, a zoom lever 12, a power button 13, a green lamp indicator 14, a red lamp indicator 15, and a back cover release lever 16 are provided. When the back cover 8 is moved from an upward stop position to a downward stop position, the back cover 8 opens. When the back cover 8 is opened, the back cover release lever 16 is in the downward stop position, while when the back cover 8 is closed, the back cover release lever 16 returns to its upward stop position.

As shown in FIG. 1, the upper section of the camera body 1 contains a shutter button 17, a TW button 18 and an LCD panel 19. The TW button 18 is used when appointing two opposite positions which are at mutually extreme ends of the movable range of the zoom lens.

The zoom lever 12 can be moved in the first direction, indicated by arrow r1 in FIG. 1 and a second direction, indicated by arrow r2. The zoom lever 12 permits the camera lens to be moved between a wide extremity and a tele extremity. The zoom lever 12 is used for setting the exposure system and the shooting system, which will be described later with the function of the motor button 9 and the drive button 11.

Figure 4:
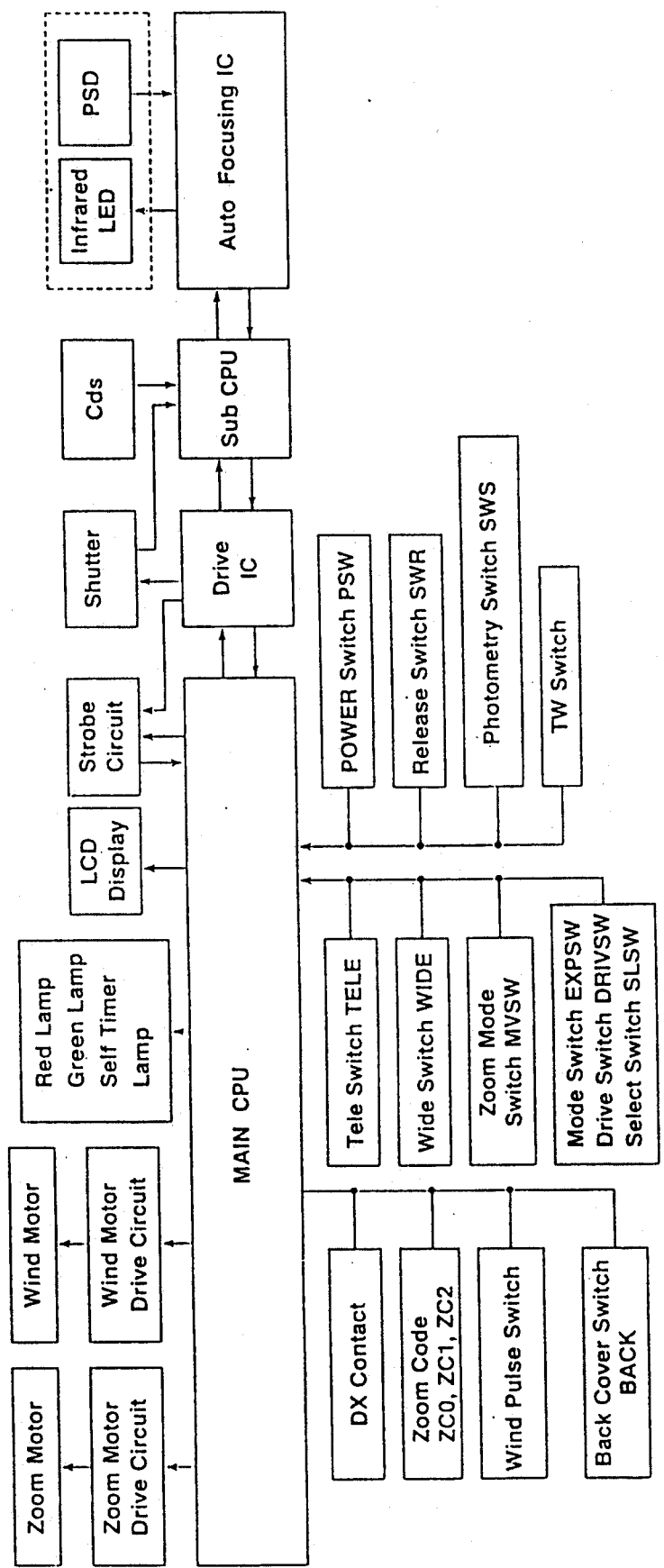
FIG. 4 is a block diagram of the control circuit of the camera.

Referring to FIG. 4, the camera contains a control circuit comprising a shutter-related processing in association with a drive IC. A single integrated circuit has been designed which contains the main CPU, sub CPU, drive IC, autofocus IC and other electronics.

The main CPU performs the following functions in response to input signals provided to the camera:

(1) Control the zoom motor and a film motor via a motor drive circuit;

(2) Control illumination and blinking (the illustration thereof is omitted in FIG. 1 through FIG. 3) of the green lamp indicator 14 which provides distance measurement-related indication, the red lamp indicator 15 which provide strobe-related indication, and the self-timer lamp 7 which provide a self-timer-related indication;

(3) Control the indication in the LCD panel 19; and (4) Control the charging of the strobe circuit. Information is inputted to the main CPU by utilizing the following elements:

(1) Power switch PSW, which is set to ON while the power button 13 is being depressed, and set to OFF when the power button 13 is not depressed. The power is supplied to the camera when the power switch is set to ON in the prohibited state of power supply, and the power supply is prohibited when the power switch is set to ON in the power supply permitted state;

(2) Photometry switch SWS, which is set to ON when the shutter button 17 is depressed halfway;

(3) Release switch SWR, which is set to ON when the shutter button 17 is being fully depressed;

(4) Zoom tele switch TELE, which is set to ON when the zoom lever 12 is displaced from a center, neutral position towards a tele side r1;

(5) Zoom wide switch WIDE, which is set to ON when the zoom lever 12 is displaced from a center, neutral position towards a wide side r2;

(6) Zoom mode switch MVSW, which indicates the movement mode of the zoom lens, that is a step movement or continuous movement. (Step movement and continuous movement are described later);

(7) Mode switch EXPSW, which is set to ON while the mode button 9 is depressed. The mode button 9 is used for setting the exposure system;

(8) Drive switch DRIVSW, which is set to ON while the drive button 11 is being depressed. The drive button 11 is used for setting the shooting system;

(9) Select switch SLSW, which is set to ON while the select button 10 is being depressed. The select button 10 is used for selecting the number of frames to be shot at the SELF-TIMER shooting, starting time of the interval shooting and the interval time, etc,;

(10) Zoom code inputs, ZC0, ZC1, and ZC2, which are referred to for controlling the lens position, displaying the focal length, etc. Further details thereof will be described later;

(11) Back cover switch BACK, which is set to OFF when the back cover release lever 16 is pressed down and set to ON when the back cover 8 is closed and the lever returns to its accommodation position; and

(12) A wind pulse switch WP for detecting the film feeding. Further details thereof will be described later.

The zoom mode switch MVSW, the zoom wide switch WIDE, and the zoom tele switch TELE will now be described in detail.

Figure 5:
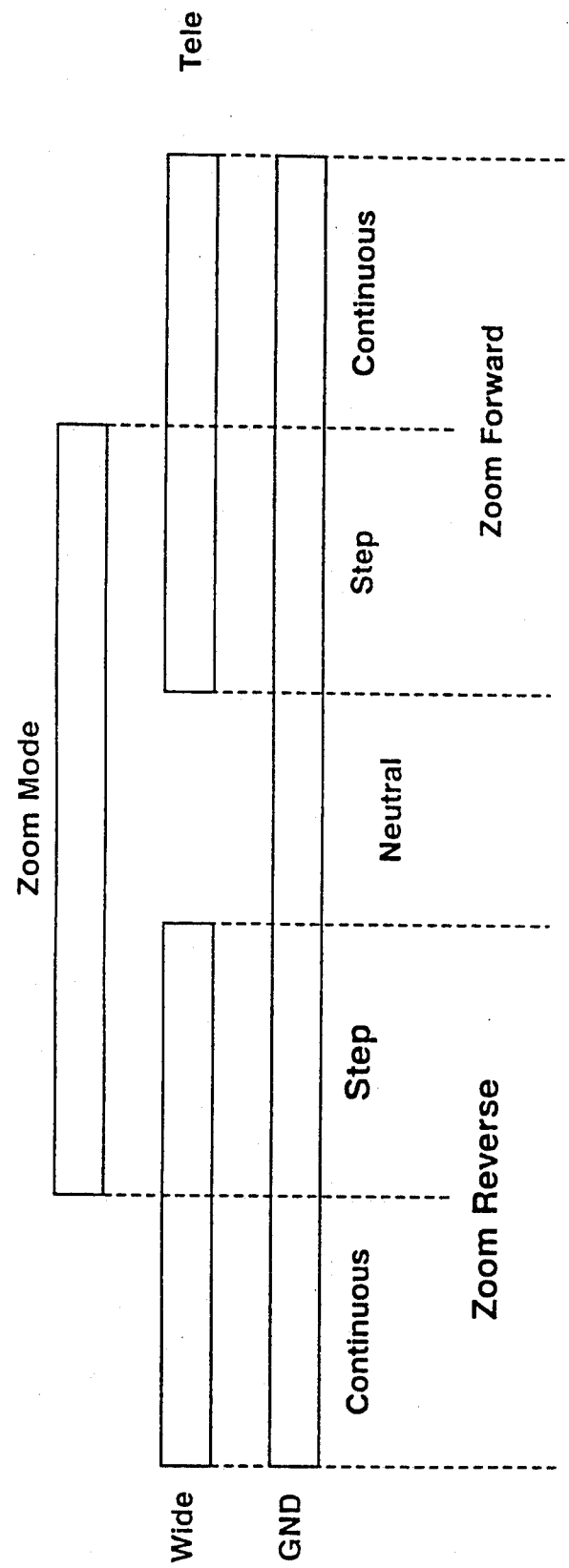
FIG. 5 is a diagrammatical view of the contact composition of a zooming switch thereof.

The zoom-related switches MVSW, WIDE, and TELE are controlled by one zoom lever, the contact point layout being shown in FIG. 5. The mechanical construction of the zoom-related switches include contacts and a brush attached to the zoom lever 12. They are described in detail below individually.

The zoom tele switch TELE is set to ON when the zoom lever is being displaced from the center position toward the first direction indicated by arrow r1 in FIG. 1, and the zoom wide switch WIDE is set to ON when the zoom lever is displaced toward the second direction indicated by arrow r2. And both the zoom wide switch WIDE and the zoom tele switch TELE are set to OFF when the zoom lever 12 is placed at the center (neutral) position.

The zoom mode switch MVSW is set to ON when the zoom lever 12 is displaced between the position halfway from its center position toward the first or second direction r1, r2. The zoom mode switch is set to OFF when the zoom lever 12 is further moved in the direction of arrows r1, and r2 from either of its halfway positions.

Step movement and continuous movement modes correspond to ON and OFF states of the zoom mode switch, respectively. With these possible switch combinations, five conditions are input to the main CPU. The data is used for the zoom operation or the shooting system and the exposure system settings. For instance, referring back to FIG. 4, when performing the zoom operation, information for the forward/reverse rotation of the zoom motor, and the step/continuous movement of the zoom lens are input to the main CPU.

The sub CPU controls a range finder, which comprises the infrared LED and a position sensor PSD through an autofocus IC, and transmits the distance measurement data from the autofocus IC and the photometry data from the CdS to the main CPU.

The drive IC controls the shutter circuit according to commands from the sub CPU, and outputs a trigger signal to the strobe circuit.

The mode button 9 (FIG. 3) is operated for setting the exposure system. As shown in FIG. 6, the following three exposure systems are available: auto (Strobe automatic flashing mode); strobe ON (Strobe forcedly flashing mode); and strobe OFF (strobe flashing prohibit mode). FIG. 6 shows the indication marks corresponding to each of above-said three exposure systems. In the case of AUTO, no indication is provided on the display. A counter EXPMODE (hereinafter merely called "EXPMODE") is provided in correspondence with the exposure systems. EXPMODE values of "$0_H$", "$1_H$" and "$2_H$" correspond to AUTO, strobe ON, and strobe OFF, respectively. By operating the mode button 9, the value of the EXPMODE is changed.

Figures 3, 7:
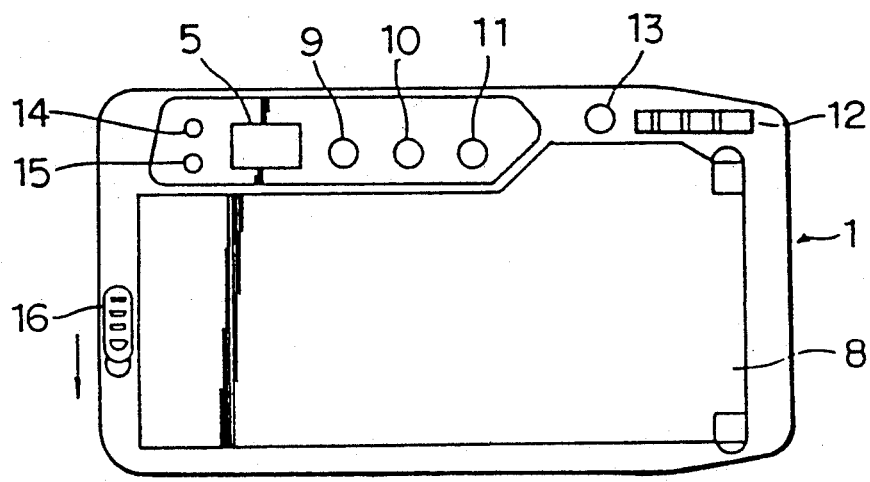
FIG. 3 illustrates the rear view of the camera of FIG. 1.
FIG. 7 is a table showing the relationship between the shooting systems (modes) and the displays thereof.

The drive button 11 (FIG. 3) is operated for setting the shooting systems. As shown in FIG. 7, the following five kinds of shooting modes are prepared: FRAME-BY-FRAME shooting mode, SELF-TIMER mode, SELF-TW (tele/wide) mode, INTERVAL mode, and FORCED REWIND mode. FIG. 7 also shows the indication corresponding to each of above five shooting modes. No indication is provided for FRAME-BY-FRAME shooting mode. A counter DRIVEMODE (hereinafter merely called "DRIVEMODE") is provided, and DRIVEMODE counted values of "$0000_B$", "$0001_B$", "$0010_B$", "$0011_B$", "$1***_B$" correspond to the FRAME-BY-FRAME mode, the SELF-TIMER mode, the SELF-TW mode, the INTERVAL mode, and the FORCED REWIND mode, respectively. In the FORCED REWIND mode, the mark "*" of "$1***_B$" is replaced with either 1 or 0. The SELF-TW mode is described later.

The DRIVEMODE is changed between "0" and "1" when the drive button 11 is depressed. Indication corresponding to EXPMODE and DRIVEMODE counter values is displayed in the LCD panel 19, and the shooting is controlled in accordance therewith. Still more, if the drive button 11 is kept on being depressed for more than three seconds, the shooting system is set to the forced rewind mode.

In the INTERVAL mode, both the interval starting time and the period of interval can be set. In the camera of this embodiment, the interval starting time is set by a relative time, that is, the starting time of the interval shooting is set by a period of time (minutes, seconds, or hours) from the time when it is set. The interval time is the time between a shot and the succeeding shot. In the SELF-TIMER mode, five kinds of numbers of frames for the SELF-TIMER are provided. SELF-TW is a mode in which two shootings are executed: the first shooting is executed with the zoom lens being located at the desired position, and the second shooting is executed with the lens at the wide extremity.

Next, the details of marks displayed in the LCD panel 19 are described with reference to FIG. 8. The exposure system mark and the shooting system mark are displayed when the mode button 9 and drive button 11 are depressed, respectively. As the meanings of each of the marks has been already described, the remaining marks are described below.

Figure 8:
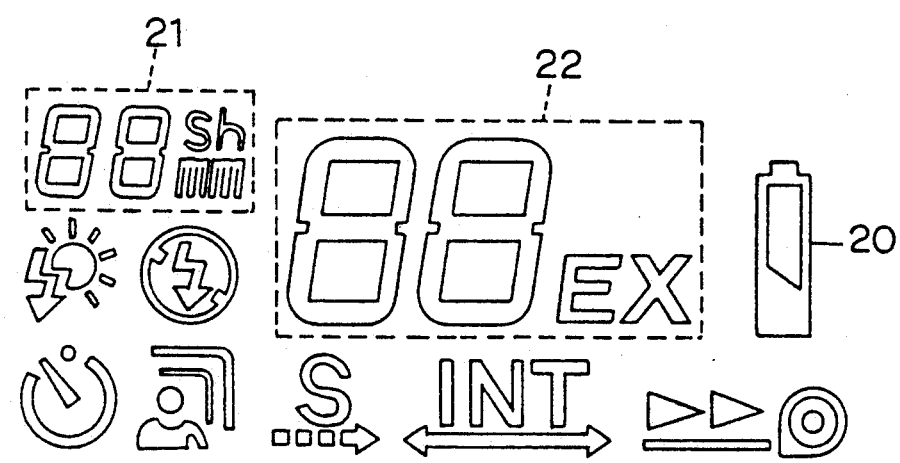
FIG. 8 is a diagrammatical view of segments of an LCD panel.

In FIG. 8, the mark "INT" is illuminated when the shooting system is set to the interval mode. The mark "←→" below the "INT" is shown when the interval time is being set. The mark "S" at the left side of "INT" is displayed when the interval starting time is being set. Simultaneously, the mark "→" which is located below "S" is also displayed. A battery mark 20 is displayed when the battery of the camera is discharged. Segment displaying area 21 indicates the focal length, the interval starting time, and the interval time. The unit mark "mm" is shown when the focal length of the zoom lens is displayed. The unit marks "s", "m" and "h", which respectively corresponds to "second", "minute", and "hour", are illuminated when the period of time in the INTERVAL shooting mode is set. In this case, segments are commonly used for "m" and "mm". The "s", "m", and "h", are selectively illuminated according to the selected period of time. Segment displaying area 22 is illuminated for indicating the frame number, the mark "EX" being the unit mark of the frame number.

Figure 9:
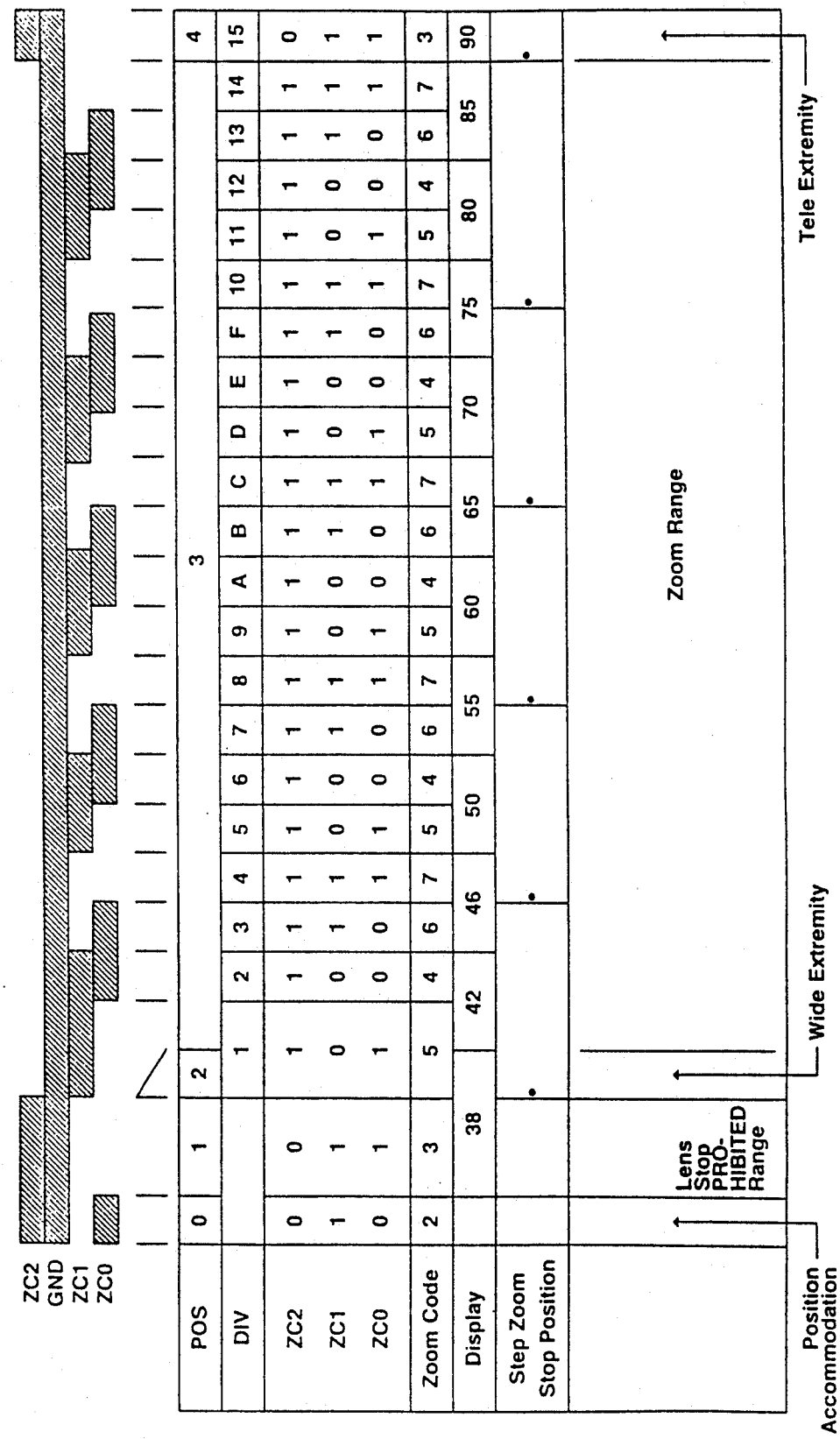
FIG. 9 is the developed view of a code plate and a table showing the relationship between the code plate and the codes.

FIG. 9 shows a diagram of the zoom code inputs. The zoom code plate constitutes a part of the zoom lens barrel and has such a pattern as shown in FIG. 9. The oblique-lined portions of the zoom code plate constitute contacts, where four brushes contact the code plate. The brush located at GND is grounded, thereby GND is used as a common terminal while the other three brushes are used for code detection. The codes ZC0, ZC1 and ZC2 are set to "0", when each brush contacts the respective terminals of the code plate, while the codes are set to "1" when the brushes do not contact the respective terminals of the code plate. In this description, a three-bit information code detected by the continuity relation of these terminals is known as a zoom code ZCODE.

A position code POS and a division code DIV are defined according to the above-mentioned zoom code ZCODE so as to control zooming.

The position code POS is used to distinguish five conditions of the photographing lens in the position, that is, POS is set to "0" when the lens is located at the accommodation position; POS is set to "1" when the lens is in the lens stop prohibited range between the wide extremity and the accommodation position; POS is set to "2" when the lens is located at the wide extremity; POS is set to 4 when the lens is located at the tele extremity; and POS is set to "3" when the lens is located in the position between the wide extremity and the tele extremity in the zoom area. The division code DIV is used for identifying the lens position by dividing the zoom area into 21 areas. The DIV in the figure is shown with the hexadecimal number system.

In FIG. 9, the wide extremity (POS equals to "2") is shown with a fixed width. However, this portion is a point having no width, namely, POS equaling "2" is obtained only when the lens is at the wide extremity. As well, POS equaling "4" is obtained only when the lens is at the tele extremity. The contact ZC2 is utilized for detecting the wide extremity and the tele extremity.

On the other hand, since the zoom area has 21 divisions corresponding to the focal length of the photographing lens as mentioned above, it is necessary to identify twenty steps only with two bits. In this example, the configuration of relative codes, in which the zoom codes "5", "4", "6", and "7" are repeatedly adopted corresponding to division code DIV of "$1_H$" through "$14_H$".

When such a configuration as above is employed, it is impossible to identify one division code corresponding to the focal length of the lens only by the zoom code ZCODE. The current division code can be identified by rewriting the division codes stored in the memory by detecting a relative position with respect to the lens accommodation position based on the detection of the changes of the zoom code ZCODE.

Moreover, the focal length indication covers the range from 38 mm through 90 mm corresponding to each of the divided areas as shown in FIG. 9.

In FIG. 9, the stop position of the lens when the zoom lens is moved under the step zoom movement condition is indicated by a dot "•" The lens stop positions in the step movement are selected such that in each of the positions, the indication of the focal length of the lens is not changed when the lens movement is controlled so as that a mechanical backlash is eliminated.

Namely, in the camera embodying the present invention, the zoom motor is forwardly rotated 1 before being stopped in order to eliminate backlashes of the mechanical system when the reverse rotation of the zoom motor is stopped. A photographer may feel a sense of incongruity if the display of focal length is changed from a short focal length to a long focal length in this forward rotation. Therefore, the stop positions under step movement condition are selected as above.

Figure 10:
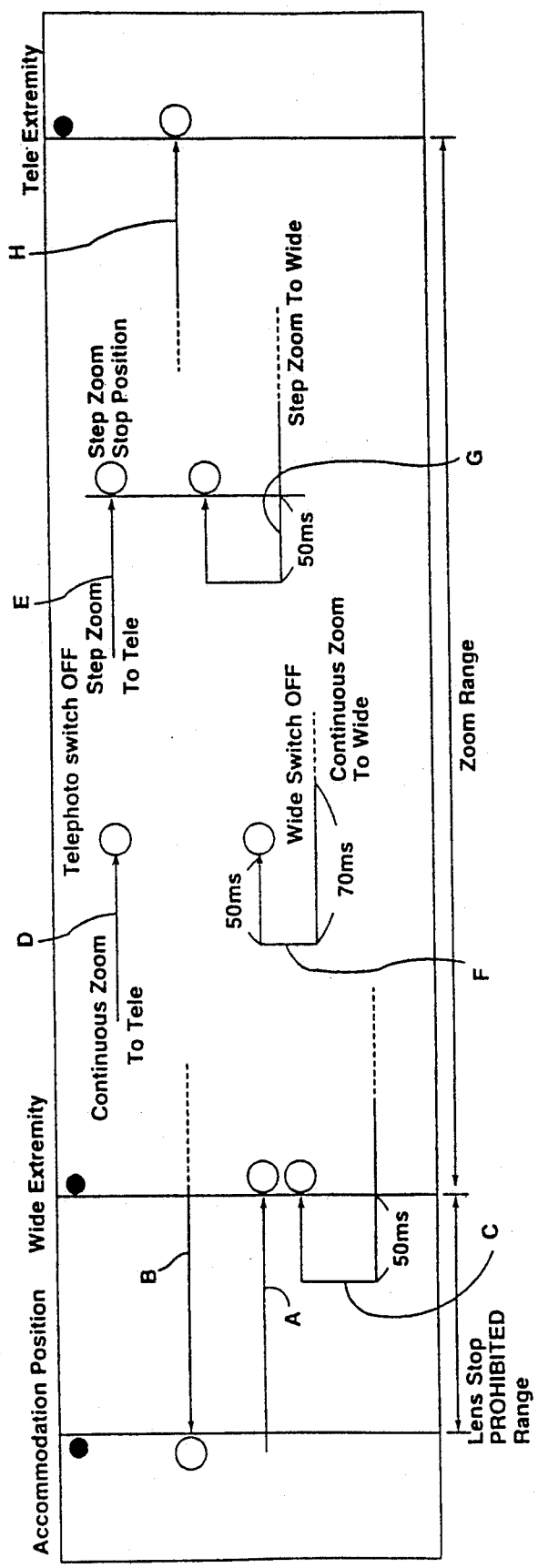
FIG. 10 is a diagrammatical view showing an example of the zooming operation.

The movement of the zoom lens is described with reference to FIG. 10.

If the power is supplied when the lens is located in its accommodation position, the zoom motor rotates in the forward direction and the lens moves toward the wide extremity as indicted with an arrow "A".

When the power supply is stopped with the lens being located in the zoom area, the zoom motor is reversed, and thereby the lens is moved as indicated with an arrow "B" and accommodated in the accommodation position. In this case, it is not necessary to eliminate the backlash.

When the wide extremity is selected with the TW button 18, for example, the zoom motor is reversed to move the lens until the lens goes beyond the wide extremity, and then, the lens is further driven by 50 ms (milliseconds) in the same direction although the wide extremity is detected. And after 50 ms has passed, the zoom motor is forwardly rotated, thereby the zoom lens is caused to stop at the wide extremity as indicated with arrow "C".

In the case of the continuous movement, when the zoom tele switch TELE is set to ON, the lens is driven until the zoom tele switch TELE is set to OFF as indicated with an arrow "D". In the case of step movement, the zoom motor is forwardly rotated, thereby causing the lens to come to the next stop position as shown with the arrow "E".

In the case of the continuous movement, when the zoom wide switch WIDE is set to ON, the zoom motor is driven, thereby causing the lens to be further moved for 70 ms in the same direction from the point of time when the zoom wide switch WIDE is set to OFF, as shown with an arrow "F". And then, the zoom motor is forwardly rotated for 50 ms and stopped. Thereby, a backlash of the mechanical system can be eliminated. In the case of the step movement, the zoom motor is reversed after the lens is located at the stop position for 50 ms as shown with an arrow "G", and then the lens is returned to the step zoom stop position by forwardly rotating the zoom motor. Therefore, the backlash can be eliminated.

When the tele extremity is selected with the TW button 18, the zoom motor is rotated forwardly as shown with an arrow "H", and the lens is stopped at the tele extremity.

Figure 11:
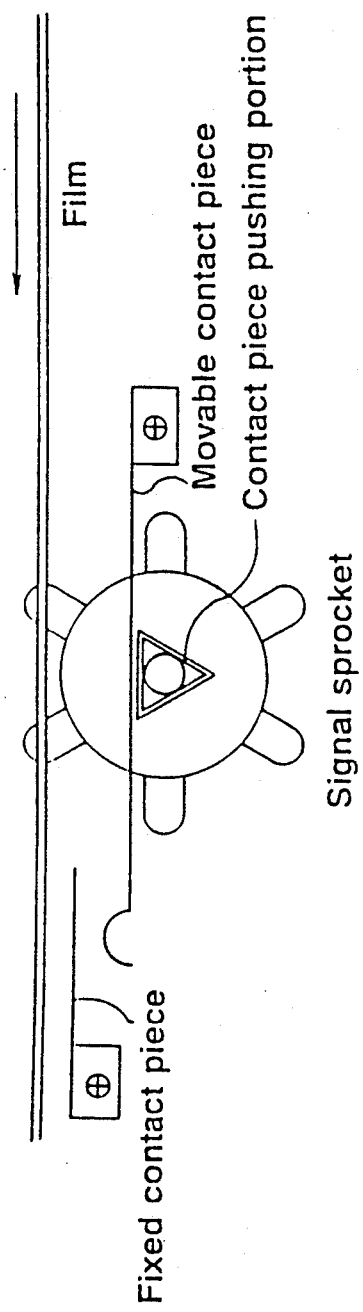
FIG. 11 is a diagram showing a mechanism of a wind pulse switch.

Referring to FIG. 11, the wind pulse switch WP comprises a signal sprocket, a movable contact piece and a fixed contact piece. On the outer circumference of the signal sprocket, protrusions to be engaged with perforations of a film are provided, and a triangular-sectional contact piece pushing portion is formed about the axis thereof. The movable contacting piece is elastically contact the contact piece pushing portion of the signal sprocket and is intermittently displaced to contact the fixed contact piece in accompanying with rotation of the signal sprocket, thereby repeatedly causing the movable contact piece to contact the fixed contact piece and to be separated therefrom. The wind pulse switch WP inputs a signal "0" when the contact pieces contact (ON), and a signal "1" when the contact pieces are separated from each other (OFF) to the main CPU.

When the above-mentioned switch produces a signal, and outputs ON/OFF signals corresponding to the conductive/non-conductive states thereof, a misjudgment of the state of the switch may occur due to a so-called chattering and a mis-contact of the switch. Conventionally, in order to avoid the misjudgment due to the chattering, the judgment is not made from a signal obtained at a moment but the judgment is made when the same state is continued for a predetermined period of time.

Figure 12:
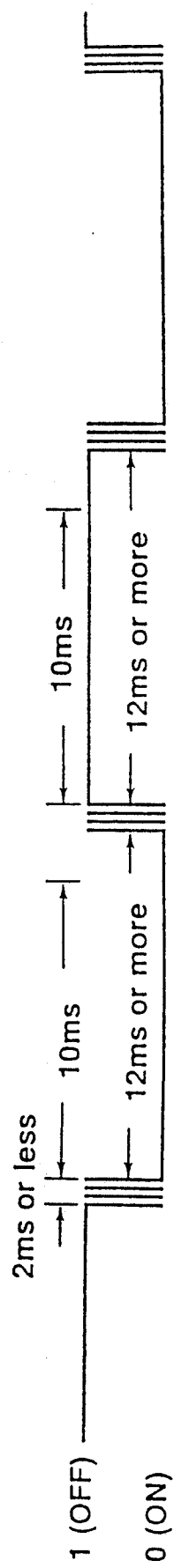
FIG. 12 is a diagram showing an example of an output of the wind pulse switch WP.

In addition to the above-said control, this camera employs the method such that the signal is not detected in the area surrounding changes of the signal in which the signal is not theoretically changed, thereby the camera is less influenced by misjudgment due to the miscontact of the switch. The wind pulse signal repeats ON/OFF substantially in a constant period. However, the interval period between the changes is designed to be more than 12 ms as shown in FIG. 12. Therefore, as a signal is not changed theoretically within at least 10 ms since the signal was once changed, the signal detection is inhibited in this period. Accordingly, influence from such a misjudgment can be decreased.

RESET ROUTINE

Figure 13:
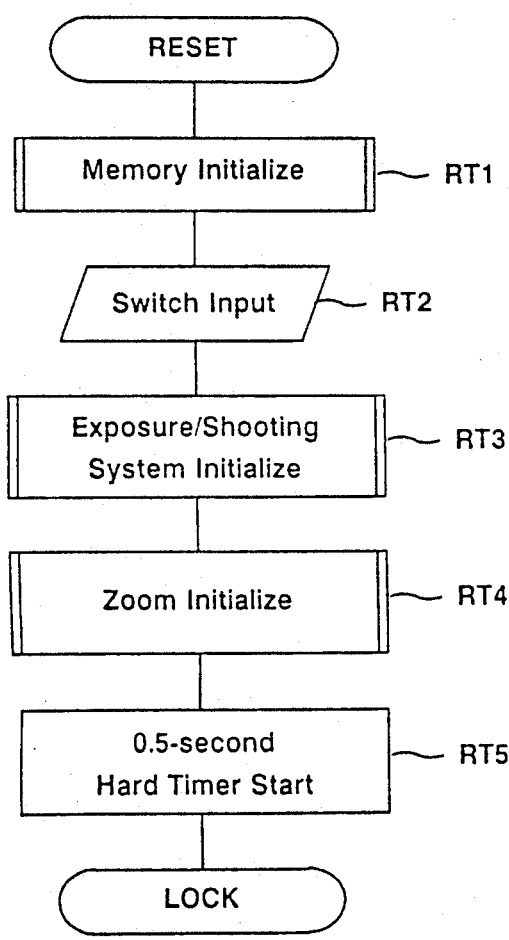
FIG. 13 is a flowchart for a RESET routine.

In the camera embodying the present invention, the main CPU is in reset condition when a battery is removed therefrom. When the battery is loaded in a camera, the reset condition of the main CPU is released, and a program starts at a RESET routine shown in FIG. 13.

Figure 14:
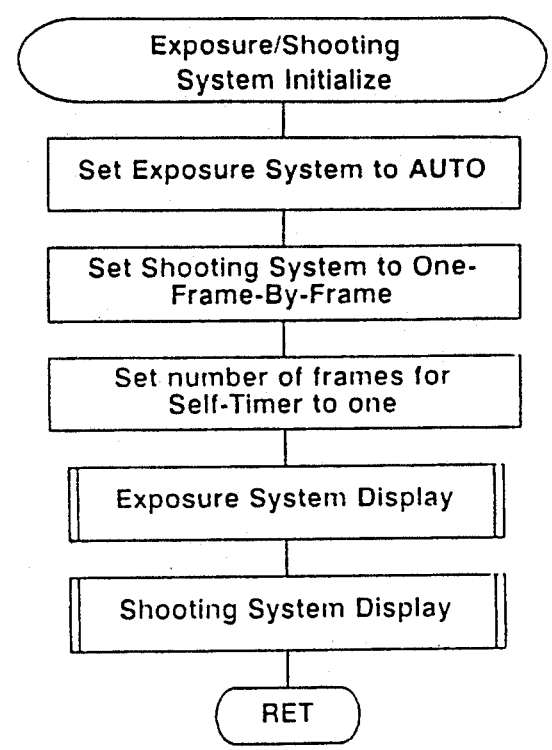
FIG. 14 is a flowchart for an EXPOSURE/SHOOTING SYSTEM INITIALIZE subroutine.

First, all the memories are initialized (in step RT1), and thereby all flags are set to "0". Next, the signals of all the switches are input (in step RT2). And the EXPOSURE/SHOOTING SYSTEM INITIALIZE subroutine is called, which is shown in FIG. 14, and thereby EXPMODE and DRIVEMODE is initialized (in step RT3). Through this initialization, each of the memories is set such that the shooting system is set to the FRAME-BY-FRAME shooting mode, the exposure system is set to an AUTO mode, the number of frames for the SELF-TIMER mode is set to one, the interval starting time is set to 10 seconds, and the interval time is set to 10 seconds. Thereafter, the EXPOSURE/SHOOTING SYSTEM is displayed.

Figure 15:
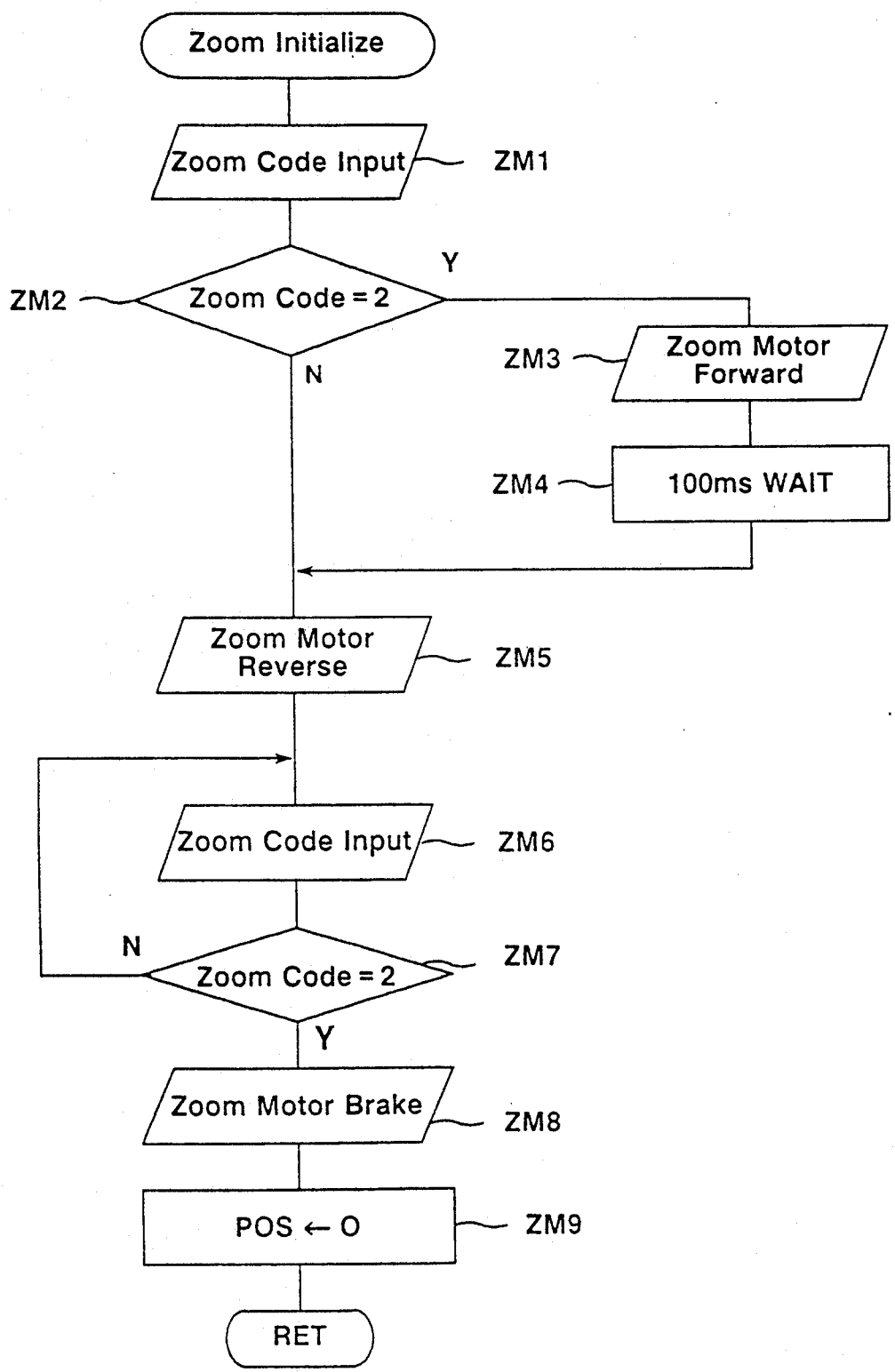
FIG. 15 is a flow chart for a ZOOM INITIALIZE subroutine.

Next, the ZOOM INITIALIZE subroutine shown in FIG. 15 is called (in step RT4).

In this camera, as the zoom code ZCODE is a relative code as already described, the lens position cannot be identified if the battery was once removed and the data stored in the memory has been lost. The ZOOM INITIALIZE subroutine is called in order to once retract the photographing lens to the accommodation position.

In the ZOOM INITIALIZE subroutine (FIG. 15), zoom code input processing is executed (in step ZM1) for judging whether or not the zoom code is "2" (in step ZM2). When the zoom code is "2", the lens has already been located in the accommodation position. However, the zoom motor is forwardly rotated so as to confirm that the main CPU has been reset, waiting for 100 ms (in the steps ZM3 and ZM4). Then, the step ZM5 is performed. When the zoom code ZCODE is not equal to "2", the step ZM5 is directly performed with steps ZM3 and ZM4 being skipped.

In step ZM5, the zoom motor is reversed. Inputting the zoom code ZCODE in the steps ZM6, it is judged whether or not the zoom code ZCODE is "2" (in step ZM7).

If it is judged in step ZM7 that the zoom code ZCODE equals "2", step ZM8 is performed, wherein the zoom motor brake is applied. Next, the POS is initialized (in step ZM9), and the processing is returned to the point where it was called.

Through the above processing, the lens is retracted to its accommodation position (POS=0), the RESET routine is terminated, and a LOCK routine is performed as follows.

After the ZOOM INITIALIZE subroutine is completed, a 0.5-second hard timer is started in step RT5 which is referred to when the INTERRUPT subroutine is executed.

LOCK ROUTINE

Figure 16:
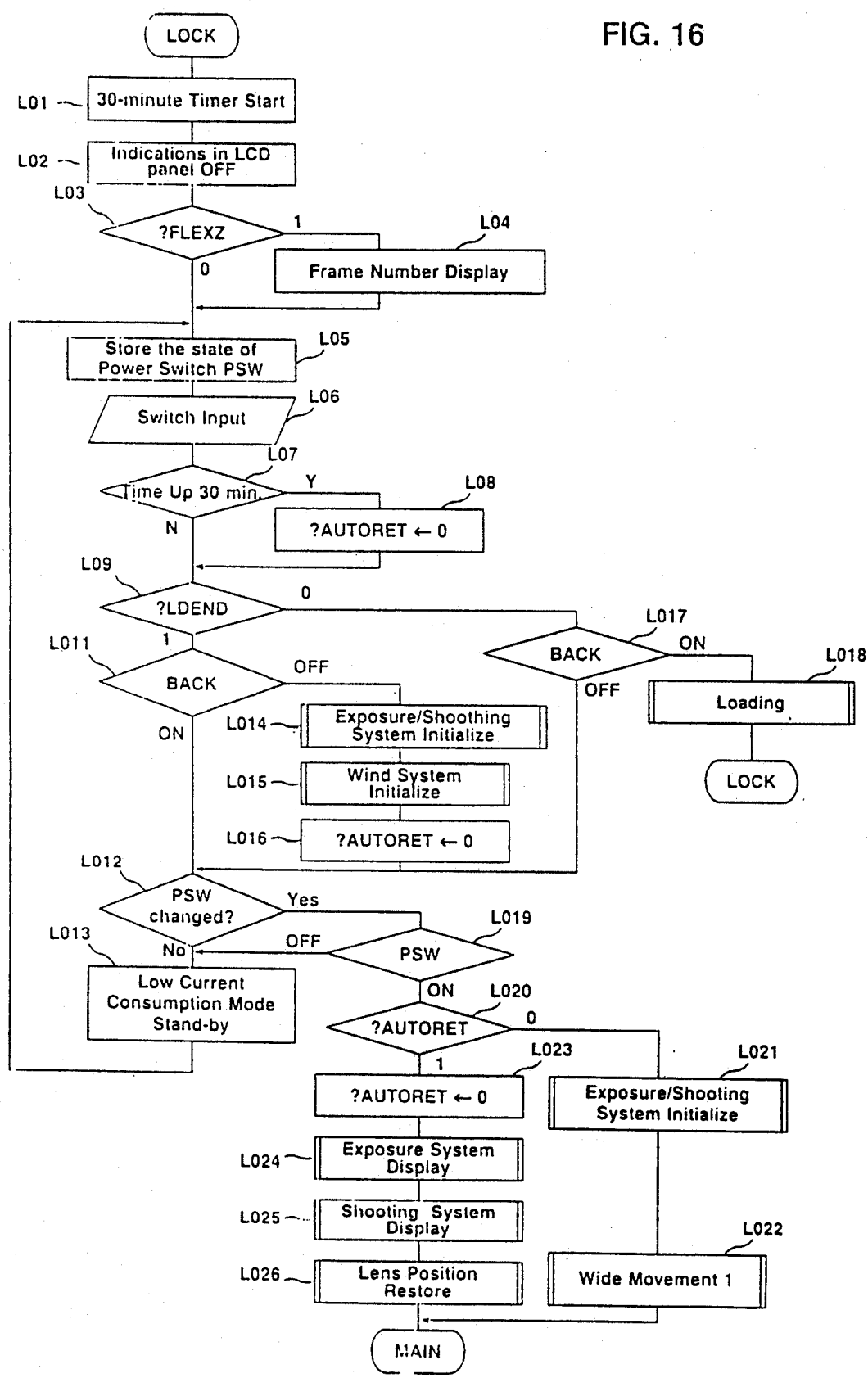
FIG. 16 is a flowchart for a LOCK routine.

FIG. 16 shows the LOCK routine. This routine is a routine to keep a camera in a stand-by state under a low power consumption state when the operation state of the camera is switched from the shooting stand-by (operable) state to the lock state with the operation of the power button 13, or when an AUTOMATIC LENS ACCOMMODATION subroutine (described later) is executed.

In this description, it is assumed that the power supply has been stopped by use of the power button 13, a film has been set in the camera, the back cover 8 is closed, and a predetermined number of blank shots have been made. Further, it is assumed that the lens is located at the accommodation position.

First, a 30-minute timer is started (in step L01). This 30-minute timer is used for clearing the data of MVPOS, EXPMODE and DRIVEMODE, which are stored immediately before the lens is automatically moved to the accommodation position (described later), after 30 minutes elapse after the lens is automatically moved to the accommodation position. It can be regarded that a photographer has merely forgotten to turn off the power in case that any operation has not been made for 30 minutes or more since the lens was automatically moved to the accommodation position.

Next, all the indications displayed in the LCD panel 19 are turned OFF (in step L02), and it is judged whether the flag ?FLEXZ is set to "0" or "1" (in step L03). The flag ?FLEXZ is used for judging whether or not a film is loaded in the camera. The flag ?FLEXZ is "0" if a film is not loaded in the camera. In this description, as it is assumed that a film has been normally loaded, the flag ?FLEXZ is set to "1".

Figure 17:
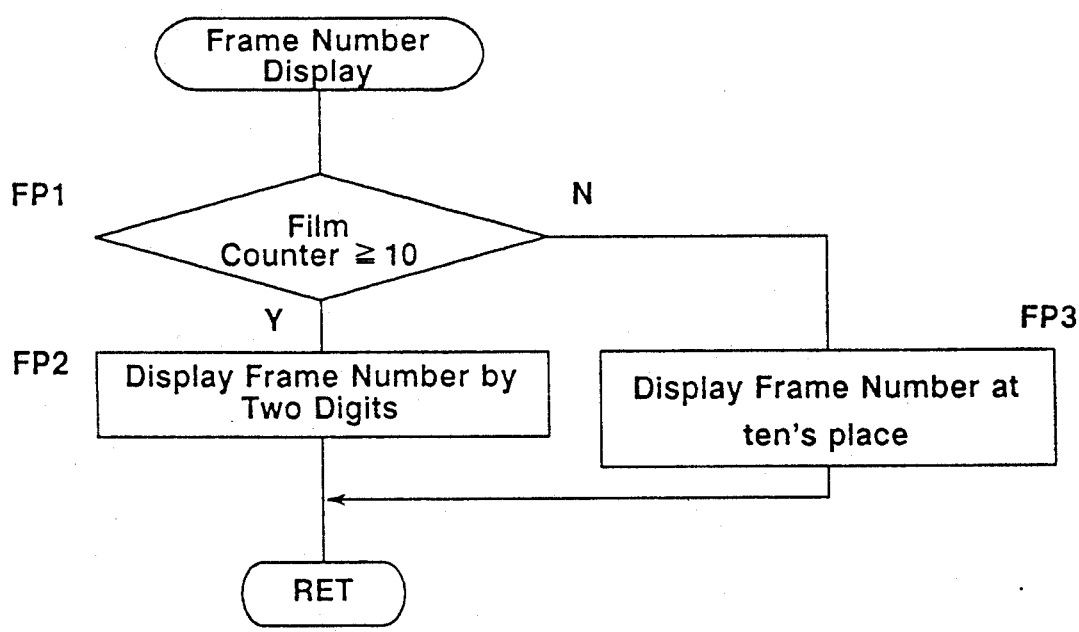
FIG. 17 is a flowchart for a FRAME NUMBER DISPLAY subroutine.

When the flag ?FLEXZ is set to "1", a FRAME NUMBER DISPLAY subroutine is called (in step L04). In the FRAME NUMBER DISPLAY subroutine, it is judged whether the film counter is set to greater than or equal to "10" as shown in FIG. 17 (in step FP1). When the film counter is set to more than "10", the frame number is displayed by two digits (in step FP2). While when the counter is set to less than "10", the frame number is displayed by one digit at ten's place.

Then, the preceding state of the power switch PSW is stored (in step L05). When the flag ?FLEXZ is set to "0", step L04 is skipped and step L05 is directly performed. When the flag ?FLEXZ is set to "1", step L04 is performed. Therefore, even though the power supply is stopped, when a film is loaded in a camera, the frame number is displayed in the LCD panel 19.

Next, the current states of the power switch PSW and the back cover switch BACK are input (in step L06). Then, it is judged (in step L07) whether or not the count of the timer reaches thirty minutes. When the 30-minute timer is judged to be time-up, the flag ?AUTORET is set to "0" (in step L08). This flag ?AUTORET is referred to when a judgment is made whether the operating state of the camera is set to that immediately before the automatic lens accommodation has been performed when the power button is depressed within 30 minutes since the lens was automatically located at the accommodation position.

Then, it is judged (in step L09) whether or not a film has been loaded. In this judgement, a flag ?LDEND is used. The flag ?LDEND is set to "1" when the film is loaded and is set to "0" when the film is not loaded. Namely, this flag is set to "0" when the back cover switch BACK is set to OFF. When the flag ?LDEND is "0", step L017 is performed. In this description, as it is assumed that the film has been loaded, the flag ?LDEND is set to "1", and step L011 is performed. In step L011, it is judged whether the back cover switch BACK is set to ON or OFF.

As it is assumed that the back cover switch BACK is set to ON, the step L012 is performed. In step L012, it is judged whether or not change has been made in the power switch PW. This judgment is made by comparing the preceding state of the power switch, which is stored in the memory, with the current state of the main switch which was input in step L06. If the preceding state and the current state of the power switch PSW are judged to be the same, a low current consumption mode operation is executed (in step L013), regarding that there is no change in the power switch PSW, and the processing loops back to step L05. In this low current consumption mode, the performance of the main CPU is interrupted, and 500 ms after, the main CPU restart continuing its performance. Thereby, the main CPU performs intermittently, the switch input in step L06 is executed only once every 500 ms, and thus a low current consumption mode is realized.

Next, it is assumed that the back cover 8 is opened during operation in this low current consumption mode. As the back cover 8 is opened, the back cover switch BACK is set to OFF. Therefore, in step L011, it is judged that the back cover switch BACK is set to OFF. Then, steps L014 through L016 are performed. In steps L014 and L015, the EXPOSURE/SHOOTING SYSTEM INITIALIZE and WIND INITIALIZE subroutines are called.

Figure 18:
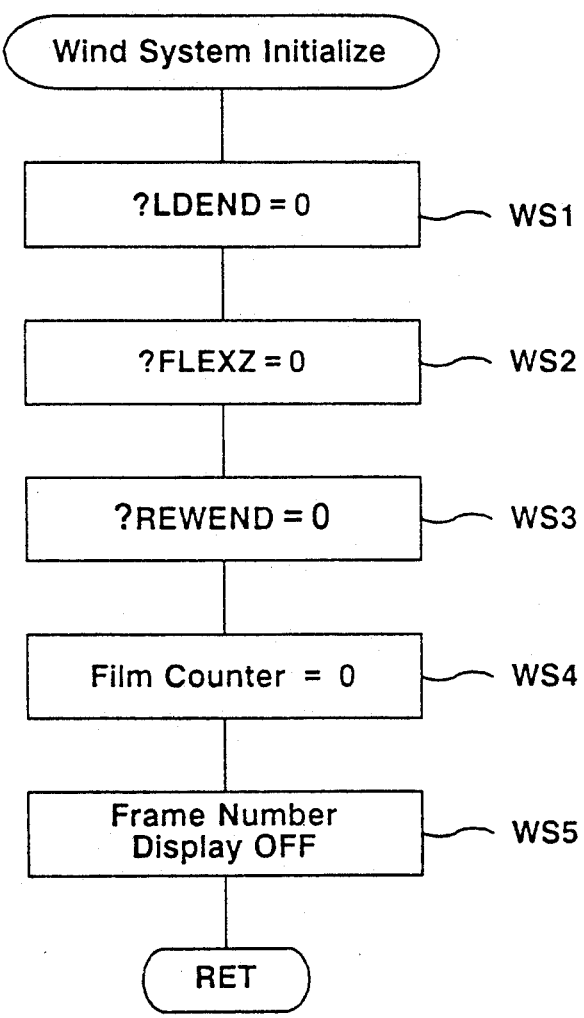
FIG. 18 is a flowchart for a WIND SYSTEM INITIALIZE subroutine.

In the WIND SYSTEM INITIALIZE subroutine, the flag ?LDEND, flag ?FLEXZ and flag ?REWEND are set to "0" (in steps WS1, WS2 and WS3) as shown in FIG. 18. The film counter is cleared (in step WS4), and therefore the frame number is not displayed in the LCD panel 19 (in step WS5).

When the WIND INITIALIZE subroutine is completed, in step L016, the flag ?AUTORET is set to "0", and the processing goes to step L012.

Figure 19:
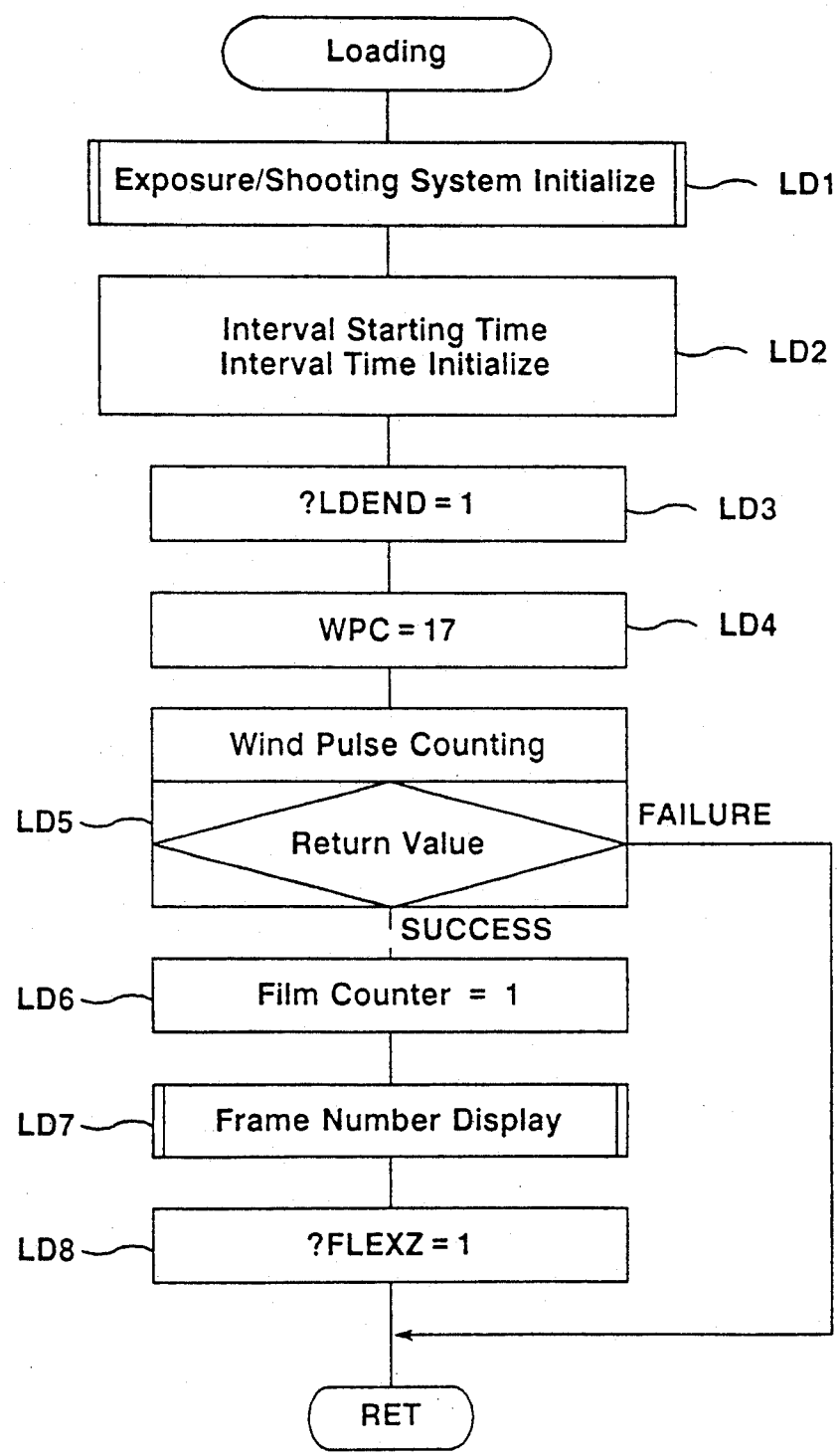
FIG. 19 is a flowchart for a LOADING subroutine.

If the back cover 8 is kept opened, it is judged in step L019 that the flag ?LDEND is "0", and the processing is shifted to step L017. In step L017, it is again judged whether the back cover switch BACK is set to ON or OFF. If the back cover 8 is kept open, the CPU operates in a low current consumption mode under this condition. In this case, if the back cover 8 is closed, it is judged in step L017 that the back cover switch BACK is set to ON, and the LOADING subroutine, which is shown in FIG. 19, is called (in step L018).

Next, it is assumed that the CPU continuously operates in the low current consumption mode and the power button 13 is depressed under this condition. In this case, in step L012, it is judged that a change has occurred in the power switch PSW, and the processing is shifted to step L019. In step L019, it is judged whether the power switch PSW is set to ON or OFF. As the power switch is set from OFF to ON by depressing the power button 13, it is judged in step L019 that the power switch is set to "ON", and the processing goes to step L020. In this step L020, it is judged whether the flag ?AUTORET is "0" or "1". The flag ?AUTORET is set to "1" in the MAIN processing described later when automatic lens accommodation has been performed as the operating state of the camera has been kept unchanged for three minutes.

In this description, it is assumed that the power supply is stopped by the power button 13 last time, and the flag ?AUTORET is set to "0". If the flag ?AUTORET is set to "0", EXPOSURE/SHOOTING SYSTEM INITIALIZE subroutine is called in step L021. Then, in step L022, the WIDE MOVEMENT 1 subroutine is called. And the processing goes to the top of the MAIN processing. The WIDE MOVEMENT 1 subroutine is described later.

It is assumed that the power button is depressed before 30 minutes elapsed when the flag ?AUTORET is set to "1", that is, the automatic lens accommodation has been performed. Then, the preceding state of the power switch PSW stored in the memory is compared with the current state of the power switch PSW in step L012, and it is judged whether a change has occurred in the power switch PW. And the processing is shifted to step L019, where it is judged whether the power switch PSW is set to ON or OFF. As the power switch PSW has been set to ON by depressing the power button 13, the processing is shifted to step L020, and it is judged whether the flag ?AUTORET is set to "1" or "0". As the flag ?AUTORET is kept on being set to "1" until thirty minutes elapse after three minutes have passed, it is judged in step L020 that the flag ?AUTORET is set to "1", and the processing in steps L023 through L026 is performed. In step L023, the flag ?AUTORET is set to "0". In step L024, the exposure system display processing is executed. In step L025, the shooting system display processing is executed. In step L026, a LENS POSITION RESTORE subroutine is called. By the processing in the steps L023 through L026, the operating state of the camera is set to the state immediately before automatic lens accommodation is executed.

LOADING SUBROUTINE

In the LOADING subroutine, the exposure system is set to AUTO and the shooting system is set to frame by frame shooting (in step LD1) as shown in FIG. 19. Further, the interval starting time and the interval time are initialized and are respectively set to 10 seconds (in step LD2). Next, the flag ?LDEND which indicates the termination of the loading is set to "1" (in step LD3). And the wind pulse counter is set to "17" (in step LD4) in order to feed the film according to the predetermined number of the blank shots. Then, the WIND PULSE COUNT subroutine, which is described later, is called (in step LD5). When the WIND PULSE COUNTING subroutine has been successfully completed, the processing in the steps LD6 through LD8 of the loading routine is executed. However, in case that the WIND PULSE COUNTING subroutine is failed, the operation in the steps LD6 through LD8 of the loading routine is discontinued.

In this description, it is assumed that the WIND PULSE COUNT subroutine has been successfully completed. Then, the film counter is set to "1" in step LD6; The FRAME NUMBER DISPLAY subroutine is called, and the flag ?FLEXZ which indicates the film being loaded is set to "1" (in the steps LD7 and LD8). Then the processing is returned to the position where the subroutine was called in the LOCK routine. It is noted that an error of the WIND PULSE COUNTING subroutine means a loading mistake. In this case, a film setting procedure, that is, opening the back cover 8, resetting a film, and closing the back cover 8 should be performed by a photographer.

WIND PULSE COUNTING SUBROUTINE

Figure 20:
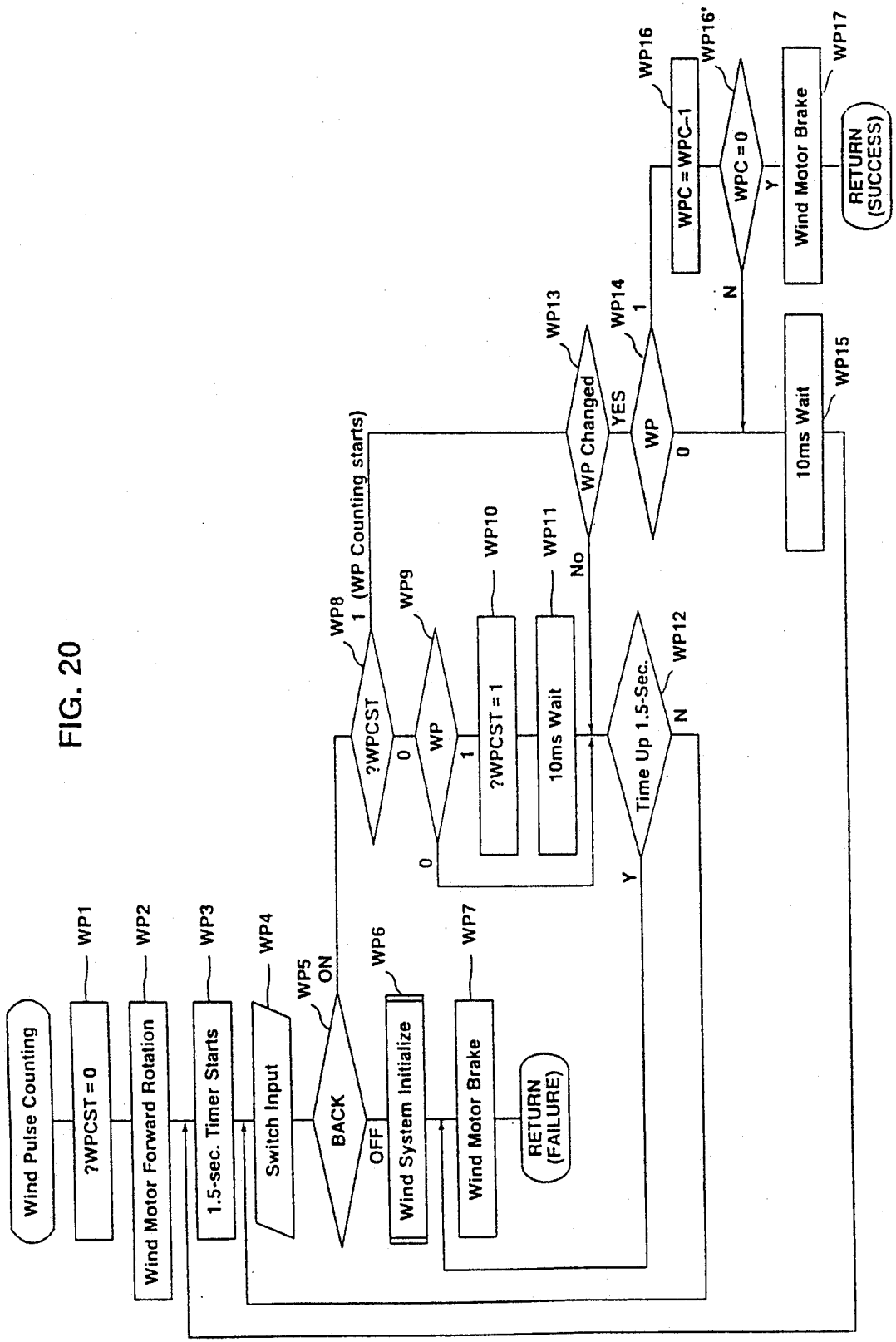
FIG. 20 is a flowchart for a WIND PULSE COUNTING subroutine.

FIG. 20 is a flowchart of the WIND PULSE COUNTING subroutine which is called in the LOADING subroutine (described above), and in the WIND routine (described later). This is a subroutine for detecting the fed amount of the film by detecting the wind pulse output in response to the feeding of the film.

As this subroutine starts, a flag ?WPCST indicating the start of pulse count is cleared in step WP1, and the wind motor is forwardly rotated in step WP2.

In a loop from steps WP3 to WP12, it is judged whether the initial position for starting the wind pulse counting appears in the period of 1.5 seconds with judging the conditions of the wind pulse WP and the back cover switch BACK.

When the back cover switch is set to ON, the processing is shifted from step WP8 to step WP9 as the flag ?WPCST is set to "0" immediately after starting. Then, if the wind pulse WP is set to "1", the processing returns to step WP4 before time is up after changing the flag ?WPCST (in step WP 10) and waiting for 10 ms in step 11. As loading and winding are terminated after the wind pulse WP is set "1", if the preceding processing has been successfully completed, steps WP10 and WP11 are performed as above. However, the processing may be terminated with the wind pulse WP being set to "0" due to a certain cause. In such a case the steps WP10 and WP11 are skipped and the switch input (step WP4) is repeated in relatively shorter period, and the change of the wind pulse WP from "0" to "1" is waited.

After the flag ?WPCST has been set to 1, the processing is shifted from step WP8 to step WP13, and it is judged whether or not a change occurs in the wind pulse WP.

If there is no change in the wind pulse WP, the processing is shifted to step WP4, and a loop of the processing is completed. In case that time is up in the 1.5-sec. timer without any change in the wind pulse WP, the wind motor brake is applied in step WP7, and the processing returns to the position where the WIND PULSE COUNT subroutine was called after setting the return value "Failure". In case the back cover 8 is opened, the wind motor brake is applied after the WIND SYSTEM INITIALIZE subroutine of FIG. 18 is completed. This initialize subroutine is for clearing a film-relating flag ?LDEND, ?FLEXZ and ?REWEND, resetting the film counter and turning OFF the frame number display.

If the wind pulse WP is changed, it is further detected in step WP14 whether it is changed from "0" to "1" or from "1" to "0". If the wind pulse WP is changed from "0" to "1", the preset wind pulse counter WPC is decremented in step WP16, and the motor brake is applied in step WP17 when wind pulse counter WPC becomes "0". Then, the processing returns to the position where the subroutine was called after setting the return value "Success".

In case that the wind pulse count WPC is not "0", or the wind pulse is changed from "1" to "0", the processing is shifted to step WP3 after waiting for 10 ms in step WP15 and restarts the 1.5-sec. timer.

The processings of waiting for 10 ms in steps WP11 and WP15 are processings to lessen the influence resulting from erroneous input due to chattering, with inhibiting signal input for the period where signal is not theoretically changed, from the changeover point of the wind pulse WP.

INTERRUPT SUBROUTINE

Figure 21:
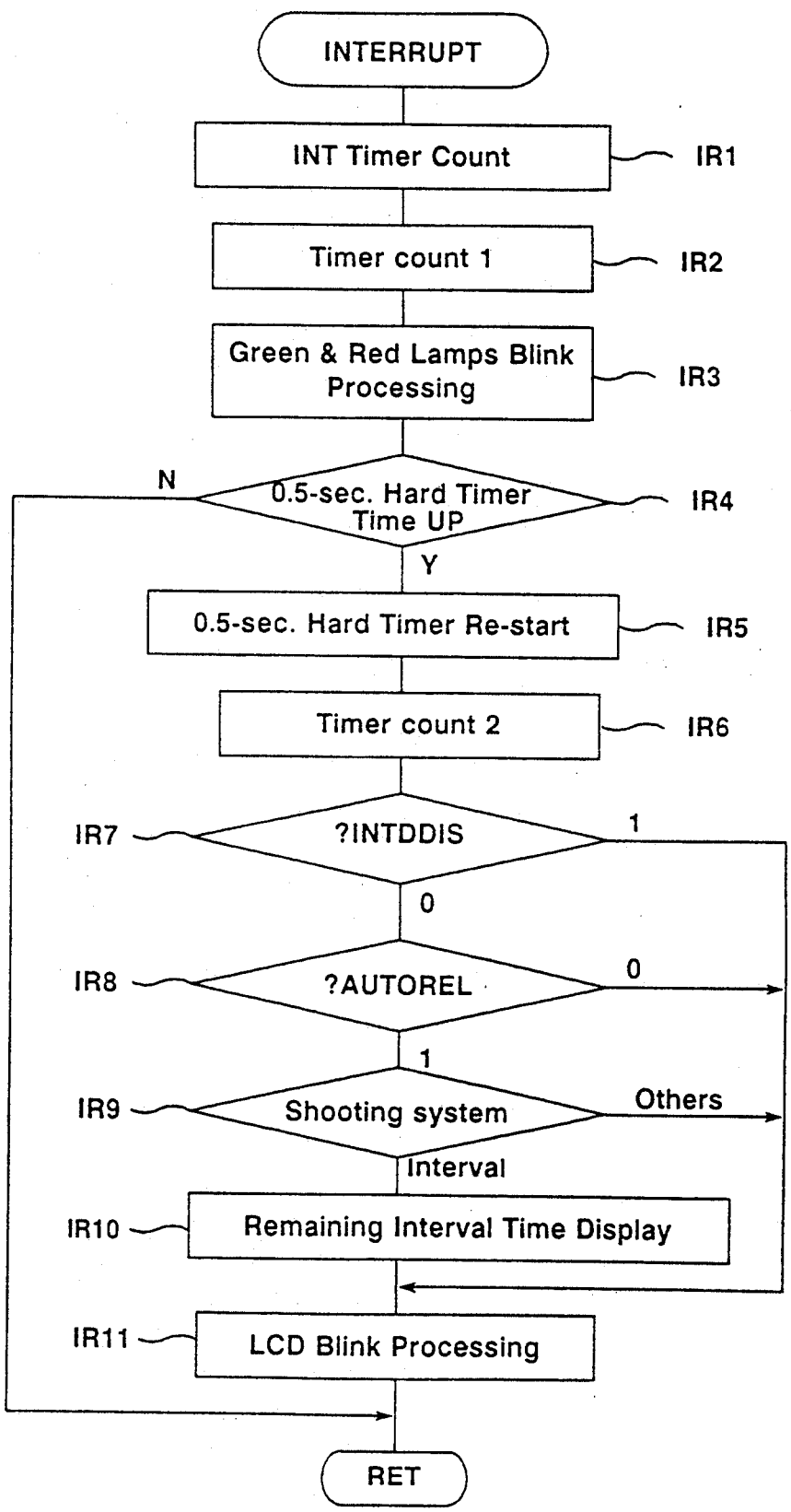
FIG. 21 is a flowchart for an INTERRUPT subroutine.

FIG. 21 is a flowchart showing the INTERRUPT subroutine. This processing is called in response to an interrupt signal which is generated at intervals of 50 ms. The INTERRUPT subroutine is a display-related processing and a soft timer incrementing processing which is executed every 50 ms as long as power is supplied to the camera regardless of the portion of the program currently being executed.

In step IR1, an INT timer, which is used for counting time for interval shooting and self-timer shooting, is incremented. In step IR2, other timers, such as the 30-minute timer in the LOCK routine, are incremented. Next, in step IR3, the blinking operation of a green lamp and a red lamp is executed. This operation is the operation to make the green lamp blink for short-distance warning and the red lamp for a strobe usage indication at the cycle of 4 Hz, in the AEAF CONTROL routine described later.

Step IR4 is a processing for judging the time-up of a 0.5-sec. hard timer. If the hard timer is timed up, the operation following step IR5, inclusive, is executed. Therefore, the operation following step IR5 is executed once per ten times calling of the INTERRUPT subroutine.

In the steps IR5 and IR6, the hard timer is restarted; then the other soft timers are counted up.

In steps IR7 through IR10, display of the remaining time of the interval period is permitted. The remaining time of the interval period is displayed if the exposure system is set to AUTO, and the shooting system is set to the INTERVAL shooting mode.

In step IR11, the blinking operation of the LCD is executed, thereby causing the interval mark, the self timer mark, etc. to blink at the rate of 1 Hz.

It is not necessary that the operation in the steps IR5 through IR11 is frequently executed. Further, if the processing is executed at each INTERRUPT subroutine, the executing time of the INTERRUPT subroutine time may be lengthened to cause a trouble in executing the MAIN processing. Therefore, the substantial execution of this INTERRUPT routine occurs at an interval of 0.5 seconds. When the INTERRUPT subroutine is completed, the control returns to the point where the subroutine was called.

MAIN PROCESSING

FIG. 22 and FIG. 23 show the MAIN processing. This processing is repeatedly performed when the operation state of the camera is set to the shooting stand-by (operable) state by the operation of the power button 13.

First, the three-minute timer is started (in step MA1). This three-minute timer pertains to automatic lens accommodation. If the operating state of the camera has not been changed for three minutes, the lens is retracted to the accommodation position. Next, in step MA2, a SELECT mode counter SELEMODE (hereinafter merely called "SELEMODE") is set to "0". The SELEMODE is used when the shooting mode such as the self-timer shooting, the interval shooting, etc. is set. And then, the switch data is stored in the memory (in step MA3).

Next, a flag ?SWSEN is set to "0" (in step MA4). The flag ?SWSEN is referred to when it is judged whether the photometry is permitted or not. When ?SWSEN is set to "1", the photometry processing is permitted to be executed, while when ?SWSEN is set to "0", the photometry processing is prohibited. Then, it is judged whether or not the shooting system is set to the FORCED REWIND mode (in step MA5). If the shooting system is set to a mode other than the FORCED REWIND mode, the processing is shifted to step MA6, where it is judged whether or not the flag ?REWEND is set to "1". The flag ?REWEND is set to "1" when the rewind of the film is terminated, while it is set to "0" when the rewind of the film is not completed. It is judged whether or not the preceding state of the photometric switch stored in the memory is ON in step MA7 when the flag ?REWEND is judged to be "0" in step MA6. When the preceding state of the photometric switch stored in the memory is OFF, the flag ?SWSEN is set to "1" in step MA8. If the preceding state of the photometric switch stored in the memory is judged to be ON in step MA7, step MA8 is skipped, and step MA9 is performed. It is because a change of the photometric switch can not be detected if the shutter button is kept depressed, and therefore, the flag ?SWSEN is set to "1" after the photometric switch is set to OFF.

When it is judged in step MA6 that the flag ?RE-WEND is "1", steps MA7 and MA8 are skipped, and step MA9 is performed. Thus, in case that a film is rewound, the photometry processing is prohibited.

If it is judged in step MA5 that the shooting system is set to the forced rewind, the processing skips the steps MA6, MA7, and MA8, and step MA9 is performed, where the flag ?REWEN is set to "0". The flag ?REWEN is referred to when it is judged whether the forced rewind is permitted or not. In step MA10, it is judged whether or not the shooting system is set to the forced rewind. If the shooting system is set to the forced rewind, it is judged in step MA11 whether the preceding state of a release switch stored in the memory is ON or OFF. When the preceding state of the release switch if OFF, the flag ?REWEN is set to "1" (in step MA12). Then step M13 is executed. When the preceding state of the release switch stored in the memory is ON, step MA12 is skipped, and step MA13 is performed. It is because a change of release switch cannot be detected if the shutter button is kept depressed, and therefore, the flag ?REWEN is set to "1" after the release switch is set to OFF. In step MA10, if the shooting system is set to a mode other than the forced rewind, steps MA11 and MA12 are skipped and step MA13 is performed. Thus the forced rewind is prohibited when the shooting system is set to the mode other than the forced rewind.

In step MA13, the flag ?ZOOMEN is set to "0". The flag ?ZOOMEN is referred to when it is judged whether zooming is permitted or not. And then, it is judged in step MA14 whether the preceding state of the zoom tele switch TELE stored in the memory is OFF or ON. When the preceding state of the zoom tele switch TELE is OFF, it is judged in step MA15 whether the preceding state of the zoom wide switch WIDE stored in the memory is OFF or NO. When the preceding state of the zoom wide switch WIDE is OFF, the flag ?ZOOMEN is set to "1" in step MA16. Then, step MA17 is executed. In this case, if the zoom tele switch TELE is set to OFF and the zoom wide switch WIDE is set to OFF, the zoom lever 12 is located at the neutral position thereof. When the preceding state of the zoom tele switch TELE in the memory is ON, the steps MA15 and MA16 are skipped, and step MA17 is performed. When the preceding state of the zoom wide switch WIDE is ON, step MA16 is skipped, and step MA17 is performed.

Therefore, when the zoom lever 12 is located at its neutral position, the flag ?ZOOMEN is set to "1". When the zoom lever 12 is kept displaced toward the direction of the zoom tele switch TELE or when the zoom lever 12 is kept displaced toward the direction of the zoom wide switch WIDE, the flag ?ZOOMEN remains to be "0". In step MA17, the flag ?TWEN is set to "0". The flag ?TWEN is referred to when it is judged whether the lens movement to the tele/wide extremity is permitted or not. Next, it is judged in step MA18 whether the preceding state of the TW switch stored in the memory is ON or OFF. When the preceding state of the TW switch is OFF, the flag ?TWEN is set to "1" in step MA19. And the processing is shifted to step MA20. When the preceding state of the TW switch is ON, step MA19 is skipped, and step MA20 is performed. Since a change can not be detected if the TW button is kept depressed, a flag ?TWEN is set to "1" after the TW switch is set to OFF.

In step MA20, the current states of the switches are input. In step MA21, the preceding states of the switches stored in the memory are compared with the current input of the respective switches. If the preceding states of the switch input and the current states thereof are different, namely, when a change of switches occurs, the three-minute timer is started (in step MA22), and the processing is shifted to step MA23. When there is no change in both the preceding states and the current states, the processing skips step MA22 and is shifted to step MA23.

In step MA23, it is judged whether or not the three-minute timer is timed up. In case that the three-minute timer is timed up, the flag ?AUTOCAD is set to "1" in step MA24. And the strobe charging is prohibited (in step MA25). The lens is automatically moved to the accommodation position (in step MA26), and the processing diverges to the LOCK routine. Namely, if three minutes or more elapse without operation of the power button 13, shutter button 17, zoom lever 12, drive button 11, or TW button, or without opening/closing of the back cover 8, the lens will be automatically retracted to the accommodation position. The AUTOMATIC LENS ACCOMMODATION subroutine called in step 26 is described later.

The case that the three-minute timer is not timed up yet in the MAIN processing is described below.

In case that the three-minute timer is not timed up, it is judged in step MA27 whether or not the flag ?REWEN is set to "1". As the flag ?REWEN is "1" when the shooting system is set to the FORCED REWIND mode, step MA28 follows and it is judged whether the release switch SWR is set to ON or OFF. In case that the release switch is set to ON, the strobe charging is prohibited (in step MA29). Then, the processing diverges to the REWIND routine (in step MA30). In this embodiment, if the release switch SWR is set from OFF to ON by operating the shutter button 17 with the drive button 11 being kept depressed for more than three seconds or more, the forced rewind operation is conducted. Alternatively, if a predetermined period of time elapses with the drive button 11 and the shutter button 17 being depressed simultaneously, the forced rewind may be conducted. It should be noted that the forced rewind is set in the EXPOSURE/SHOOTING SYSTEM SETTING subroutine of FIG. 33.

When it is judged in step MA27 that the flag ?REWEN is set to "0", step MA31 is performed, (FIG. 22-B) where it is judged whether the film loading has been terminated or not by referring to the flag ?LDEND. If the film is not loaded, and LDEND is 0 it is judged whether or not the back cover switch BACK is set to ON or OFF (in step MA32). If the back cover 8 is closed, the strobe charging is prohibited (in step MA33), the LOADING subroutine is called (in step MA34), and the processing returns to the top of the MAIN processing (in step MA35). When it is judged in step MA32 that the back cover 8 is opened, the processing is shifted to step MA39. When it is judged in step MA31 that the film has been loaded, and LDEND is 1 it is judged in step MA36 whether or not the back cover switch BACK is set to ON or OFF. When the back cover 8 is opened, the EXPOSURE/SHOOTING SYSTEM INITIALIZE and the WIND SYSTEM INITIALIZE subroutines are called (in steps MA37 and MA38), and the processing is shifted to step MA39. When it is judged in step MA36 that the back cover 8 is closed, steps MA37 and MA38 are skipped, and the processing shifts to step MA39.

Therefore, in the case that the MAIN processing is executed with the film loading having been completed and with the back cover 8 being closed, steps MA31, MA36 and MA39 are sequentially executed. In the case that the MAIN processing is executed with the back cover 8, which was closed, having been opened, steps MA31, MA36, MA37, MA38 and MA39 are sequentially executed. And in case that the MAIN processing is executed with the back cover being kept opened, steps MA31, MA32 and MA39 are sequentially executed. In the case that the MAIN processing is executed with the back cover 8, which was opened, having been closed, steps MA31, MA32, MA33, MA34 and MA35 are sequentially executed.

In step MA39, the preceding state of the power switch PSW stored in the memory is compared with the current state of the power switch. In case a change of the power switch has occurred, the processing is shifted to step MA40. It is judged in step MA40 whether the current state of the power switch is ON or OFF. If the power switch is set to OFF, that is, the power switch is set from ON to OFF, the strobe charging is prohibited (in step MA41), the LENS ACCOMMODATION subroutine is called (in step MA42), and the processing diverges to the LOCK routine of FIG. 16 (in step MA43). The LENS ACCOMMODATION subroutine is described later with reference to FIG. 24. In case the power supply is stopped by manual operation, steps MA40, MA41, MA42, and MA43 are sequentially executed. In case that the power button 13 is kept depressed while the MAIN processing is being executed, and when the power button 13 is released from being depressed, the processing is shifted to step MA44 (FIG. 23) through the steps M39 and MA40.

In step MA44, the EXPOSURE/SHOOTING SYSTEM SETTING subroutine, which is described later, is called.

The processing in step MA45 is executed after this EXPOSURE/SHOOTING SYSTEM SETTING subroutine is completed. It is judged in step MA45 whether or not the flag ?SELECT is set to "1" or "1". This ?SELECT is set in the EXPOSURE/SHOOTING SYSTEM SETTING subroutine. If the time setting of the shooting system is conducted, the flag ?SELECT is set to "1". If the flag ?SELECT is set to "0", the processing is shifted to step MA46, and it is judged whether the flag ?TWEN is set to "1" or "0". When the flag ?TWEN is set to "1", it is judged (in step MA47) whether or not the TW switch is set to ON or OFF. When the TW switch is ON, the strobe charging is prohibited (in step MA48), the TELE/WIDE MOVEMENT subroutine (in step MA49) is called, and the processing returns to the top of the MAIN processing (in step MA50). It should be noted that in the TELE/WIDE MOVEMENT subroutine, the zoom lens is forcedly moved to the tele extremity or the wide extremity when the TW button 18 is operated. The details thereof is described later when the lens movement is described.

When in step MA46 the flag ?TWEN is "0", step MA51 is executed, and it is judged whether the flag ?ZOOMEN is set to "1" or "0". When the flag ?ZOOMEN is set to "0", it is judged (in step MA52) whether or not the flag ?SWSEN is "0". If the flag ?SWSEN is "0", the strobe charging control is conducted in step MA53, and the processing returns to step MA3.

When it is judged in step MA51 that the flag ?ZOOMEN is set to "1", it is judged (in step MA54) whether or not the zoom tele switch TELE is set to ON or OFF. When the zoom tele switch TELE is set to OFF, it is judged (in step MA55) whether or not the zoom wide switch WIDE is set to ON or OFF. If the zoom wide switch WIDE is set to OFF, the processing is shifted to step MA52. Therefore, when the zoom lever 12 is at the neutral position thereof under the zoom permitted condition, the MAIN processing is executed via steps MA51, MA54, MA55 and MA52.

When the zoom wide switch WIDE is judged to be ON in step MA55, it is judged (in step MA56) whether or not the zoom lens is located at the wide extremity. When the zoom lens is not located at the wide extremity, the strobe charging is prohibited (in step MA57), the ZOOM TO WIDE subroutine is executed (in step MA58), and the processing returns to the top of the MAIN processing (in step MA59). As it is not necessary to move the zoom lens to the wide extremity when the zoom lens is determined to be located at the wide extremity in step MA56, steps MA57 and MA58 are skipped and step MA53 is executed.

Next, when it is judged in step MA54 that the zoom tele switch TELE is set to ON, it is judged (in step MA60) whether or not the zoom lens is located at the tele extremity. When the zoom lens is not located at the tele extremity, the strobe charging is prohibited (in step MA61), the ZOOM TO TELE subroutine is executed (in step MA62), and the processing returns to the top of the MAIN processing (in step MA63). As it is not necessary to move the zoom lens to the tele extremity when the zoom lens is determined to be located at the tele extremity in step MA60, the processing in the steps MA61, MA62, and MA63 is skipped, and step MA53 is executed.

If the zoom lever 12 is displaced in the direction of arrow r1 in FIG. 1, and if the flag ?ZOOMEN is set to "1", the zoom lens moves toward the tele side until it reaches the tele extremity. While, if the zoom lever 12 is displaced in the direction of arrow r2 in FIG. 1, the zoom lens moves toward the wide side until it reaches the wide extremity. The ZOOM TO WIDE subroutine and the ZOOM TO TELE subroutine are described later.

When it is judged in step MA52 that the flag ?SWSEN is set to "1", it is judged (in step MA64) whether the photometric switch is ON or OFF. Then, if it is OFF the strobe charging is prohibited (in step MA65), and the processing diverges to the AEAF CONTROL routine (in step MA66).

LENS ACCOMMODATION SUBROUTINE, ETC.

FIG. 24 shows the processings of LENS ACCOMMODATION, AUTOMATIC LENS ACCOMMODATION, WIDE MOVEMENT 1 of the lens and TELE MOVEMENT subroutines. The places where these subroutines start are different, but the latter half of the processings is common. Therefore, the same figure is used for illustration.

The LENS ACCOMMODATION subroutine is called when the power is manually stopped, or when the rewind is commenced. For instance, the subroutine is called in step MA42 of the MAIN processing of FIGS. 22 and 23.

First, "0" is set in the memory MVPOS (in step LM1). The memory MVPOS is the memory for storing the position where the lens is to be moved, which is commonly used for the processing of AUTOMATIC LENS ACCOMMODATION, WIDE MOVEMENT 1, and TELE MOVEMENT subroutines.

Next, The data stored in the memory MVPOS is compared with the current POS (in step LM2). The direction in which the lens is to be moved is different, depending upon each of the processings of automatic lens lock, WIDE MOVEMENT 1, and TELE MOVEMENT. If the power supply is manually stopped (in step MA42 of the MAIN processing, FIG. 22-B), and the current POS is greater than MVPOS (=0), the reverse rotation of the zoom motor is executed (in step LM3), and then the lens position is detected (in step LM4). In the lens position detection processing, a change of the zoom code ZCODE is continuously monitored as the motor is rotated with use of POS and DIV.

Next, the focal length display is performed (in step LM5). Therefore, while the lens is being moved, the displayed focal length can be changed. Next, the current POS is compared with the data stored in the memory MVPOS (in step LM6). The processing in steps LM4 through LM6 is repeated until the current POS equals the data stored in the memory MVPOS. When the current POS equals the data stored in the memory MVPOS, the zoom motor brake is applied (in step LM7), then the processing is returned to the point where the subroutine was called in the MAIN processing. Thus, the lens is retracted in the accommodation position.

The AUTOMATIC LENS ACCOMMODATION subroutine is called in step MA26 of the MAIN processing as aforementioned. In this subroutine, the current DIV is stored in the memory MEMDIV (in step LM8). In this case, the data stored in the memory MEMDIV is used for determining the restoring position in automatically restoring of the lens. In step LM9, "0" is stored in the memory MVPOS. And the processing similar to the LENS ACCOMMODATION subroutine is executed (in the steps LM2, and steps LM3 through LM7). This subroutine substantially has no difference from the LENS ACCOMMODATION subroutine, excepting that the lens is automatically restored in response to the succeeding power supply operation.

The WIDE MOVEMENT 1 is a subroutine for moving the accommodated lens to the wide extremity, which is called in step L022 of the LOCK subroutine as described above. In the WIDE MOVEMENT 1, "2" is stored in the memory MVPOS (in step LM10), and the data in the MVPOS is compared with the current POS in step LM2. As the current POS is "0" with the power supply being stopped, the processing is shifted to step LM11, where the forward rotation of the zoom motor is executed. Then, the lens position is detected and the focal length is displayed (in steps LM4 and LM5). Steps LM4 through LM6 are repeated until the data stored in the memory MVPOS equals the current POS. When the data stored in the memory MVPOS is determined to be equal to the current POS in step LM6, the processing is shifted to step LM7, and returns to the point where the subroutine was called in the LOCK subroutine. Thus, the lens is shifted to the wide extremity (POS=2).

Next, "4" is stored in the memory MVPOS in the TELE MOVEMENT subroutine (in step LM12), and the data stored in the memory MVPOS is compared with the current POS. As the data of the MVPOS is always greater than the current POS, the zoom motor is forwardly rotated (in step LM11), then the lens position detection and the focal length display are performed (in steps LM4 and LM5). Next, the data stored in the memory MVPOS is compared with the POS. Steps LM4 through LM6 are repeated until the data stored in the memory MVPOS equals the POS. As they are determined to be equal to each other, the zoom motor brake (in step LM7) is applied, and then, the processing returns to the point where the subroutine was called in the MAIN processing (in step MA50).

Thus, the lens is forcedly moved toward the tele extremity in the TELE MOVEMENT processing (in step MA50).

AUTOMATIC LENS POSITION RESTORE SUBROUTINE

In FIG. 25, an AUTOMATIC LENS POSITION RESTORE subroutine which is called in step L026 of the LOCK routine is shown.

In this subroutine, the forward rotation of the zoom motor is firstly executed in step LR1. Next, the processing is shifted to step LR2, where the lens position detecting processing is performed. Then the FOCAL LENGTH DISPLAY subroutine is called in step LR3. In step LR4, the current DIV is compared with the data of the preceding DIV stored in the memory MEMDIV. The processing in the steps LR2, LR3 and LR4 is repeated until the current DIV equals the data stored in the memory MEMDIV. If it is judged in LR4 that the current DIV equals the data stored in the memory MEMDIV, the processing is shifted to step LR5, where the zoom motor brake is applied, and the processing is returned to the point where the subroutine was called in the LOCK routine. Thus the lens can be moved to position corresponding to the preceding DIV which is the position where the lens was located immediately before the automatic lens accommodation has been performed.

TELE/WIDE MOVEMENT subroutine

Figure 26:
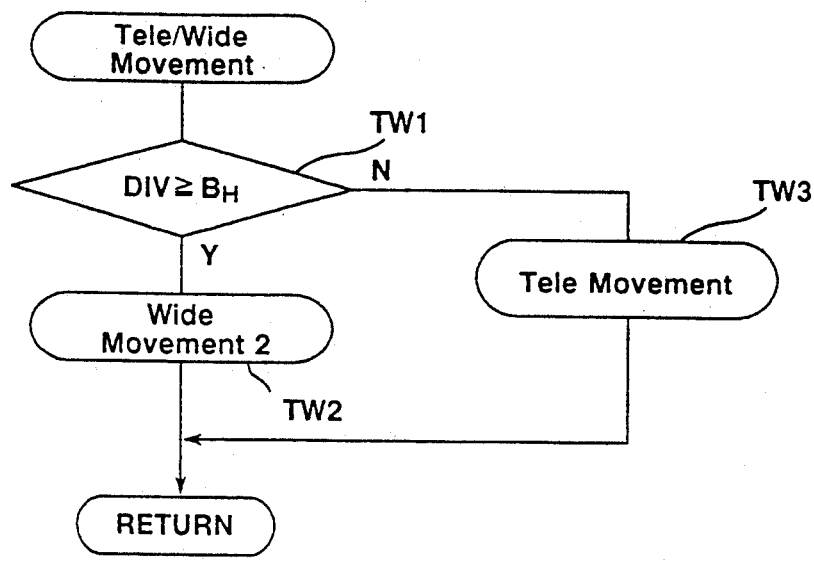

The TELE/WIDE MOVEMENT subroutine shown in FIG. 26 is called in step MA49 as described above. This TELE/WIDE MOVEMENT subroutine is used for determining whether the lens is moved to the tele side or the wide side when TW button 18 is operated as shown in FIG. 26. First, it is judged in step TW1 whether or not the DIV is greater than or equal to "$B_H$". When the DIV is greater than or equal to "$B_H$", the WIDE MOVEMENT 2 subroutine is called in step TW2. When the DIV is determined to be smaller than "$B_H$" in step TW1, the TELE MOVEMENT subroutine is called (in step TW3).

In this subroutine, the lens is moved to the further one of the wide extremity and the tele extremity with respect to the current lens position. That is, if the lens is located relatively near the wide extremity, the lens will be moved to the tele extremity, while if the lens is located relatively near the tele extremity, the lens will be moved to the wide extremity.

The followings are the modifications of the TELE/WIDE MOVEMENT subroutine.

Figure 27:
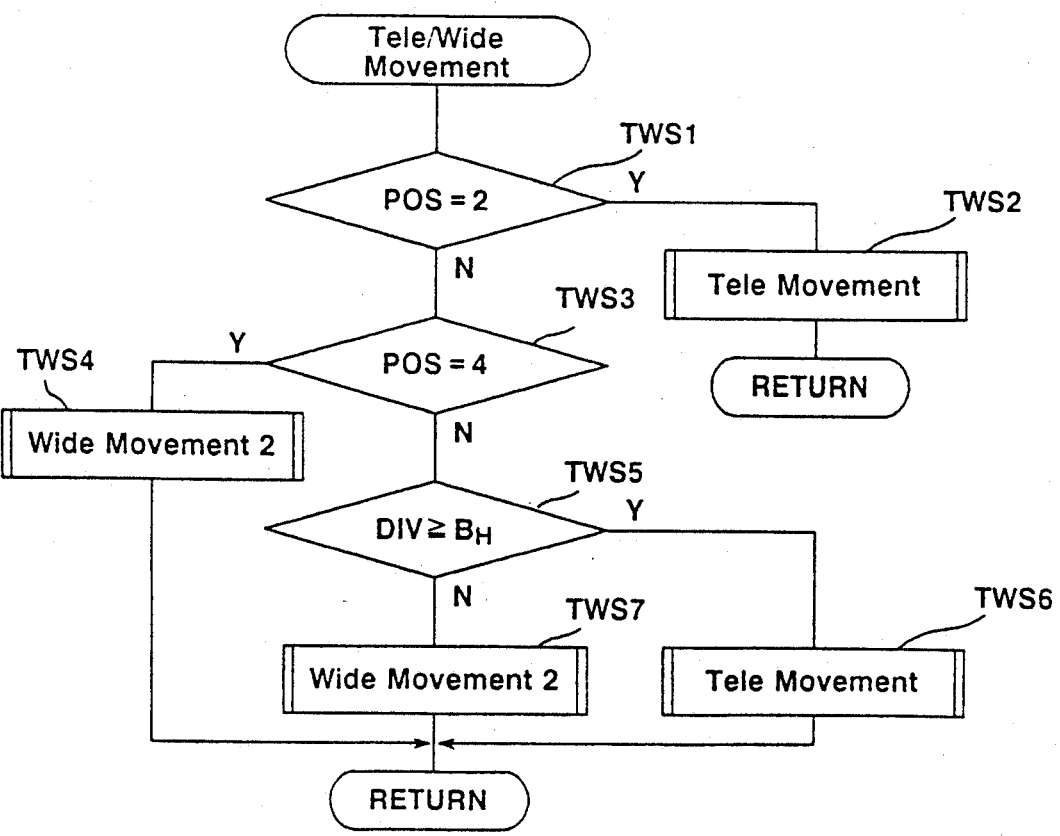

FIG. 27 is a flowchart illustrating a first modification of the TELE/WIDE MOVEMENT subroutine. In this modification, it is judged in step TWS1 whether the POS is "2". When POS equals "2", the processing is shifted to the TELE MOVEMENT (in step TWS2). When the POS is judged not to be equal to "2" in step TWS1, it is judged in step TWS3 whether or not the POS equals "4". When it is judged that the POS equals "4" in step TWS3, the processing is shifted to the WIDE MOVEMENT 2 (in step TWS4). When the POS is judged not to be equal to "4" in step TWS3, it is judged (in step TWS5) whether or not the DIV is greater than or equal to "$B_H$". When the DIV is greater than or equal to "$B_H$" in step TWS5, the TELE MOVEMENT subroutine is called (in step TWS6). When it is judged that the DIV is smaller than "$B_H$" in step TWS5, the WIDE MOVEMENT 2 is called (in step TWS7).

According to the first modification, of FIG. 27 when the lens is at the tele extremity, the lens is moved to the wide extremity, while if the lens is at the wide extremity, it is moved to the tele extremity. When the lens is located at a position between the wide extremity and the tele extremity, the lens is moved to the nearer one of the tele extremity or the wide extremity with respect to the current lens position. Namely, if the lens is located near the wide extremity, the lens is moved to the wide extremity. If the lens is located near the tele extremity, it is moved to the tele extremity.

Figure 28:
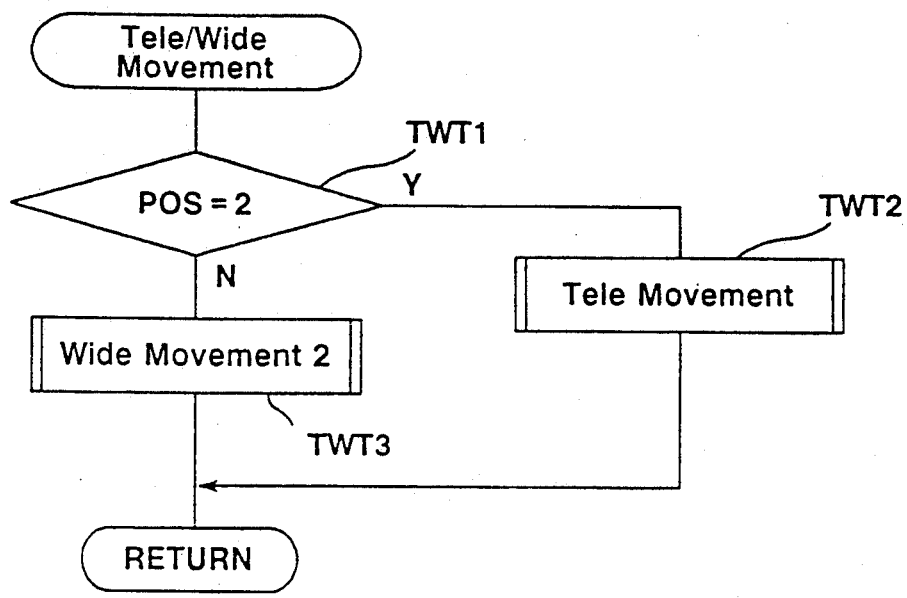

FIG. 28 shows a flowchart of a second modification of the TELE/WIDE MOVEMENT subroutine. In the second modification, it is judged (in step TWT1) whether or not POS is "2". If the POS is judged to be equal to "2" in step TWT1, the TELE MOVEMENT subroutine (step TWT2) is called. If it is judged that the POS is not equal to "2", the WIDE MOVEMENT 2 (step TWT3) is called. According to this second modification, when the lens is located at the wide extremity, it is moved to the tele extremity. If the lens is not located at the wide extremity, it will be always moved to the wide extremity.

Figure 29:
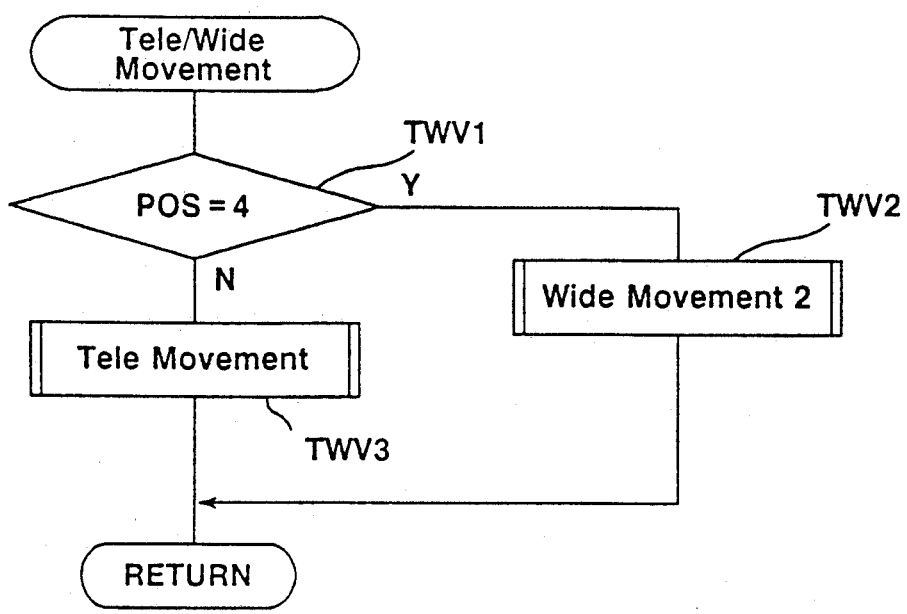

FIG. 29 is a flowchart illustrating a third modification of the TELE/WIDE MOVEMENT subroutine. In this processing, it is judged in step TWV1 whether POS equals "4". When POS is judged to be equal to "4" in step TWV1, the WIDE MOVEMENT 2 is called (in step TWV2). If it is judged that the POS is not equal to "4", the TELE MOVEMENT subroutine is called (in step TWV3).

According to the third modification, if the lens is located at the tele extremity, it is moved to the wide extremity, while if the lens is not at the tele extremity, it will be moved to the tele extremity.

WIDE MOVEMENT 2 SUBROUTINE

FIG. 30 is a flowchart illustrating the WIDE MOVEMENT 2 subroutine, which is called in the TELE/WIDE MOVEMENT subroutine.

First, the zoom motor is reversely rotated (in step ZW1). Next, the lens position detecting processing and the focal length display processing are executed (in steps ZW2 and ZW3). Then, it is judged (in step ZW4) whether or not POS equals "1". Then, the steps ZW2 through ZW4 are repeatedly executed until the POS equals "1". When it is judged in step ZW4 that the POS equals "1", the zoom motor is forwardly rotated (in step ZW6) after waiting for 50 ms (in step ZW5). Then, the lens position detecting processing is performed (in step ZW7). In step ZW8, it is judged whether POS equals "2". The steps LM7 and LM8 are repeated until the POS equals "2". When the POS is judged to be equal to "2", the zoom motor brake is applied, and the processing is returned to the point where the subroutine was called.

After this WIDE MOVEMENT 2 subroutine is completed, the lens will be located at the wide extremity.

In this subroutine, the lens is driven to be moved to the position corresponding to the POS equals "1" by reversely rotating the zoom motor, and then the lens is moved back to the wide extremity (POS=2) by forwardly rotating the zoom motor. Backlash may occur in the mechanical system when the zoom motor is reversely rotated, but on the other hand, when the zoom motor is forwardly rotated no backlash occurs in the mechanical system. Accordingly, as the rotation of the zoom motor is controlled as above, the backlash can be avoided.

ZOOM TO TELE SUBROUTINE

The zoom motor is forwardly rotated (in step ZN1) as shown in FIG. 31, when the zoom lever 12 is displaced in the direction indicated by arrow r1 (the tele extremity side). The next stop position for step-movement of the lens is stored in a memory STDIV (in step ZN2). The memory STDIV is a memory for storing the next stop position when the step-zoom is employed. If the lens is moved toward tele extremity, the DIV at the tele extremity side is stored in the memory STDIV, with respect to the current DIV. Next, the flag ?STEP is set to "1" (in step ZN3). The flag ?STEP is used for judging whether the selected lens movement is the step zoom movement or the continuous zoom movement when the ZOOM TO TELE subroutine or the ZOOM TO WIDE subroutine is executed. In the camera embodying the present invention, the zoom lever 12 is composed so that step zoom movement can be selected when the zoom lever is slightly displaced from its neutral position, and continuous zoom movement can be selected when the zoom lever 12 is further displaced from its halfway displaced position. Therefore, the flag ?STEP is set to "1" as a default value regarding that the step zoom movement has been selected.

Next, the lens position detecting processing and the focal length display processing are executed (in steps ZN4 and ZN5), and it is judged (in step ZN6) whether the zoom tele switch TELE is ON or OFF. When the zoom tele switch TELE is OFF, the zoom motor brake is applied (in step ZN7). Then, the processing is returned to the MAIN processing (in step MA63). Namely, even though a photographer releases the zoom lever 12 after having lightly operated the zoom lever 12, the lens movement immediately stops. When the zoom tele switch TELE is ON, it is judged (in step ZN8) whether or not the POS is equals "4". When it is judged in step ZN8 that the POS equals "4", the zoom motor brake is applied (in step ZN7), and the processing is returned to the MAIN processing (in step MZ63). It is because, when the POS equals "4", the lens has been moved to the tele extremity.

When it is judged in step ZN8 that the POS is not "4", it is judged (in step ZN9) whether the zoom switch is ON or OFF. When the zoom mode switch MVSW is OFF, the flag ?STEP is set to "0". Then the processing is returned to the lens position detecting processing (in step ZN4). As long as the zoom mode switch MVSW is OFF, steps ZN4 through ZN6 and steps ZN8 through ZN10 are repeated, thereby causing the zoom lens to continuously come out. In response to the movement of the lens, the focal length being displayed is changed.

If the zoom mode switch MVSW is set to ON, the processing is shifted to step ZN11, where it is judged whether or not the flag ?STEP equals "1". As the flag ?STEP has been set to "0" when the lens is continuously coming out, step ZN12 is skipped and the zoom motor brake is applied (in step ZN13). Then, the processing is returned to the MAIN processing (in step MA63). Thus, if continuous zoom movement of the lens is selected, the lens movement can be stopped only by returning the zoom lever 12 to the position instructing the step zoom movement or when the tele extremity is reached.

When in performing the ZOOM TO TELE subroutine, the zoom tele switch TELE and the zoom mode switch MVSW are kept in an ON state, the processing is shifted to step ZN11 through the judgment processing in steps ZN6, ZN8 and ZN9. The processing in steps ZN6, ZN8 and ZN9 corresponds to the case that the continuous zoom movement is not selected, and the flag ?STEP equals "1". Therefore, the processing is shifted to step ZN12 for judging whether the current DIV is equal to the data stored in the memory STDIV. When the data of the current DIV is different from the data in the memory STDIV, steps ZN4 through ZN6, steps ZN8, ZN9, ZN11 and ZN12 is repeatedly executed until the current DIV equals the data stored in the memory STDIV. If it is judged that the current DIV becomes equal to the data in the memory STDIV in step ZN12, the processing is shifted to step ZN13, the zoom motor brake is applied, and the processing is returned to the MAIN processing (in step MA63).

In the MAIN processing, when the flag ?ZOOMEN is once set to "0" (in step MA13), and the zoom tele switch TELE is kept on being ON, steps MA15 and MA16 are skipped, and the processing following step MA17, inclusive, is executed. Therefore, when the processing reaches step MA51, steps MA54 and MA55 are skipped. Accordingly, if the step zoom movement of the lens is selected, the next step zoom movement cannot be performed unless the zoom lever 12 is returned to its neutral position and the zoom tele switch TELE is set to OFF.

ZOOM TO WIDE SUBROUTINE

If the zoom lever is displace from the neutral position toward the wide side (in the direction of arrow r2 in FIG. 1), the zoom motor is reversely rotated (in step ZR1) as shown in FIGS. 32A-32B. And as the wide zoom is selected, the DIV of the next step stop position in the wide side with respect to the current DIV is stored in the memory STDIV (in step ZR2). Next, the flag ?STEP is set to "1" (in step ZR3). The lens position detecting processing and the focal length display processing are executed (in steps ZR4 and ZR5), and it is judged (in step ZR6) whether the zoom wide switch WIDE is set to OFF or ON. When the zoom wide switch WIDE is set to OFF, the zoom motor is forwardly rotated after waiting for 70 ms (in steps ZR7 and ZR8) in order to eliminate the mechanical backlash of the mechanical system. Next, the lens position detecting processing is executed (in step ZR10) after waiting for 50 ms (in step ZR9). Then, the processing is shifted to step ZR11, where it is judged whether or not the POS is "1". In this case, the waiting processing (in steps ZR7 and ZR9) is performed in order to prevent the display of the focal length from being increased, in spite of wide zoom being selected, due to the backlash eliminating processing.

When it is judged that the POS is not "1" in step ZR11, the focal length is displayed (in step ZR12'), the zoom motor brake is applied (in step ZR13'), and the processing is returned to the MAIN processing (in step MA59). Thus, when the zoom lever 12 is released after having been operated, the backlash eliminating processing is executed. Thereafter, if the POS is not equal to "1", the lens movement is stopped. If it is judged in step ZR11 that the POS equals "1" after the backlash eliminating processing, the lens position detecting processing is executed (in step ZR12). Next, it is judged (in step ZR13) whether or not the POS is equal to "2". Steps ZR12 and ZR13 are repeated until the POS equals "2". The zoom motor brake is applied (in step ZR14) when it is judged that the current POS is "2". Then, the processing is returned to the MAIN processing (in step MA59). As above, the lens is positioned at the wide extremity. Even if the zoom lever 12 is released (placed at its neutral position) after having been lightly operated, the lens movement can be stopped immediately.

When it is judged that the zoom wide switch WIDE is ON in step ZR6, it is further judged (in step ZR15) whether or not the POS is "1". When that the POS equals "1", the zoom motor forward rotation processing is executed after waiting for 50 ms (in steps ZR16 and ZR17). And the lens position detecting processing is executed (in step ZR12). Next, it is judged (in step ZR13) whether or not the POS equals "2". If the POS is not equal to "2", steps ZR12 and ZR13 are repeatedly executed. If the POS equals to "2", the zoom motor brake is applied (in step ZR14) when the current POS equals "2", and the processing is returned to the MAIN processing (in step MA59). In the processing in steps ZR16, ZR17, ZR12 through ZR14, elimination of the backlash at the wide extremity is performed.

When it is judged in step ZR15 that the POS is not equal to "1", it is judged (in step ZR18) whether the zoom mode switch MVSW is ON or OFF. When the zoom mode switch MVSW is OFF, the flag ?STEP is set to "0" (in step ZR19). And then, the processing is returned to the lens position detecting processing (in step ZR4), and the processing in steps ZR4 through ZR6, ZR15, ZR18 and ZR19 is repeated as long as the zoom mode switch MVSW is kept in an OFF state, thereby causing the zoom lens to be continuously moved toward the camera body. The focal length display is changed in response to the movement of the lens. Namely, the displayed focal length of the lens is decreased in response to the movement of the lens toward the wide side.

If the zoom mode switch MVSW is set to ON, the processing is shifted to step ZR20, where it is judged (in step ZR20) whether or not the flag ?STEP equals "1". As the flag ?STEP is set to "0" when the lens is continuously moved towards the camera body, the processing similar to the processing when the zoom wide switch WIDE is set to OFF, that is, the processing in steps ZR7 through ZR14 or steps ZR7 through ZR13', is performed.

When the zoom wide switch WIDE is ON and the zoom mode switch MVSW is kept remained in ON state, the processing reaches step ZR20 via steps ZR6, ZR15 and ZR18 unless the POS equals "1". This processing in steps ZR6, ZR15 and ZR18 corresponds to the case that the continuous zoom movement has not been selected. In this case, the flag ?STEP is kept on being set to "1", and the processing is shifted to step ZR24, where it is judged whether or not the current DIV is equal to the data stored in the memory STDIV. When the current DIV is different from the data stored in the memory STDIV, the processing is shifted to step ZR4, and the processing in steps ZR15, ZR4 through ZR6, steps ZR18, ZR20 and ZR24 is repeatedly executed. Then, the processing is shifted to step ZR25 when the current DIV is judged to be equal to the data stored in the memory STDIV in step ZR24.

In step ZR25, a stand-by processing for 50 ms waiting is performed. Next, the zoom motor forward rotation (in step ZR26) and the lens position detection processing (in step ZR27) are executed. In step ZR28, it is judged whether or not the current DIV equals the data stored in the memory STDIV. The processing in steps ZR27 and ZR28 is repeated until the current DIV equals the data stored in the memory STDIV. When the DIV equals the data stored in the memory STDIV, the zoom motor brake is applied (in step ZR29), and the processing is returned to MAIN processing (in the MA59).

If the flag ?ZOOMEN is once set to "0" (in step MA13) in the MAIN processing, and the zoom wide switch WIDE is remained in ON state, the processing in step MA16 is skipped, and the processing after step MA17 is executed. Therefore, when the processing reaches step MA51, steps MA54 and MA55 are skipped. Accordingly, when step movement of the lens is selected, the next step movement can not be performed unless the zoom lever 12 is released and the zoom wide switch WIDE is once set to OFF.

EXPOSURE/SHOOTING SYSTEM SETTING SUBROUTINE

FIG. 33 is a flowchart illustrating an EXPOSURE/SHOOTING SYSTEM SETTING subroutine, which is called in step MA44 of the MAIN processing. This is a routine for setting the above mentioned exposure system and shooting system according to inputs of the mode switch EXPSW, the drive switch DRIVSW, and the select switch SLSW.

As this subroutine starts, the state of the flag ?SELECT is judged in step ET1. The flag ?SELECT is set to "1" when only the select switch SLSW is set to ON between the switches used for setting in the preceding setting, and is cleared if the select switch SLSW is set to OFF after a variable setting routine which is described later.

If the flag ?SELECT is equal to "0", it is judged that the processing is not under the VARIABLE SETTING subroutine, and an exposure/shooting system display are executed in steps ET2 and ET3. The condition of the zoom tele switch TELE and the zoom wide switch WIDE is checked in steps ET4 and ET5. If either of the zoom tele switch TELE or the zoom wide switch WIDE is set to ON, it is judged that the zoom processing is performed, and, in step ET6, a three-second timer, which is used for making a judgment for executing the forced rewind, is started. In step ET7, the flag ?MDSWOF is set to "0", which means that the drive switch DRIVSW, the select switch SLSW, the photometric switch SWS, the zoom tele switch TELE and the zoom wide switch WIDE are set to OFF. Then the processing returns to the point where the subroutine was called in the MAIN processing. The flag ?MDSWOF is set to "1" in step ET16 when all the above switches are set to OFF, and is used for detecting the point where the mode switch EXPSW and the drive switch DRIVSW are set from OFF to ON.

If both the zoom tele switch TELE and the zoom wide switch WIDE are set to OFF, the flag ?MDZMOF which indicates that both the zoom tele switch TELE and the zoom wide switch WIDE are in OFF state is set to "1", in step ET8. Then the condition of the photometric switch SWS is judged in step ET9. The flag ?MDZMOF is used for detecting the point where the zoom tele switch TELE or the zoom wide switch WIDE is set from OFF to ON, in a VARIABLE SETTING subroutine which is described later. If the photometric switch SWS is set to ON, the processing is returned to the point where the subroutine was called in the MAIN processing through steps ET6 and ET7 without setting the exposure/shooting systems used in the AEAF processing.

If either of the above three switches (i.e., tele switch, wide switch, and photometry switch) is in an OFF state, the processing is shifted to steps ET10 and ET11, and the condition of the mode switch EXPSW and the drive switch DRIVSW is judged. If the mode switch EXPSW and the drive switch DRIVSW are in OFF state, the forced rewind mode is canceled in step ET12 if it is effected. Then, after the shooting system display processing is executed in step ET13, the three-second timer is restarted in step ET14.

In step ET15, the state of the select switch is detected. The flag ?SELECT is set to "1" in step ET17 and the flag ?MDSWOF is set to "0", in step ET7 if the select switch SLSW is in an ON state. If the select switch SLSW is set to OFF, the flag ?MDSWOF is set to "1", and then the processing is returned to the point where the subroutine was called in the MAIN processing. As the flag ?SELECT is set to "1", in step ET17 it is judged in step MA45 of the MAIN processing that the VARIABLE SETTING subroutine is being performed, and the zoom-related processing is skipped in the MAIN processing. It is because the zoom tele switch TELE and the zoom wide switch WIDE are commonly used in ZOOM TO TELE/ZOOM TO WIDE subroutines, on the one hand, and VARIABLE SETTING subroutines, on the other, that it is necessary to clarify in which subroutine the setting is executed.

If the zoom tele switch TELE, the zoom wide switch WIDE and the photometric switch SWS are set to OFF, and the mode switch EXPSW is set to ON, the processing goes from step ET10 to ET18, and the three-second timer is started.

In step ET19, if the flag ?MDSWOF is set to "1", that is, only when both the mode switch EXPSW and the drive switch DRIVSW are set to OFF in the preceding setting processing, the processing is shifted to steps ET20 through ET26, and the setting is executed. Therefore, any change of the setting should be accepted after the switch is once set to OFF. If the setting is performed when the either switch is set to ON in the preceding setting, the setting is continuously changed when the button is kept depressed continuously, which causes the operability of the camera to be worsened.

If it is judged in step ET20 that the mode switch EXPSW is set to ON, the increment and limit processing of the counter EXPMODE, and the exposure system display processing are performed in steps ET21 through ET23. If the mode switch EXPSW is set to OFF, thus indicating that the drive switch DRIVSW is set to ON, in steps ET24 through ET26, the increment and limit processing of the counter DRIVE MODE, and the shooting system display processing are performed. In either case, after setting the flag MDSWOF to "0" in step ET7 to indicate that the mode switch EXPSW and the drive switch DRIVSW are set to ON, the processing is returned to the point where the subroutine was called in the MAIN processing. In this case, the limit processing is such a processing that the counter EXPMODE is set to "$0_H$" and the counter DRIVEMODE is set to "$0000_B$" when the counter EXPMODE is further incremented from "$2_H$" or the counter DRIVEMODE is further incremented from "$0011_B$".

If it is judged in step ET10 and step ET11 that the mode switch EXPSW and the drive switch DRIVSW are set to OFF and ON, respectively, the condition of the select switch SLSW is judged in step ET27. In case that the select switch SLSW is in ON state, the processing is shifted to step ET18. In case that the select switch SLSW is in OFF state, it is judged whether or not the three-second timer which has been started in steps ET6, ET14, or ET18 is timed up. The processing proceeds to step ET19 unless and until the time up of the three-second timer is judged. If the three-second timer is timed up, the shooting system is set to the forced rewind.

VARIABLE SETTING SUBROUTINE

FIG. 34 is a flowchart of the VARIABLE SETTING subroutine which is diverged from step ET1 of the EXPOSURE/SHOOTING SYSTEM SETTING subroutine. This subroutine is executed only when the select switch SLSW was in an ON state in the preceding exposure/shooting system setting processing. In this VARIABLE SETTING subroutine, three variables are set, such as the number of the frames for the SELF-TIMER shooting, the interval starting time, and the interval time.

Each variable, its corresponding data stored in the memory, and an indication to be displayed in the LCD panel 19 are shown in the table 1 and 2 below:

TABLE 1

| Number of frames for Self-Timer | Variable data | Indication |
|---|---|---|
| 1 | 0H | 1 EX |
| 2 | 1H | 2 EX |
| 3 | 2H | 3 EX |
| 4 | 3H | 4 EX |
| 5 | 4H | 5 EX |

TABLE 2

| Interval starting time Interval time | Variable data | Indication |
|---|---|---|
| 10 seconds | 0H | 10 s |
| 20 seconds | 1H | 20 s |
| 30 seconds | 2H | 30 s |
| 40 seconds | 3H | 40 s |
| 50 seconds | 4H | 50 s |
| 1 minute | 5H | 1 m |
| 2 minutes | 6H | 2 m |
| 3 minutes | 7H | 3 m |
| 4 minutes | 8H | 4 m |
| . | . | . |
| . | . | . |
| . | . | . |
| 9 hours | 1CH | 9 h |
| 10 hours | 1DH | 10 h |
| 12 hours | 1EH | 12 h |
| 24 hours | 1FH | 24 h |

Step PS1 in FIG. 34 illustrates a VARIABLE SELECTION subroutine for selecting the variables which is illustrated in FIG. 35. The VARIABLE SELECTION subroutine is a processing for selecting one of the memory data to be changed among three sets of memory data for the number of frames for SELF-TIMER shooting, the INTERVAL starting time, and the INTERVAL time. Selection of respective data corresponds to the value of the variable SELEMODE. SELEMODE=0 corresponds to no variable, SELEMODE=1 corresponds to number of frames for self-timer shooting, SELEMODE=2 corresponds to the interval starting time and, SELEMODE=3 corresponds to the interval time.

If the shooting system is set to the self-timer shooting, the SELEMODE is set to "1" in the VARIABLE SELECTION subroutine, the return value "Variable Present" is set, and the processing is returned to the point where the subroutine was called in the VARIABLE SETTING subroutine. If the shooting system is set to the interval shooting, the SELEMODE is changed to "3" if currently set to "2". Otherwise the SELEMODE is set to "2", the return value "Variable Present" is set, and the processing is returned to the point where it was called. In case the shooting system is neither the self-timer shooting nor the interval shooting, the SELEMODE is set to "0" as there is no need to set the variable, and the return value "Variable Absent" is set. Then the processing is returned to the VARIABLE SETTING subroutine.

In the VARIABLE SETTING subroutine, if the return value of the variable selecting processing is "Variable Present", the data displayed in the LCD panel 19 is stored in steps PS2 and PS3, and all the indications are turned OFF once. Then the VARIABLE DISPLAY subroutine in FIG. 36 is carried out.

The VARIABLE DISPLAY subroutine is a routine for displaying the selected variable data with reference to the variable SELEMODE which has been set in the VARIABLE SELECTION subroutine. As the VARIABLE DISPLAY subroutine starts, the display of the exposure/shooting system is once turned OFF, number of frames for the self-timer shooting is displayed if SELEMODE=1, and the self-timer indication mark is illuminated to urge a photographer to set the number of frames.

If SELEMODE=2, the interval starting time is displayed, and the INT mark which indicates the interval mode, the mark "S" indicating the starting time and "→" are illuminated. In this camera, it is possible to set the interval start time by a relative time. In the conventional cameras, it has been so composed that the interval shooting start time can be set by an absolute time. Therefore, a time table which is different from the table used in setting of the interval time would be needed, and further, the conventional cameras must have a clock function. A camera according to the present invention can utilize the same time table both for the interval start time setting and the interval time setting. Consequently, the camera embodying the present invention does not need unnecessary to have any clock function.

In case of SELEMODE=3, the interval time is displayed, and the marks "INT" and "←→" showing the interval time are illuminated.

As the VARIABLE DISPLAY subroutine is completed, the selected variable data is incremented in steps PS5 through PS12 when the zoom tele switch TELE is ON if both the zoom tele switch TELE and the zoom wide switch WIDE are set to ON in the preceding setting processing, and the variable data is decremeted when the zoom wide switch WIDE is set to ON. If both the zoom tele switch TELE and the zoom wide switch WIDE are set to OFF, the flag ?MDSMOF is set to "1". Contrarily, if either switch is turned ON, the VARIABLE DISPLAY subroutine is executed after setting, in step PS7 or PS12 and the flag ?MDSMOF is set to "0".

The processing in steps PS14 through PS18 is executed regardless of the presence or absence of the variable data.

If the flag ?MDZMOF is set to "0", that is, in case either of the zoom tele switch TELE or the zoom wide switch WIDE is set to ON in the preceding setting, or in case that the variable data are changed, it is judged in step PS14 that the variable data is being set without restoring the display; Thus, the processing is returned to the point where the subroutine was called in the MAIN processing. In case the select switch SLSW is set to ON even though the flag ?MDSMOF is "1", as determined at step PS14 the processing is returned to the MAIN processing as well.

As the flag ?MDZMOF is "1" when the processing reaches step PS14 with the variable data being absent (i.e., ?SELEMODE=0 the flag ?SELECT is set to "0" if the select switch SLSW is OFF, and the processing is returned to the MAIN processing. In case both the zoom tele switch TELE the zoom wide switch WIDE are judged to be OFF, and variable data exists, the flag ?SELECT is set to "0" when the select switch SLSW is OFF, and the data stored in the memory is displayed in the LCD panel 19 at step PS18. Then, the processing is returned to the MAIN processing.

The processing in steps PS14 through PS18 is executed regardless of presence or absence of the variable data.

If the flag ?MDZMOF is set to "0" that is, in case either of the zoom tele switch TELE or the zoom wide switch WIDE is set to ON in the preceding setting, or in case the variable data is being set it is judged is step PS14 that the variable data is being set without restoring the display; The processing is returned to the point where the subroutine was called in the MAIN processing. In case the select switch SLSW is set to ON even though the flag ?MDSMOF is "1", as determined at step PS14 the processing is returned to the MAIN processing as well.

As the flag ?MDZMOF is "1" when the processing reaches step PS14 with the variable data being absent (i.e., SELEMODE=0) the flag ?SELECT is set to "0" if the select switch SLSW is OFF, and the processing is returned to the MAIN processing. In case both the zoom tele switch TELE the zoom wide switch WIDE are judged to be OFF, and even variable data exists, the flag ?SELECT is set to "0" when the select switch SLSW is OFF, and the data stored in the memory is displayed in the LCD panel 19. Then, the processing is returned to the MAIN processing.

The VARIABLE SETTING subroutine is described in detail with an example.

If each of the zoom tele switch TELE, the zoom wide switch WIDE and the photometric switch SWS is in OFF state, the exposure system is changed one after another when the mode switch EXPSW is set from OFF to ON. In order to change the exposure system, it is necessary to set the mode switch EXPSW to ON after it was set to OFF once. The exposure system is changed one after another among three modes of AUTO, Strobe ON, and Strobe OUT, when the mode switch EXPSW is repeatedly changed ON/OFF.

If the drive switch DRIVSW is changed from OFF to ON, the shooting system is changed one by one. The shooting system is changed among four modes, i.e., FRAME-BY-FRAME, SELF-TIMER, SELF-TW, and INTERVAL modes.

In case the shooting system is changed from FRAME-BY-FRAME shooting to the SELF-TIMER, the VARIABLE SETTING subroutine is called when the select switch SLSW is set to ON after the drive switch DRIVSW is set to OFF, and the processing stays in the setting processing of the number of frames of the SELF-TIMER. By operating the zoom tele switch TELE or the zoom wide switch WIDE with the select switch SLSW being in ON state, the number of frames for the SELF-TIMER can be changed. If this change is made when the zoom tele switch TELE and the zoom wide switch WIDE are set from OFF to ON, the data is changed by one step even though the button is kept on being depressed. If the select switch SLSW is set from ON to OFF, the setting processing is canceled.

When the shooting system is changed from the SELF-TW to the INTERVAL mode, the setting processing of the interval starting time starts when the select switch SLSW is set to ON after the drive switch DRIVSW is set to OFF. It is possible to set the interval starting time when the zoom tele switch TELE and the zoom wide switch WIDE are set to ON while the select switch SLSW is in an ON state. If the select switch SLSW is set to OFF, the setting processing is canceled. However, if the select switch SLSW is set to ON again, the setting mode of the interval time is effected. Then, it is possible to set the interval time by setting the zoom tele switch TELE and the zoom wide switch WIDE while the select switch SLSW is in ON state. When the select switch SLSW is set to OFF, the setting processing is terminated. In this case, it is possible to repeatedly set the interval starting time and the interval time.

The SELF-TIMER shooting or the INTERVAL shooting is executed based on the set data when the release switch SWR is set to ON after the above setting is completed.

Referring back to the EXPOSURE/SHOOTING SYSTEM setting processing, the three-second timer is checked in step ET28 (FIG. 33-B) only if the drive switch DRIVSW is kept in an ON state. If it is judged that the time is up, the shooting system is set to the FORCED REWIND mode in step ET29. If the photometric switch SWS is set to ON in the FORCED REWIND mode while the drive switch DRIVSW is in ON state, the film rewind is executed.

AEAF CONTROL ROUTINE

With referring to FIGS. 37-A through 37-C, and FIGS. 38-A through 38-C, the AEAF CONTROL routine of the shutter-related control system is described below. If the shooting system is set to FRAME-BY-FRAME shooting, this routine is executed when the photometric switch is changed from OFF to ON in the main processing. When a second or later shot is taken, after the film winding is executed when the shooting system is set to the SELF-TIMER mode or SELF-TW mode, or after the INTERVAL CONTROL subroutine is completed when the shooting system is set to the INTERVAL mode, the AEAF CONTROL routine is executed from the terminal of "AEAF CONTROL 3".

In steps EF1 through EF3, the range finding data is input, and the lens latch operation (LL) is executed, and the Green lamp illumination is determined. If an object distance is within a focusible range of the camera, the green lamp is continuously illuminated. If not, the green lamp blinks to warn the photographer that the object distance is out of the focusible range. The LL operation is an operation for determining the amount of the lens to be moved in order to focus the object based on the input range finding data.

In case the AEAF CONTROL routine is executed from the terminal of the AEAF control 3, that is, in the case shooting system is set to the INTERVAL, the SELF-TIMER, or the SELF-TW mode, and the shot is the second one or thereafter, the range finding and the LL processings are not carried out. Therefore, in such a case, the preceding LL data is used as it is, thereby leaving the focal point the same as it was for the first shot. It is because of preventing slip of the focal point when the object to be photographed moves from the range finding area of the central portion of the frame.

In step EF4, the DX code representing the ISO sensitivity of a film is input, and the input DX code data is converted to an Sv value which is used for the exposure operation according to Table 3. Further, step EF4, in corresponding to the Sv value (DX code data), a shutter speed (exposure) compensation value ΔEvsmin of a minimum shutter speed (exposure) value Evs, min and a compensation threshold exposure value ΔEvsfl of the threshold exposure value of the strobe flashing Evsfl are set for the AUTO mode of the exposure system.

TABLE 3

| DX | 2 | 3 | 4 | ISO | Sv | Δ Evsmin | Δ Evsfl |
|---|---|---|---|---|---|---|---|
| | 1 | 1 | 1 | 25 | 3.0 | 0.00 | 0.0 |
| | 1 | 1 | 0 | 50 | 4.0 | 0.00 | 0.0 |
| | 1 | 0 | 1 | 100 | 5.0 | 0.00 | 0.0 |
| | 1 | 0 | 0 | 200 | 6.0 | 0.25 | 0.5 |
| | 0 | 1 | 1 | 400 | 7.0 | 0.50 | 1.0 |
| | 0 | 1 | 0 | 800 | 8.0 | 0.50 | 1.0 |
| | 0 | 0 | 1 | 1600 | 9.0 | 0.50 | 1.0 |
| | 0 | 0 | 0 | 3200 | 10.0 | 0.50 | 1.0 |

In the conventional electronically controlled camera, the threshold exposure vale of automatic strobe flashing is kept constant regardless of the sensitivity of a film to be used. Accordingly, when a highly sensitive film is used, the threshold brightness value for an automatic strobe flashing and the lower limit of the AE interlocking range are set to relatively lower values with respect to a standard value.

In the camera embodying the present invention, if a highly sensitive film is used, not only the threshold brightness value of automatic strobe flashing is lowered, but also lowered picture quality due to blur is prevented. If the film sensitivity is high, the threshold exposure value of the strobe flashing Evsfl is increased to cause the threshold brightness value of automatic strobe flashing Evsfl to be suppressed to half the level employed in the conventional cameras, and the minimum shatter speed (exposure) value Evsmin is increased. Thereby the minimum shutter speed is raised. ΔEvsmin and ΔEvsfl are the compensation values of the minimum shutter speed value Evsmin and of the threshold exposure value Evsfl, respectively, with respect to the film sensitivity ISO 100 which is used as the standard in this embodiment.

Table 4 and Table 5 show the threshold brightness value of the flashing and an AE interlocking range of the camera according to the present invention. Table 4 shows the values at the wide side, and Table 5 shows the values at the tele side. (Where, the brightness value Lv = the object brightness value Bv + 5).

TABLE 4

| Wide | ISO 100 | ISO 200 | ISO 400 |
|---|---|---|---|
| Threshold brightness value (Lv) | 9.00 | 8.50 | 8.00 |
| Threshold exposure value (Evsfl) | 9.00 | 9.50 | 10.00 |
| Lower limit of AE interlocking range (Lv) | 9.00 | 8.25 | 7.50 |
| Minimum shutter speed value (Evsmin) | 9.00 | 9.25 | 9.50 |
| Shutter speed (sec.) | 1/45 | 1/54 | 1/64 |

TABLE 5

| Tele | ISO 100 | ISO 200 | ISO 400 |
|---|---|---|---|
| Threshold brightness value (Lv) | 10.75 | 10.25 | 9.75 |
| Threshold exposure value (Evsfl) | 9.50 | 10.00 | 10.50 |
| Lower limit of AE interlocking range (Lv) | 10.75 | 10.00 | 9.75 |
| Minimum shutter speed value (Evsmin) | 9.50 | 9.75 | 10.00 |
| Shutter speed (sec.) | 1/64 | 1/76 | 1/90 |

As the minimum shutter speed value Evsmin changes according to the sensitivity of a film if the above setting is employed, it is possible to effectively prevent influences causing blur for a high sensitive film. It should be noted that the shutter speed is calculated from the exposure value Evs and the aperture value Avs whith an aperture value Av being 3.5.

In case the camera is controlled referring to the above table, the strobe flashing range may be partially overlapped by the AE interlocking range in the area where Evsmin < Evsfl. In this case, by executing the FM control operation with setting the aperture value Avs to the value lower than that obtained in the FM operation by approximately 1 Ev, a preferable photograph can be obtained without it being excessively over-exposed.

In step EF5, of the AEAF control process (FIG. 37A) a compensation amount α of open aperture value (f-number) is determined, and in step EF6, the threshold exposure value of the strobe flashing Evsfl and the minimum shutter speed value Evsmin for the AUTO mode of the exposure system, and a strobe guide number change amount ΔGNo with respect to the wide extremity are obtained based on the focal length code DIV by referring to the value-relationship shown in Table 6.

TABLE 6

| DIV | α | Evsmin, Evsfl | Δ GNo. |
|---|---|---|---|
| 1 Wide extremity | 0 0/8 | 9 0/8 | 0/8 |
| 2 | 0 1/8 | 9 0/8 | 0/8 |
| 3 | 0 1/8 | 9 0/8 | 0/8 |
| 4 | 0 2/8 | 9 0/8 | 1/8 |
| 5 | 0 2/8 | 9 0/8 | 1/8 |
| 6 | 0 3/8 | 9 0/8 | 1/8 |
| 7 | 0 3/8 | 9 0/8 | 1/8 |
| 8 | 0 4/8 | 9 0/8 | 1/8 |
| 9 | 0 4/8 | 9 0/8 | 2/8 |
| A | 0 5/8 | 9 0/8 | 2/8 |
| B | 0 5/8 | 9 0/8 | 2/8 |
| C | 0 6/8 | 9 0/8 | 2/8 |
| D | 0 6/8 | 9 0/8 | 2/8 |
| E | 0 7/8 | 9 1/8 | 3/8 |
| F | 0 7/8 | 9 1/8 | 3/8 |

TABLE 6-continued

| DIV | α | Evsmin, Evsfl | Δ GNo. |
|---|---|---|---|
| 10 | 1 0/8 | 9 2/8 | 3/8 |
| 11 | 1 0/8 | 9 2/8 | 3/8 |
| 12 | 1 1/8 | 9 3/8 | 3/8 |
| 13 | 1 1/8 | 9 3/8 | 4/8 |
| 14 | 1 2/8 | 9 4/8 | 4/8 |
| 15 Tele extremity | 1 2/8 | 9 4/8 | 4/8 |

The AEFM (automatic exposure and flashmatic) CALCULATION subroutine shown in FIG. 39 is called in step EF7, base on the above data and the photometry data input from the sub CPU in step EF6, and the AE data and FM data is set.

In case the calculated FM data means a strobe flashing, mode it is judged in steps EF8 through EF13 whether or not the charging voltage of a strobe capacitor reaches the flashable level of the strobe. If the charging voltage reaches the flashable level thereof, the red lamp is illuminated, and the condition that strobe flashing is prepared is displayed. If the strobe flashing is not prepared, the processing enters a strobe charging stand-by processing in steps EF14 through EF18.

It should be noted that if the flag ?AUTORET is set to "1" (as determining at step EF10) and the shooting system is set to the INTERVAL mode, (determined at step EF10) the voltage of the strobe capacitor is not checked in step EF13. It is because in the INTERVAL mode, the charging control is executed on every shot as shown in the INTERVAL CONTROL routine in FIG. 42. If the flag ?AUTORET is set to "1", the red lamp indicator is not illuminated or blinked (at step EF12) because it is regarded that a photographer is apart from the camera. The flag ?AUTORET is set to "1" when the second or the later shot is made in each of the shooting systems of INTERVAL mode, SELF-TIMER mode, or SELF-TW mode. It is mainly used for automatic release with skipping the status judgment of a photometric switch and a release switch to enter the release sequence.

If it is judged in step EF8 that the strobe is not to be flashed, the processing in steps EF9 through EF13 is skipped as the strobe charging is unnecessary, and the processing following step EF21 is started.

In case that the flag ?AUTORET is "1", that is, if the shooting system is set to the SELF-TIMER, SELF-TW or INTERVAL mode, and the succeeding shot is a second or later shot in the mode, in steps EF14 through 18 of the charging stand-by processing, a DISCONTINUANCE subroutine is called (in step EF18). In all the other cases, charging control is repeated until the charging is completed, repeating the photometric switch judgment. When the charging is completed, (as judged at step EF17) the processing goes back to step EF8. If the return value from the DISCONTINUANCE subroutine during the charging is YES, or when the photometric switch SWS is turned OFF, the green lamp and the red lamp are turned OFF in step EF19, and the charging is stopped in step EF20. Then, the control is returned to the top of the MAIN processing.

In steps EF21 through EF23, each data of a set LL, AE and FM is output to the sub CPU.

Further, if the second or later shot in either of the shooting system of INTERVAL, SELF-TIMER, or SELF-TW mode is made, the judgments of the photometry switch SWS and the release switch SWR are skipped, and the processing is jumped to step EF43 (FIG. 38-B). In steps EF25 and EF26, if the release switch SWR is set to ON while the photometric switch SWS is kept on being set to ON, the processing is shifted to step EF28 (FIG. 38-A). If the photometric switch SWS is set to OFF before the release switch SWR is set to ON, the red lamp and the green lamp are turned OFF in step EF27, and the processing shifted to the top of the main processing.

The steps EF28 through EF54 in FIG. 38 show the processing for waiting for the release switch SWR to be set to OFF when the shooting system is set to a mode other than the FRAME-BY-FRAME mode. If the shooting system is set to the FRAME-BY-FRAME mode, step EF55 (FIG. 38-C) directly follows step EF36.

As aforementioned, since the second or later shot is made, while the processing continues toward step EF43, steps EF29 through EF35 are executed when the first shot is made in the INTERVAL mode, and steps EF37 through EF42 are executed when the first shot is made in the SELF-TIMER or SELF-TW mode.

If the shooting system is set to the INTERVAL mode, in steps EF29 through EF32, the interval starting time is set in the INT timer, the flag ?AUTOREL is set to "1", the interval mark is caused to blink for indicating the operated condition. Further, the indication of the remaining interval time is permitted by setting ?INTDDIS to "0". In step EF33, the maximum number of frames for the INTERVAL shooting is set in the exposure counter EXPC to 40 frames. Generally, the maximum number of frames is considered to be 36. In this embodiment, the maximum number of frames is set to 40 taking extra frames into account, and after the set number of shootings are completed, the INTERVAL shooting is ended. Thereby, the waste of the battery is prevented.

When the interval starting time is set to 10 seconds, the waiting of the starting time is executed in a below-described processing. In case that the starting time is more than 10 seconds, the processing is shifted from step EF34 to step EF35. Then, the green lamp and the red lamp are turned OFF, and the processing diverges to the INTERVAL CONTROL routine in FIG. 42.

In case that the shooting system is set to SELF-TIMER or SELF-TW as determined at step EF36, in steps EF37 through EF39, the time of 10 seconds is set in the INT timer, the flag ?AUTOREL is set to "1", and the self timer is caused to blink for indicating the operated condition. Consecutively, if the shooting system is set to the SELF-TIMER mode, (step EF40) a predetermined number of frames for the SELF-TIMER is set in the exposure counter EXPC (in step EF42). If the shooting system is set to the SELF-TW mode (as determined in step EF40), two frames are set in the EXPC in step EF41.

It should be noted that in case of an INTERVAL mode, when the interval time is less than 10 seconds, the necessity of changing the photometry data is low. However, if the interval time is 10 seconds or more, the brightness of an object can be changed, and it is more preferable to execute the photometry processing again. Therefore, the processing is once shifted to the INTERVAL CONTROL routine, and then the AEAF CONTROL routine is executed.

In steps EF43 through EF46, and step EF41 time up of the INT timer is waited, with repeating the judgment of DISCONTINUE, and the self timer lamp being illuminated or blinked. If the remaining time of the INT timer becomes less than three seconds, as determined at step EF45 the self-timer lamp is caused to blink at step EF46 for indicating the shot is made. If the return value of the DISCONTINUE subroutine becomes YES, the red lamp and the green lamp are turned OFF in step EF47, and the control is returned to the top of the MAIN processing.

In steps EF48 through EF54, the INT timer is reset according to the selected mode of the shooting system. In the case of the SELF-TIMER mode, if the number of frames for the SELF-TIMER is set to three or more, the INT timer is set to two seconds, while if the number of frames is set to one or two, the INT timer is set to five seconds. As the number of frames for SELF-TW is fixed at two frames, the INT timer is set to five seconds. In the case of the INTERVAL mode, in order to avoid a figure other than "0" being indicated when the INT timer is timed up, the display of the remaining time is prohibited and "0" is forcedly displayed. Then, the interval time is set in the INT timer.

Thus the interval between the shots is changed according to the number of frames for the SELF-TIMER. It is considered that there are two purposes of multiplex shooting in the SELF-TIMER mode: first, to obtain a plurality of photographs of the same scene; second, to obtain a photograph of different scenes. In this embodiment, it is so constructed that the interval time for respective purposes is different.

Namely, if the shooting is intended to obtain a plurality of photographs of the same scene it is preferable to a set the interval between the shots to short value. On the other hand, if the shooting is intended to obtain photographs of the different compositions, the interval is preferably to a longer amount for the sake of changing the scene, arrangement, etc.

Therefore, if it is judged for which purpose the shooting is executed, it is possible to automatically change the interval time for succeeding shots. Generally, the number of frames taken at a time is relatively many if the purpose is extra printing, and the number of frames is relatively fewer if the purpose is changing the scene. In this embodiment, when the number of frames for the SELF-TIMER shooting is more than three, it is judged that the purpose is obtaining a plurality of the same photographs, and the interval is set to two seconds, and when the number of frames for the SELF-TIMER is two, it is judged that the purpose is changing the scene and the interval is set to five seconds.

The release sequence in steps EF55 through EF62 is executed, after the release switch SWR is set to ON when the shooting system is set to the FRAME-BY-FRAME, or after the INT timer is timed up when the shooting systems is set to the mode other than the FRAME-BY-FRAME mode. In this sequence, after the red lamp, the green lamp, and the self-timer lamp are turned OFF, (steps EF55 and EF56) the shutter movement start signal is output to the sub CPU (step EF57) and it is confirmed that the shutter movement end signal is input from the sub CPU (step EF58).

In case the shooting system is set to the FRAME-BY-FRAME mode, the processing goes to the WIND routine. In other cases, the exposure counter EXPC is decremented and the processing goes to the WIND routine. Note that, if the counter EXPC equals "0", the processing goes to the WIND routine after the AUTOMATIC RELEASE CANCEL subroutine is called.

AEFM CALCULATION SUBROUTINE

FIG. 39 shows an AEFM subroutine which is called in step EF7 of the AEAF CONTROL routine.

In this processing, the exposure data which is output to the sub CPU is set, it is determined whether the strobe is actuated or not, and the aperture value Avs when the strobe flashes is calculated.

In step AM1, the flag ?BVMIN is cleared, and the FM data is set to a value larger than 8.0 or smaller than 3.5 which indicates that the strobe need not be flashed.

In steps AM2 through AM4, a photometry data (brightness value) is limited between the lower and upper limits. That is, the flag ?BVMIN is set to "1" when the photometry data (brightness value) Bv is less than or equal to the lower limit value of 1.0, thereby causing the photometry value to be rounded as 1, and the upper limit value is limited to 12.0.

In step AM5, the exposure value Evs is calculated from the compensation value α (of open f-number with respect to the wide extremity,) the film sensitivity value Sv, and the photometry data (brightness value) Bv.

If it is determined respectively in steps AM6 through AM8 that the exposure system is set to the STROBE ON, that the exposure system is set to the AUTO and the photometry data is equal to or less than the lower limit thereof, or that the exposure value Evs is less than the threshold exposure value of the strobe flashing Evsfl, FM calculation in steps AM9 through AM13 is executed. In all the other cases, the processing goes to step AM14 with the strobe in a non flashing condition. Note that, the threshold exposure value Evsfl at step AM8 is the value compensated with the aforementioned compensation value ΔEvsfl being added.

The AF step defined on the basis of the range finding data is converted into the aperture value Avs corresponding to the reference guide number in step AM9. And in step AM10, the aperture value is calculated such that the change amount ΔGNo. of the guide number corresponding to the zooming of strobe itself and the deviation (Sv−5) of the film sensitivity value with respect to the film sensitivity value of ISO 100 are added to Avs, and the compensation value α of open f-number corresponding to the changes of the focal length of the lens with respect to the wide extremity is subtracted therefrom.

In steps AM11 through AM13, the aperture value Avs is limited between the lower limit of 3.5 and the upper limit of 8.0, and the aperture Avs is set as the FM data.

The exposure value Evs is limited between the upper limit and the lower limit in steps AM14 and AM15, and the processing is returned to the AEAF CONTROL routine with these values being AE data. The minimum shutter speed value Evsmin in step AM15 is a compensated value obtained by adding the aforementioned compensation value ΔEvsmin.

DISCONTINUANCE SUBROUTINE AND AUTOMATIC RELEASE CANCEL SUBROUTINE

FIG. 40 is a flowchart showing the DISCONTINUANCE subroutine. This subroutine is a subroutine for interrupting automatic shooting of the SELF-TIMER, the SELF-TW and the INTERVAL shooting, and is called in a loop processing. In automatic shooting, the shooting operation can be automatically executed without any command by a photographer after the processing enters the respective sequences. Therefore, if the shooting is interrupted during the sequence of operation is executed, the processing for interrupting the sequence is needed.

In case that the loading is not completed in step DC1 through DC4, and ?LDEND=0 as determined at step DC1 the return value is set to YES when either one of the back cover switch BACK or the power switch PSW is set to ON, (as determined at steps DC3 and DC4) while the return value is set to NO when both the back cover switch BACK and the power switch PSW are set to OFF. In case the loading is completed, (?LDEND=1) the return value is set to YES when the power switch PSW is set to ON whether the back cover switch BACK is set to ON or OFF, while the return value is set to NO when the back cover switch BACK is ON and the power switch PSW is OFF.

In case the return value is set to YES in the DISCONTINUANCE subroutine or the AUTO RELEASE CANCEL subroutine, in steps DC5 through DC10, the automatic release condition is canceled, (step DC5) and the SELF-TIMER lamp is turned off (step DC6). Further, the SELF-TIMER mark displayed in the LCD panel 19 is changed from blinking state indicating "during operation" condition to continuously illuminated state showing the stand-by condition when the shooting system is set to the SELF-TIMER or the SELF-TW mode. When the shooting system is set to the INTERVAL mode, the interval indication mark is changed from blinking state to continuously illuminated state, and the display is changed from time indication to the focal length indication.

WIND ROUTINE

FIG. 41 shows the WIND routine which is diverged from the AEAF CONTROL routine after a shooting is executed. This routine is executed for winding the film by one frame after photographing is executed.

In step WD1, it is judged whether or not the film is loaded in the camera, referring to the status of the flag ?FLEXZ. If a film has been loaded, and ?FLEXZ=1 the wind pulse counter WPC is set to "4" and the aforesaid WIND PULSE COUNTING subroutine is called in step WD3. If the WIND PULSE COUNTING subroutine is successfully completed, the film counter is incremented (in step WD4), and the frame number is displayed (in step WD5) in the LCD panel 19. If the return value of the WIND PULSE COUNTING subroutine is "DISCONTINUED", the processing returns to the top of the MAIN processing if the back cover is open (thus making the back cover switch off) in step WD6. If the back cover is closed, the AUTOMATIC RELEASE CANCEL subroutine, which is shown in FIG. 40, is called in step WD7, and the processing diverges to the REWIND routine.

In case steps WD2 through WD5 are skipped as the film does not exist, (i.e., ?FLEXZ=0) or in case the WIND PULSE COUNTING subroutine has been successfully completed, the processing returns to the MAIN processing when the shooting system is set to the FRAME-BY-FRAME shooting, (i.e., when ?AUTOREL=0). The processing is diverged to the AEAF CONTROL routine when the shooting system is set to the SELF-TIMER shooting, or the processing diverges to the AEAF CONTROL routine after moving the lens to the wide extremity by calling the WIDE MOVEMENT 2 subroutine when the shooting system is set to the SELF-TW shooting. If the shooting system is set to the INTERVAL shooting, the processing diverges to an INTERVAL CONTROL routine which is described later.

INTERVAL CONTROL ROUTINE

FIG. 42 shows a flowchart illustrating the INTERVAL control routine which is diverged from the WIND routine. In this routine, a stand-by processing is executed, measuring the set interval time for the second or the later shot when the shooting system is set to the INTERVAL mode. If the shooting system is set to a mode other than the INTERVAL mode, the processing loops in the MAIN processing. However, in the case of the INTERVAL shooting, the processing loops between the AEAF CONTROL routine and the INTERVAL CONTROL routine, not through the MAIN processing.

As this processing is started, "five seconds" is set in the INT timer if the remaining interval time, i.e., a period of time to the succeeding shot is less than five seconds when the shooting system is set to the STROBE OFF mode. "Eleven seconds" is set in the INT timer if the remaining interval time is less than eleven seconds when the shooting system is set to the mode (are steps IN1-IN5) other than the STROBE ON mode. This is the minimum waiting time required in the camera system, and the processing is for resetting the time in the INT timer, if necessary, before entering the loop described later. It should be noted that since there is a possibility for the strobe to be flashed if the shooting system is set to a mode other than the STROBE OFF mode, the extra time for charging the strobe capacitor is included.

In step IN6, the display of the remaining time of the INTERVAL time in the INTERRUPT subroutine (of FIG. 21) is permitted, and DISCONTINUANCE subroutine is repeatedly called in the loop of step IN7 through IN10 until the remaining interval time becomes less than five seconds or 11 seconds, in accordance with the selected mode of the shooting systems. If the return value of the DISCONTINUANCE subroutine is YES, that is, when it is judged that the processing should be discontinued, the processing diverges from the loop to the top of the MAIN processing.

The loop of steps IN11 through IN17 is the processing for repeatedly calling the DISCONTINUANCE subroutine until the remaining interval time becomes less than three seconds. In this loop, if the exposure system is set to a mode other than the STROBE OFF mode, the charging control of the strobe is repeatedly executed. If the remaining interval time becomes less than five seconds, the strobe charging is prohibited. Therefore, when the exposure system is set to a mode other than the STROBE OFF mode, the charging control is executed for six seconds.

The strobe charging control in step IN14 is a processing for starting the charging unless the charging voltage of the strobe capacitor reaches a predetermined level. If the charging voltage reaches the predetermined level, any further processing is not carried out.

If the remaining interval time becomes less than three seconds, as determined at step IN17 the processing diverges to the AEAF CONTROL routine at the terminal of "AEAF CONTROL 3". However, if the return value of the DISCONTINUANCE subroutine is YES, the processing may already be shifted to the top of the MAIN processing through step in 12.

REWIND ROUTINE

FIG. 43 is a flowchart illustrating the REWIND routine which is diverged from the WIND routine or from step MA30 of the MAIN processing. This routine is executed when the film is wound to the end or the forced rewind is commanded by a predetermined operation, which is the processing for returning a film into a film cartridge.

In steps RW1 through RW3, the lens is retracted to its accommodation position, the WIND motor is reversely rotated, and the wind pulse counter WPC is set to "4" which corresponds to the amount of one frame feeding of the film.

In step RW4, a flag ?2START which indicates the start of the two-second timer is cleared, and the processing enters a loop of steps RW6 through RW20 after starting the 3.5-second timer in step RW5.

In this loop, inputting of the conditions of the back cover switch BACK and the wind pulse WP is repeatedly executed. Further, the film counter is decremented and the film number is displayed at every four detections of the rise-up of the wind pulse WP. If no change is detected in the wind pulse within a predetermined period of time, (RW11) or if the back cover is opened, (RW10) the processing goes out of the loop. Although the above-said predetermined time (control time) is set to two seconds, the wind motor is rotated for 3.5 seconds since the wind motor was started to be reversely rotated, regardless of the status of the back cover switch BACK or the wind pulse WP. It is because the motor is rotated for a longer period of time since the wind pulse WP may not be issued due to a loosening of the film at the beginning of the reverse rotation of the wind motor.

Step RW9 follows step RW6 until the 3.5-second timer is timed up, and then switch data is input and used for judgment in steps RW10 and RW11. Assume that the back cover is closed. Then a loop of steps RW12, RW6 and steps RW9 through RW12 is executed until a change is detected in the wind pulse WP in step RW11. Steps RW7 and RW8 are executed after the 3.5-second timer is timed up. The two-second timer is started, the flag ?2START is set to "1", and a loop from steps RW9 through RW13 is executed.

If a change occurs in the wind pulse, the processing goes from step RW11 to step RW14, and it is discriminated whether the pulse is changed from OFF to ON or from ON to OFF.

If it is detected that the wind pulse WP is changed from OFF to ON, the wind pulse counter WPC is decremented in step RW15 and it is judged whether or not the wind pulse counter WPC equals "0". If the wind pulse counter WPC is judged to be equal to "0", it is determined that the film is rewound. Then, in steps RW16 through RW18, the film counter is decremented, the frame number is displayed, and the film counter is reset.

Step RW19 is executed as long as the change occurs in the WIND pulse in order to lessen influences by erroneous input due to chattering, etc., while inhibiting signals to be inputted in the range where signals are not theoretically changed, as described in the processing of the WIND PULSE COUNTING routine.

Before the two-second timer starts (as determined at step RW20) the processing is returned from step RW20 to step RW6. After the timer has been started, the processing is returned from step RW20 to step RW7, where the two-second timer is restarted.

If the back cover is opened in the loop above, and if 3.5-second timer is timed up, the wind motor brake is applied after the wind system is initialized, in steps RW21 through RW23, and the processing goes to step RW29.

If there is no change in the wind pulse WP until the two-second timer is timed up, (steps RW12–RW14) it is judged that a film does not exist in the camera or that a film is completely rewound, and the following processing step RW24 starts.

In steps RW24 through RW28, after the wind motor brake is applied, in step RW25 a flag ?REWEND representing the rewind completion is set to "1" if the film exists in the camera, (i.e., if then, the film 2 FLEX2=1) frame counter is reset to "0" in step RW27 and the frame number is displayed in step RW28. If a film does not exist in the camera, steps RW26 through RW28 are skipped, and the processing goes to step RW29.

In steps RW29 through RW31, the drive system engaged with a spool axis is released by forwardly rotating the wind motor, which is once stopped, for 0.5 seconds, and making the spool axis free for the next loading.

As the REWIND routine is terminated, the processing diverges to the LOCK routine.

In the camera embodying the present invention, as shown in FIG. 23, the ZOOM TO TELE subroutine is called in step MA62 when the tele switch TELE is set to ON and the zoom lens is not located at the tele extremity. Similarly, the ZOOM TO WIDE subroutine is called in step MA58 when the wide switch WIDE is set to ON and the zoom lens is not located at the wide extremity.

In the ZOOM TO TELE subroutine, which is illustrated in FIG. 31, if the zoom lever 12 is displaced halfway, both the tele switch TELE and the zoom mode switch MVSW are set to ON, the zoom lens is shifted to the nearest one of the stop positions for step zoom movement.

If the zoom lever is displaced beyond the halfway-displaced position, the tele switch is set to ON and the zoom mode switch OFF. Accordingly, the zoom lens is moved continuously as long as the zoom lever is kept displaced at the position.

In both cases, the zoom lens is stopped when the zoom lever is placed at its neutral position.

If the zoom lever is further displaced to its halfway-displaced position, the movement mode is changed from the step movement to the continuous movement. On the other hand, if the zoom lever is displaced from its beyond-halfway-displaced position to the halfway-displaced position, the zoom lens moved in continuous mode is stopped.

As to the ZOOM TO WIDE subroutine, shown in FIGS. 32-A and 32-B except the processing for eliminating the backlash effect when the zoom lens is stopped, it is substantially the same as the ZOOM TO TELE subroutine except for the lens movement direction.

According to the camera of the present invention, the zoom lever for instructing the movement direction of the lens is simultaneously used for switching the continuous movement and the stepwise movement of the lens, thereby the camera is easy to operate.

Further, when the zoom lever is placed at its neutral position, the lens is immediately stopped even if the lens is moved in a stepwise movement mode; therefore the lens position can be adjusted with no difficulty, even if the stepwise movement is executed.

The present disclosure relates to the subject matter contained in Japanese patent application No. HEI 2-32983 (filed on Feb. 14, 1990) which is expressly incorporated herein by reference in its entirety.

What is claimed is:

1. An electronically controlled camera having a zoom lens that is capable of being driven to move in a direction of an optical axis of said zoom lens between a tele extremity and a wide extremity, said camera further comprising:

a single operation member; and control means for driving said zoom lens to move either stepwisely or continuously between said tele extremity and said wide extremity in accordance with an operation of said single operation member, said control means comprising:

first means for determining said direction in which said zoom lens is moved in accordance with an operated direction of said operation member; and second means for determining whether said zoom lens is to be moved stepwisely or continuously, in accordance with an operated amount of said operation member, and wherein said operation member is neutrally placed in its neutral position, and is capable of being displaced in first and second directions, and wherein said first determining means determines a direction in which said zoom lens is moved in such a fashion that said zoom lens is moved to a tele side when said operation member is displaced in said first direction, while said zoom lens is moved to a wide side when said operation member is displaced in said second direction.

2. The electronically controlled camera according to claim 1, wherein said lens is positioned at the nearest one, in the moving direction of said zoom lens, of predetermined stop positions when said zoom lens is moved stepwisely.

3. The electronically controlled camera according to claim 2, wherein said lens is moved stepwisely when said operation member is displaced halfway in either said first or second direction, while said lens is moved continuously when said operation member is fully displaced in either said first or second direction.

4. The electronically controlled camera according to claim 3, wherein said lens is moved to the nearest stop position only when said operation member is placed in its neutral position and then displaced halfway in either said first or second direction.

5. The electronically controlled camera according to claim 4, wherein when said operation member is fully displaced in either said first or second direction, said lens is kept being moved continuously even though said operation member is displaced from its fully displaced position to the position where said operation member is displaced halfway.

* * * * *

UNITED STATES PATENT AND TRADEMARK OFFICE
CERTIFICATE OF CORRECTION

PATENT NO. : 5,210,558
DATED : May 11, 1993
INVENTOR(S) : T. KOBAYASHI et al.

It is certified that error appears in the above-indentified patent and that said Letters Patent is hereby corrected as shown below:

On the title page, under item [19] and item [75], change "Kobayshi" to --Kobayashi--.

Signed and Sealed this

Thirty-first Day of May, 1994

Attest:

BRUCE LEHMAN

Attesting Officer

Commissioner of Patents and Trademarks